(12) United States Patent
Venkatesh et al.

(10) Patent No.: US 12,208,892 B2
(45) Date of Patent: Jan. 28, 2025

(54) GENERATING AN ENVIRONMENT FOR AN OPERATION USING A SET OF ASSETS

(71) Applicant: Anduril Industries Inc., Irvine, CA (US)

(72) Inventors: Abhay Venkatesh, Irvine, CA (US); Brian W. Schimpf, Costa Mesa, CA (US); Elston ToChip, Vienna, VA (US); Jared Newman, Irvine, CA (US); Joshua John Bennett, Irvine, CA (US); Nikhil Reddy, Huntington Beach, CA (US); Samuel R. Elie, Oakland, CA (US)

(73) Assignee: Anduril Industries Inc., Costa Mesa, CA (US)

(*) Notice: Subject to any disclaimer, the term of this patent is extended or adjusted under 35 U.S.C. 154(b) by 321 days.

(21) Appl. No.: 17/478,661

(22) Filed: Sep. 17, 2021

(65) Prior Publication Data
US 2023/0089776 A1    Mar. 23, 2023

(51) Int. Cl.
*B64C 39/02* (2023.01)
*G06Q 10/0631* (2023.01)
(Continued)

(52) U.S. Cl.
CPC ..... *B64C 39/024* (2013.01); *G06Q 10/06316* (2013.01); *G06V 20/70* (2022.01); *B64U 2101/00* (2023.01); *B64U 2101/20* (2023.01)

(58) Field of Classification Search
None
See application file for complete search history.

(56) References Cited

U.S. PATENT DOCUMENTS

| 9,583,006 B2 | 2/2017 | Srivastava |
| 9,678,507 B1 | 6/2017 | Douglas |

(Continued)

FOREIGN PATENT DOCUMENTS

| DE | 102019000958 | 8/2020 |
| FR | 3101325 | 4/2021 |

(Continued)

OTHER PUBLICATIONS

Besada et al. "Drones-as-a-service: A management architecture to provide mission planning, resource brokerage and operation support for fleets of drones." 2019 IEEE International Conference on Pervasive Computing and Communications Workshops (PerCom Workshops). IEEE, 2019 (Year: 2019).

(Continued)

*Primary Examiner* — Peter D Nolan
*Assistant Examiner* — Michael F Whalen
(74) *Attorney, Agent, or Firm* — Van Pelt, Yi & James LLP

(57) ABSTRACT

A system generating an environment for an operation using a set of assets includes processor(s) configured to: obtain data associated with task(s) to be performed by a set of assets, wherein: 1) the set of assets comprises semi-autonomous drones and 2) the data associated with the task(s) comprises parameter(s) pertaining to a geographic location in which at least one asset is to perform the task(s); determine a discretized representation of the geographic location, wherein the discretized representation comprises discrete elements each corresponding to a volume associated with the geographic location; annotate the discretized representation to create an annotated representation with the parameter(s) pertaining to the geographic location with a subset of the discrete elements based on a determination that the parameter(s) pertain to the geographic location; determine a (Continued)

plan to perform the task(s), wherein the plan is based on the annotated representation; and cause the task(s) to be performed.

22 Claims, 39 Drawing Sheets

(51) Int. Cl.
  *G06V 20/70* (2022.01)
  *B64U 101/00* (2023.01)
  *B64U 101/20* (2023.01)

(56) References Cited

U.S. PATENT DOCUMENTS

| | | | |
|---|---|---|---|
| 10,629,082 | B1 | 4/2020 | Paczan |
| 10,909,859 | B1 | 2/2021 | Dodd |
| 11,247,774 | B2 | 2/2022 | Ohata |
| 2004/0068415 | A1 | 4/2004 | Solomon |
| 2010/0318330 | A1 | 12/2010 | Toms |
| 2014/0108464 | A1* | 4/2014 | Rohlf ............... G06F 16/2246 707/797 |
| 2014/0316616 | A1 | 10/2014 | Kugelmass |
| 2015/0120094 | A1 | 4/2015 | Kimchi |
| 2015/0327136 | A1 | 11/2015 | Kim |
| 2016/0247404 | A1 | 8/2016 | Srivastava |
| 2016/0280370 | A1 | 9/2016 | Canavor |
| 2016/0357183 | A1 | 12/2016 | Shaw |
| 2017/0069214 | A1 | 3/2017 | Dupray |
| 2017/0131727 | A1 | 5/2017 | Kurdi |
| 2017/0144757 | A1 | 5/2017 | Hall |
| 2017/0236428 | A1 | 8/2017 | High |
| 2017/0244726 | A1 | 8/2017 | Finkel |
| 2017/0323235 | A1 | 11/2017 | Johnston |
| 2018/0017973 | A1 | 1/2018 | Teague |
| 2018/0074520 | A1 | 3/2018 | Liu |
| 2018/0188747 | A1 | 7/2018 | Venturelli |
| 2018/0247544 | A1 | 8/2018 | Mustafic |
| 2018/0253980 | A1 | 9/2018 | Mohamadi |
| 2018/0259955 | A1 | 9/2018 | Noto |
| 2018/0357909 | A1 | 12/2018 | Eyhorn |
| 2018/0373240 | A1 | 12/2018 | Kim |
| 2019/0088145 | A1 | 3/2019 | Chambers |
| 2019/0108680 | A1 | 4/2019 | Querejeta Masaveu |
| 2019/0164434 | A1 | 5/2019 | Cantaloube |
| 2019/0174149 | A1* | 6/2019 | Zhang ............... H04N 7/18 |
| 2019/0230721 | A1 | 7/2019 | Chen |
| 2019/0236963 | A1 | 8/2019 | High |
| 2019/0250601 | A1 | 8/2019 | Donahoe |
| 2019/0265705 | A1 | 8/2019 | Zhang |
| 2019/0289469 | A1 | 9/2019 | Bentley |
| 2019/0392717 | A1 | 12/2019 | Vaughn |
| 2020/0167059 | A1 | 5/2020 | Luckey |
| 2020/0250998 | A1 | 8/2020 | Priest |
| 2020/0251000 | A1 | 8/2020 | Evans |
| 2020/0279493 | A1 | 9/2020 | Burgess |
| 2020/0355570 | A1 | 11/2020 | Priest |
| 2021/0124376 | A1 | 4/2021 | Edara |
| 2021/0146977 | A1 | 5/2021 | Rajan Kesavelu Shekar |
| 2021/0304343 | A1 | 9/2021 | Spjuth |
| 2021/0350714 | A1 | 11/2021 | Chambers |
| 2021/0403159 | A1 | 12/2021 | Dey |
| 2022/0136832 | A1* | 5/2022 | Berkovich ......... G01C 21/1654 701/446 |
| 2022/0253076 | A1 | 8/2022 | Cleland-Huang |
| 2022/0332416 | A1* | 10/2022 | Kobayashi ........... G05D 1/0297 |
| 2023/0058405 | A1 | 2/2023 | Chen |

FOREIGN PATENT DOCUMENTS

| | | |
|---|---|---|
| KR | 20170037476 | 4/2017 |
| WO | 2018222225 | 12/2018 |
| WO | 2018236181 | 12/2018 |

OTHER PUBLICATIONS

Lee et al. "Constructing a reliable and fast recoverable network for drones." 2016 IEEE International Conference on Communications (ICC). IEEE, 2016 (Year: 2016).

David Swanson. "A simulation-based process model for managing drone deployment to minimize total delivery time." IEEE Engineering Management Review 47.3 (2019): pp. 154-167 (Year: 2019).

Wan et al., "Distributed conflict-detection and resolution algorithm for UAV swarms based on consensus algorithm and strategy coordination," IEEE Access vol. 7, Aug. 9, 2019, pp. 10052-100566.

* cited by examiner

| (X,Y,Z) | Keep-in? | Occupied? | Clear line of sight? | Target? | Inclement Weather? |
|---|---|---|---|---|---|
| (1,0,0) | | | | | |
| (1,1,0) | | | | | |
| (1,0,1) | | | | | |
| (1,1,1) | | | | | |
| ... | ... | ... | ... | ... | ... |
| (1,4,0) | | | | | |
| ... | ... | ... | ... | ... | ... |
| (2,1,0) | | | | | |
| ... | ... | ... | ... | ... | ... |
| (4,1,0) | | | | | |

1600

1610

GENERATING AN ENVIRONMENT FOR AN OPERATION USING A SET OF ASSETS

BACKGROUND OF THE INVENTION

Conventional unmanned aerial vehicles (UAVs), or drones, are useful for performing a number of tasks. Such drones may perform surveillance, delivery of commercial packages or weaponry, mapping of distant or inhospitable regions and/or other missions. Although useful, such drones suffer from a number of drawbacks. For example, drones are typically remotely piloted, may lack reliability, may be slower than desired, may have limited range, and/or may have other issues that adversely affect performance. Further, coordination of multiple assets, including one or more drones, is complicated and generally requires a user in a control center to control and coordinate the assets in connection with performance of an operation.

BRIEF DESCRIPTION OF THE DRAWINGS

Various embodiments of the invention are disclosed in the following detailed description and the accompanying drawings.

DETAILED DESCRIPTION

Figure 1:
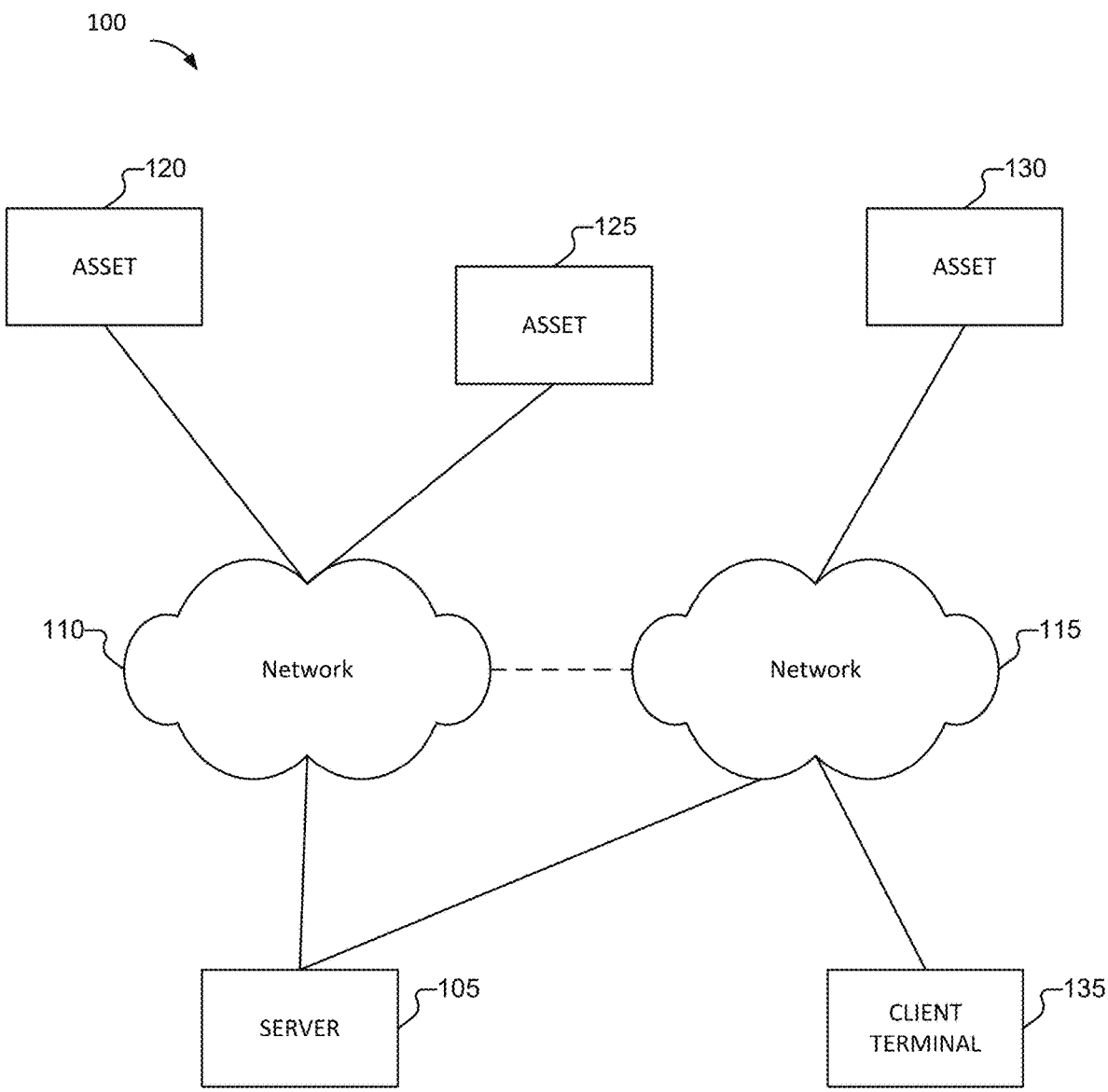
FIG. 1 is a diagram illustrating a system to perform an operation according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to various embodiments, a system for grouping assets is disclosed. The system may include a communication interface, and one or more processors coupled to the communication interface. The one or more processors may be configured to (i) receive, via the communication interface, data associated with one or more tasks to be performed by a set of assets, wherein the set of assets comprises a plurality of drones, and the drones are at least semi-autonomous, (ii) determine, from among a plurality of assets, the set of assets to perform the one or more tasks, and (iii) communicate, via the communication interface, an instruction to at least one drone in the set of assets, the instruction indicating that the one or more tasks are to be completed at least in part by the at least one drone. The determining the set of assets to perform the one or more tasks may include determining one or more capabilities associated with one or more characteristics of the one or more tasks, and determining the plurality of drones based at least in part on (i) the one or more capabilities associated with one or more characteristics of the one or more tasks, and (ii) one or more drone capabilities respectively associated with the plurality of drones.

According to various embodiments, a drone is disclosed. The drone may be a semi-autonomous drone. The drone may include a communication interface, and one or more processors coupled to the communication interface. The one or more processors may be configured to (i) receive, via the communication interface, an indication that the drone is part of a set of assets, wherein the set of assets are tasked with performing one or more elements of one or more tasks, and the set of assets comprises a plurality of drones, (ii) communicate, via the communication interface, information pertaining to the one or more elements, and (iii) communicate, via the communication interface, information pertaining to the plan to perform the one or more tasks, wherein the information pertaining to the plan to perform the one or more tasks is communicated with at least one other drone in the set of assets. The information pertaining to the one or more elements may be communicated with at least one other drone in the set of assets. The information pertaining to the one or more elements may be based at least in part on information obtained by one or more sensors of the set of assets. The information pertaining to the one or more elements may be used in connection with determining a plan to perform the one or more tasks.

According to various embodiments, a drone is disclosed. The drone may be a semi-autonomous drone. The drone may include a communication interface, and one or more processors coupled to the communication interface. The one or more processors may be configured to (i) receive, via the communication interface, an indication that the drone is part of a set of assets, wherein the set of assets are tasked with performing one or more elements of one or more tasks, and the set of assets comprises a plurality of drones, (ii) determine that at least one drone of the set of assets has experienced a failure, (iii) in response to a determination that the at least one drone has experienced the failure, update a plan to an updated plan to perform the one or more tasks, and (iv) communicate, via the communication interface, information pertaining to the updated plan, wherein the information pertaining to the updated plan is communicated with at least one remaining drone of the set of assets. The one or more processors may be further configured to communicate, via the communication interface, information obtained during implementation of at least an element of the updated plan, wherein the information pertaining to the updated plan is communicated with at least one remaining asset of the set of drones.

According to various embodiments a system for dynamically grouping assets is disclosed. The system may include a communication interface, and one or more processors coupled to the communication interface. The one or more processors may be configured to (i) obtain data associated with one or more tasks being performed by a set of assets, wherein the set of assets comprises a plurality of drones and the plurality of drones is at least semi-autonomous, (ii) determine to modify the set of assets based at least in part on the data associated with the one or more tasks, and (iii) communicate, via the communication interface, an instruction to at least one drone in the set of assets, the instruction indicating the modification to the set of assets. To determine to modify the set of assets based at least in part on the data associated with the one or more tasks may include determining one or more capabilities associated with one or more remaining tasks, and determining a modification to the set of assets based at least in part on (i) the one or more capabilities associated with the one or more remaining tasks, and (ii) one or more drone capabilities respectively associated with the set of assets.

According to various embodiments a system is disclosed. The system may include a communication interface, and one or more processors coupled to the communication interface. The one or more processors may be configured to (i) cause a first user interface to be displayed, the first user interface comprising one or more selectable elements associated with a characteristic of one or more tasks to be performed, (ii) receive, via the first user interface, one or more user selections pertaining to the characteristic of the one or more tasks to be performed, (iii) in response to receiving the one or more user selections input to the first interface, cause a second user interface to be displayed, (iv) receive, via the second user interface, one or more user selections pertaining to the set of one or more assets to be deployed to perform the operation, (v) determine the operation to be performed, the operation being determined based at least in part on (a) the one or more user selections pertaining to the characteristic of the one or more tasks to be performed, and (b) the one or more user selections pertaining to the set of one or more assets to be deployed to perform the operation, and (vi) communicate, via the communication interface, information pertaining to the operation. The second user interface may be configured based at least in part on at least one of the one or more user selections input to the user interface. The second user interface may comprise one or more selectable elements associated with a set of one or more assets to perform an operation, wherein the set of one or more assets comprises one or more drones, and the one or more drones are semi-autonomous. The information pertaining to the operation is communicated to at least one drone of the set of assets. The information pertaining to the operation causes the set of assets to be deployed to implement at least part of the operation.

According to various embodiments, a system is disclosed. The system may include a communication interface, and one or more processors coupled to the communication interface. The one or more processors may be configured to (i) obtain data associated with one or more tasks to be performed by a set of assets, (ii) determine a discretized representation of the geographic area, wherein the discretized representation comprises a plurality of discrete elements each corresponding to a volume in the geographic area, (iii) annotate the discretized representation to create an annotated representation with the one or more parameters pertaining to the geographic area with at least a subset of the plurality of discrete elements based at least in part on a determination that the one or more parameters pertain to the geographic area, (iv) determine a plan to perform the one or more tasks, wherein the plan is based at least in part on the annotated representation, and (v) cause the one or more tasks to be performed based at least in part on the plan. The set of assets may comprise a plurality of drones and the plurality of drones is at least semi-autonomous. The data associated with the one or more tasks may comprise one or more parameters pertaining to a geographic area in which at least one asset of the set of assets is to perform the one or more tasks.

According to various embodiments, a system is disclosed. The system may include a communication interface, and one or more processors coupled to the communication interface. The one or more processors may be configured to (i) obtain data associated with one or more tasks to be performed by a set of assets, (ii) determine a discretized representation of the geographic area, wherein the discretized representation comprises a plurality of discrete elements each corresponding to a volume in the geographic area, (iii) annotate the discretized representation with the one or more other drone flight plans to create an annotated representation, (iv) determine a first flight plan of at least one drone of the plurality of drones, wherein the first flight plan is determined based at least in part on the annotated representation, (v) communicate information pertaining to the first flight plan to at least one other asset in the set of assets. The set of assets comprises a plurality of drones and the plurality of drones may be at least semi-autonomous. The data associated with the one or more tasks may comprise one or more other drone flight plans.

According to various embodiments, a system receives a high-level instruction to execute an operation using a set of drones. The high-level instruction may comprise a high-level description or definition of an operation. In response to receiving the high-level instruction, the system may determine one or more low-level instructions in connection with the performance of the operation using a set of drones. For example, semi-autonomous drone such as a leader drone may deconstruct the high-level instruction into one or more tasks for the set of drones, and the semi-autonomous drone may communicate the one or more tasks (or plans for completing the one or more tasks or elements of the tasks) to one or more drones in the set of drones (e.g., to follower drones). In some embodiments, a user or controls system provides a high-level definition of an operation, and one or more semi-autonomous drones autonomously determine a task or element of a task associated with the operation. A set of drones (e.g., comprising the one or more semi-autonomous drones) then performs a task or element of a task associated with the operation.

As used herein, "semi-autonomous drone" means a drone that, without human intervention, determines a plan to perform at least part of a task or operation based on a high level instruction to perform the task or operation, obtains feedback information pertaining to a context of the drone and/or plan, and updates or determines a new plan to react to the feedback information. The updated plan or new plan may provide an instruction for controlling the drone in a manner consistent with the high level instruction or the operation. The high level instruction may be provided to the drone by a user interface or by a server via a network connection. In response to receiving the high level instruction, the drone determines the plan to perform the part of the task or operation and implements the plan or instructs another asset to provide a part of the task or operation and provide feedback to the drone. The term "semi-autonomous drone" may be used interchangeably herein with "drone." For example, a task of "scan a polygon and track moving targets" may involve planning out how the one or more drones is to scan the polygon effectively, but halfway through the scan pattern a new target may appear and the semi-autonomous drone would re-plan and start following that new target.

A high-level instruction may include one or more of an indication of a type of operation, a location at which the operation is to be performed, a target of the operation, a time at which the operation is to be performed, etc. A low-level instruction may provide more specific information or definitions with respect to the operation. In some embodiments, the low-level instruction may indicate a specific asset to perform a task in the operation, a manner by which the task is to be performed (e.g., speed, height, type of sensor, etc.). The low-level instruction may be further determined based on environmental information or context information within the area at which the operation is to be performed. An example of a high-level instruction may be an instruction to perform an operation of surveilling a particular road on a specific date. In contrast, the corresponding low-level instructions may include an instruction to asset in the set of assets that indicate a particular location (or range of location) along the road at which the particular asset is to capture information. A leader drone may determine the particular follower drones to perform a low-level instruction. The low-level instruction may indicate a type of information to be captured, a speed at which the asset is to travel, a height at which the asset is to travel or be during surveillance. As another example, a high level instruction may include "observe this target from several good vantage points," and the corresponding low level instruction may be "fly drone 1 to 30 degrees heading with 100 meter standoff relative to target, and drone 2 to 180 degrees heading with 150 meter standoff."

As used herein, "asset" may correspond to device, terminal, vehicle, and/or system that may receive information from a server (e.g., either directly or via another asset), and implement a plan to perform task or an element of a task, such as using a sensor to obtain information, communicating collected information to a leader drone/asset or the server, delivering a payload, etc. Examples of assets include, without limitation, a drone, a satellite, a communication tower, an observation station, a vehicle such as an autonomous or semiautonomous vehicle (e.g., a plane, a boat, a car, a truck, a helicopter, etc.), a drone (e.g., a large drone, a small drone, etc.) a jet, a small autonomous sensor (e.g., a sensor, a 'dust' sensor, etc.), etc. An asset has an associated identifier and set of defined characteristics, capabilities, traits, etc. (also collectively referred to herein as "capabilities"). The set of defined capabilities may be indicative of a set of functions that an asset may perform. For example, the set of capabilities may indicate a set of peripherals comprised, or otherwise operatively connected to, the asset such as a camera, a sensor, a payload, a payload deployment mechanism, a pre-loaded software, etc. Another example the set of defined capabilities may indicate whether the asset comprises turret (e.g., a multi-axis pointing mechanism that other capabilities are mounted to, for example the pan tilt unit of a surveillance camera). Another example the set of defined capabilities may indicate whether the asset has the ability to send and receive data from other sources of communication, including disabling/enabling transmission.

As used herein, "plan information" may correspond to information pertaining to the plan to perform a task, an element, and/or an operation. As an example, plan information may include parameters for the task, the element, and/or the operation. As an example, plan information may include an instruction for operating the asset.

As used herein, "capability information" may correspond to information pertaining to a capability of an asset such as a drone. As an example, capability information may include an indication of a capability and/or a set of capabilities of a drone.

As used herein, "sensor information" may correspond to information obtained by a sensor such as a sensor of an asset. The sensor information may be processed locally by the asset or device such as to convert raw sensor input to a predetermined format, etc.

As used herein, "state information" may correspond to information pertaining to a context or state of a device such as an asset (e.g., a drone). As an example, the state information may include information indicating a state of a particular capability, or set of capabilities, of a drone. As an example, the state information may include information indicating a status of one or more tasks (e.g., an extent to which an asset has completed a task). As an example, the state information may include result information of performance of the task, an element, and/or an operation.

Various embodiments include a system for configuring an operation that is to be performed by a set of assets, including a semi-autonomous drone. The system may include one or more servers, a client terminal, and/or a set of one or more assets. The server(s), client terminal, and set of one or more assets may communicate over one or more assets. The client terminal may provide a user interface with which an operation may be configured (e.g., defined), a set of assets may be deployed to perform at least part of the operation, and feedback pertaining to a status of performance of the operation is provided. In connection with configuring the operation, a set of assets to perform at least part of an operation may be determined. The part of the operation may be determined by a semi-autonomous asset such as a leader drone. For example, the leader drone may analyze the operation (e.g., a high-level instruction to perform the operation) and determine one or more tasks respectively corresponding to at least a part of the operation. For example, a first task can correspond to a first part of the operation, and a second task can correspond to a second part of the operation. The set of assets may at least semi-autonomously determine a plan to perform at least part of the operation, and implement the plan.

In some embodiments, the server may determine a set of assets to perform one or more tasks associated with an operation. The set of assets may be determined based at least in part on one or more capabilities associated with one or more characteristics of the one or more tasks. For example, the one or more capabilities associated with one or more characteristics of the one or more tasks may correspond to a function to be performed (e.g., in the case of a surveillance tasks, a capability may correspond to video capture, image capture, etc., in the case of drone delivery, a capability may correspond to range, a mechanism to carry a payload, weight restrictions of the payload, etc.). The set of assets to perform the one or more tasks may be determined based at least in part on one or more drone capabilities respectively associated with the plurality of drones. For example, in response to determining a configuration of an operation, the server may determine one or more tasks corresponding to the operation and determine a capability associated with a task (e.g., based at least in part on a mapping of tasks to capabilities, etc.). The server may determine one or more assets matching the capability associated with the task (e.g., based at least in part on a mapping of assets to capabilities, etc.), and determine a set of assets to perform the one or more tasks, or determine to add an asset to a predefined set of assets to perform the one or more tasks. In response to deploying the set of assets to perform the operation or to determining the set of assets, at least one asset in the set of assets (e.g., a leader drone) may be provided with information pertaining to the operation (e.g., one or more characteristics or identifiers associated with the one or more tasks, an indication of the set of assets to perform the one or more tasks, etc.). In some implementations, a plurality of the set of assets, or each asset within the set of assets, is provided with an instruction indicating that the particular asset is to be used in connection with performing the one or more tasks. The set of assets may be determined at least in part on an availability of one or more assets. For example, an ownership (e.g., a lease) of an asset may be used in connection with determining whether to include the asset in the set of assets to perform the one or more tasks.

Various embodiments include the grouping of a set of assets to perform at least part of an operation (e.g., one or more tasks). The set of assets may include one or more semi-autonomous drones. In response to the operation being configured (e.g., at the server), a high-level instruction of the operation (or a part thereof, such as a task) is provided to at least one drone in the set of assets. The high-level instruction may include a high-level definition of the operation or task, including one or more characteristics of the operation or task (e.g., a task to be performed, a location at which the task is to be performed, a time at which the task is to be performed, a region in which the set of assets are permitted to operate, etc.). In response to receiving information pertaining to the operation (e.g., an indication that the drone is included in the set of assets), a semi-autonomous drone may determine one or more elements of one or more tasks, or one or more tasks, to be performed by the set of assets. The semi-autonomous drone may be a leader drone among a plurality of drones within the set of assets. In some embodiments, the leader drone may determine a plan for at least one drone in the set of assets to perform at least an element of the one or more tasks. For example, the leader drone may execute a planning service (e.g., locally by a processor on the drone) that determines a plan for performing the one or more tasks assigned to the set of assets. The determining the plan for performing the one or more tasks may be based at least in part on one or more of (i) a function to be performed, (ii) an environment in which the task is to be performed, (iii) a capability associated with the task to be performed, (iv) a capability of at least one drone in the set of assets, etc. The plan may be updated based on feedback information provided by one or assets within the set of assets (e.g., an indication of asset failure, a change in the environment, a location of a target, etc.).

According to various embodiments, the assets within the set of assets may communicate with one another. For example, the leader drone within the set of assets may provide information pertaining to at least an element of a task, such a plan for an asset to perform the element of the task, or to perform the task. As another example, another drone in the set of assets or another asset in the set of assets may send to the leader drone information pertaining to a status of the implementation of the plan, a context of the asset (e.g., an environment of the asset, such as weather, etc.), etc. In some embodiments, one or more assets (e.g., drones) may listen to information being communicated between a leader drone and a follower drone or other asset within the set of assets. For example, a dormant leader may obtain the information communicated among the set of assets to allow the dormant leader to relatively seamlessly take over the responsibilities/role of the leader in response to a determination that the leader drone has failed, or in response to a determination that the dormant leader is to become a leader of a partition of the set of assets. The leader drone may also communicate with a control center such as a server managing/coordinating performance of the operation. For example, the leader drone may provide feedback information pertaining to the operation (e.g., a real time status of the operation such as an indication of whether the one or more tasks are completed, etc.). As another example, the leader drone may send a request for additional assets or an indication that a subset of the set of assets are released from the operation such as in the case that the subset of assets have completed corresponding elements of the one or more tasks and the capabilities associated with the subset of assets is no longer required to perform the one or more tasks.

According to various embodiments, the set of assets may semi-autonomously react to a failure of one or more assets within the set of assets. For example, in response to a control center (e.g., a server) providing an indication that the set of assets is to perform the operation or one or more tasks associated with the operation, the set of assets may decompose the operation or tasks to determine a plan to be implemented in connection with the performance of the operation or tasks associated therewith. During implementation of the plan, an asset may fail such as by loss of power, loss communication with the set of assets (the leader drone), a crash, or interaction with a third party. In response to a failure of an asset in the set of assets, the remaining assets within the set of assets may continue performance of the operation or the tasks associated therewith without human intervention. The remaining assets may determine that an asset has failed and update the plan for performing the operation or the tasks, for example, to reallocate the elements or functions that were assigned to the failed asset. In response to a determination that the leader drone has failed, another drone in the set of assets may be elevated to role of leader drone among the remaining assets of the set of assets. The drone to be elevated to leader drone may be based at least in part on a pre-determined ranking/priority, etc. In some implementations, a dormant leader is elevated to role of leader drone in response to the current leader drone failing. The dormant leader may correspond to a highest ranking/priority drone among the set of assets (e.g., after the leader drone), such as indicated on the pre-determined ranking/priority, etc. The dormant leader may sync with the leader drone in real-time or at predetermined intervals (e.g., short intervals to ensure that dormant leader may seamlessly take on the role of leader drone, if required).

In various embodiments, the set of assets determined to perform an operation (or one or more tasks associated with the operation) may be updated during performance of the operation. In some implementations, the set of assets may be updated based a characteristic or capability of a task, or an element of a task, that is still to be performed, and/or a characteristics or capability of an asset in the set of assets. For example, if an asset in the set of assets does not have a capability/characteristic of the remaining tasks to be performed, the asset may be released. As another example, if no asset in the set of assets, or an insufficient number of assets in the set of assets, has a capability/characteristics matching the capability/characteristic of the remaining tasks to be performed, then the set of assets may be updated to include one or more assets with capabilities/characteristics matching the capability/characteristic of the remaining tasks to be performed. The update to the set of assets may be determined by a control center (e.g., a server) managing or coordinating the operation, and the update to the set of assets may be communicated at least to a leader drone in the set of assets.

According to various embodiments, one or more user interfaces may be provided in connection with one or more of the configuration of the operation, the communication of a status of the operation (e.g., a real-time update), and/or the update to the operation (e.g., based on user input, etc.). In conventional systems for defining an operation, a user inputs with great-level of specificity the parameters of the operation, the particular assets to be used, and a plan to be implemented. In contrast, various embodiments include the conditional display of various user interfaces to walk a user through the configuration of an operation, a high level plan or definition of the operation is provided to at least the leader drone, and the set of assets (e.g., the leader drone) determines a plan for implementing tasks or elements of tasks deconstructed from the high-level plan or definition of the operation. In this manner, various embodiments provide a user interface wizard to input one or more characteristics or requirements of the operation. The server may cause a client terminal to display the user interface(s) to a user. The terminal may be caused to display first user interface first user interface comprising one or more selectable elements associated with a characteristic of one or more tasks to be performed, and in response to an input to the user interface, the terminal may be caused to display a second interface associated with a set of asset(s) to perform the operation. The second user interface may be configured based on inputs to the first user interface. In response to an input to the second user interface, an operation may be determined. The server may cause the terminal to sequentially configure and provide user interfaces based at least in part on a user input to a previous user interface, and the series of user interfaces may be used to collectively determine an operation to be performed. After an operation is determined and the set of assets are instructed to perform the operation, the server may cause the terminal to provide a user interface comprising a current status of the operation (e.g., a real-time feed, or a real-time update to various parts of the operation), etc. In some embodiments, the user may input one or more inputs to a user interface during performance of the operation in connection with pausing the operation, updating the operation (e.g., requesting quicker completion of the operation such as via an increase in the number of assets in the set of assets, requesting more firepower, request to more quickly cover a geographical area), cancelling the operation, etc.

In some embodiments, the system determines a discrete representation of a geographic location. The geographic location may correspond to a location at which an operation is to be performed, or a location at which a task (or element of the task) of the operation is to be performed. The discrete representation of the geographic location may comprise a plurality of discrete elements each corresponding to a volume in the geographic location. The system may use the discrete representation of the geographic location in connection with determining and/or communicating parameters associated with an operation (e.g., a parameter associated with a task or element of a task), determining a plan to perform a task, determining a flight path (e.g., a trajectory) of an asset such as a drone of the set of assets determined to perform an operation (e.g., a set of one or more tasks, etc.). According to various embodiments, a plurality of assets in the set of assets is configured to determine the discrete representation. For example, an asset running a planning service may be configured to determine the discrete representation of the location corresponding to the operation, or a location of a task or element that has been assigned (e.g., allocated) to the asset. As an example, the discrete representation is determined locally at an asset in the set of assets that is to perform the one or more tasks. In some embodiments, a plurality of assets determine their own respective version of the discrete representation of the location based at least in part on information communicated pertaining to the one or more tasks. As an example, a leader drone and/or a follower drone respectively determines a discrete representation of the geographic location (e.g., a local version of the discrete representation) based at least in part on one or more of (i) information pertaining the one or more tasks such as one or more parameters or characteristics associated with the one or more tasks which is received from a server such as a server associated with the configuration of the associated operation (e.g., an indication of a keep-in/keep-out definition for the one or more tasks, a location of a target, maximum height, etc.), and (ii) information pertaining to the geographic location from a third party service such as a service for map information (e.g., topographical information), a service for weather, a service for information obtained by another asset or sensor in or in proximity to the geographic location (e.g., a camera, a satellite, etc.), and (iii) information pertaining to the geographic location or the one or more tasks from another asset within the set of assets assigned to the operation (e.g., a status of the performance of the one or more tasks, information associated with a communication line of sight, a flight plan of an asset, an indication that a particular location/volume/area is occupied, etc.).

According to various embodiments, determining a discrete representation of a geographic location comprises determining (e.g., creating, generating, populating, etc.) a 3-D representation for the geographic location, the 3-D representation comprising a plurality of discrete elements respectively corresponding to a voxel(s). In some embodiments, the 3-D representation for the geographic location may be determined based at least in part on transforming the geographic location from a real world representation to the plurality of discrete elements based at least in part a curvature of Earth, and a downward direction in a grid of the 3-D representation corresponds to a direction of a force of gravity. The dimensions of the 3-D representation may be configured to include a substantially larger number of discrete elements (e.g., boxes) in the x and y axis as compared to the number of discrete elements in the z axis. The z axis may be an axis that is parallel to the force of gravity. As an example, if an asset traversing down the 3-D representation in the z-direction, the asset travels down towards the ground, and conversely, if the asset traverses up the 3-D representation in the z-direction, the asset travel towards the sky. The length or dimension of the discrete representation in the z-axis may be configured based at least in part on a configuration of a maximum height that is set in connection with configuration of the operation. For example, the system may have a default maximum height associated with an operation (or associated with different types of operation). As another example, a user may input the maximum height during the configuration of the operation.

According to various embodiments, the system (e.g., a server, a leader drone, a follower drone, etc.) generates a model of the geographic location associated with the one or more tasks. The generating the model of the geographic location may include determining discretized representation of the geographic location, and annotating the discretized representation to create an annotated representation. For example, the annotated representation may correspond to the model of the geographic location. In some embodiments, the system updates the annotated representation based at least in part on received information pertaining to the one or more tasks and/or the geographic location. For example, the system may iteratively update the annotated representation at periodic intervals, as updated or new information pertaining to the one or more tasks and/or the geographic location is received, etc. The annotated representation may be updated until the one or more tasks are complete (e.g., until a determination that the operation is complete, abandoned, paused, etc.). In some embodiments, the annotating the discretized representation of the geographic location includes respectively associating metadata with one or more discrete elements of the discretized representation. The metadata may include a value or indication associated with the one or more tasks, the geographic location, etc.

Various embodiments for managing, coordinating, and/or performing an operation improve an efficiency with respect to a use of resources (e.g., assets) assigned to perform an operation, improve a fault tolerance of the performance of the operation by enabling dynamic grouping of assets and/or dynamic updating of a plan to perform a task/element associated with an operation. Various embodiments improve the efficiency and effectiveness of defining an operation, and matching assets for performing the operation, and in determining a manner according to which the operation is to be performed. In related art methods, a human operator selects assets to use to perform an operation and a centralized service (e.g., running on a server) defines an operation in great detail. The centralized service provides detailed operation plans in order to perform the operation. Various embodiments include a system of user interfaces that are configured to intuitively walk a user through the providing a high level description of a desired operation. Various embodiments provide an efficient method for grouping a set of assets to perform an operation. The grouping of assets may be based at least in part on an automated negotiation of ownership availability, and capabilities associated with the operation and capabilities of the assets. The grouping of assets is more efficient and provides better organized task execution. In related art, a system for defining an operation generally requires a human operator to select an asset to use to perform an operation, and the set of assets available for selection by the human operator may be further limited because the availability of ownership is not readily recognizable. In some embodiments, the system for performing the operation is more fault tolerant. For example, the use of a leader drone (e.g., a semi-autonomous drone) in connection with determining one or more tasks to be performed and for coordinating/managing the performance of the tasks by one or more assets in the set of assets (e.g., follower drones) provides a more efficient manner for dynamically updating plans to performs a task or element of a task associated with an operation. As another example, a dynamic grouping of assets for performing an operation is more efficient because assets having capabilities no longer required in performing a remaining set of tasks may be released from the set of assets (and rendered available for reallocation to another operation). The dynamic grouping of assets is also more fault tolerant because in response to a failure of an asset or a change in a context of an operation, an additional asset may be allocated to the set of assets. The dynamic management/coordination of the performance of the operation (e.g., by the leader drone) enables tasks to be quickly reassigned to other asset(s) in the set of assets in response to a change in a capability of an asset and/or a change in a context of the operation such as the environment, etc.

FIG. 1 is a diagram illustrating a system to perform an operation according to various embodiments of the present application. In the example illustrated in FIG. 1, system 100 may include server 105 and one or more of assets 120, 125, and 130. System 100 may further include network 110, network 115, and/or client terminal 135. Server 105 and assets 120, 125, and/or 130 may communicate with each other such as via one or more networks (e.g., network 110, network 115, and/or any other appropriate network), which may include a wired network, and/or a wireless network such as a cellular network, a wireless local area network (WLAN0), etc. According to various implementations, server 105 may correspond to a single server or a plurality of servers. Similarly, system 100 may include various other assets.

In some embodiments, server 105 may configure an operation, including determining a set of assets to perform the operation. The set of assets may include one or more of assets 120, 125, and/or 130. Server 105 may communicate to at least one asset of the set of assets an indication that the asset is to perform the operation and/or an indication of the set of assets (e.g., a list of assets within the set of assets, such as a list of identifiers of the assets). In some embodiments, the indication that the asset is to perform the operation may include a high-level definition or description of the operation, such as a high-level task to be performed (e.g., surveillance of an area or a target, delivery of a payload, etc.). At least one asset within the set of assets (e.g., a leader drone) may deconstruct the high-level definition or description of the operation and autonomously determine plan for at least part of the set of assets to perform/complete the operation. The high-level definition or description of the operation may further include certain parameters of the operation such as a location, an indication of a restricted zone in which the assets are not to enter/operate, an indication of an area/zone in which the assets are to operate, etc. After receiving the high-level definition or description of the operation, at least one asset (e.g., the leader asset) may autonomously determine a plan for at least part of the set of assets to perform/complete the operation, the at least one asset may cause the set of assets to implement the plan, and communicate information pertaining to the operation (e.g., a current status of the operation, etc.) to server 105 via network 110 and/or network 115. For example, the leader drone may deconstruct the high-level definition or description of the operation and determine a plan for one or more tasks corresponding to the operation. In some embodiments, a discretized representation of the geographic location associated with the one or more tasks is generated. As an example, the discretized representation of the geographic location is generated based at least in part on information pertaining to the geographic location and/or the one or more tasks. The information is received from server 105 and/or another asset in a set of assets (e.g., a follower asset, a leader drone, etc.). In some embodiments, the plan for the one or more tasks is determined based at least in part on the discretized representation. For example, the discretized representation is annotated to create an annotated representation. As an example, the annotating the discretized representation includes setting or associating metadata with one or more discrete elements of the discretized representation. In some embodiments, the asset among the set of assets (e.g., asset 120, asset 125, and/or asset 130), and/or server 105 determines the plan using the annotated representation such as by using information comprised in the metadata associated with a discrete element (e.g., to determine a trajectory or flight path of an asset, etc.). In response to determining a plan for the one or more tasks, the leader drone may send the plan for at least one task to another asset in the set of assets (e.g., a follower asset). In response to receiving the plan for the at least one task, the follower asset may implement the plan and may autonomously determine any additional instructions to be performed locally in order to perform the at least one task. The set of assets to perform an operation may be dynamically updated (e.g., during performance of the operation) to add an asset (e.g., in the case of a failure of an asset having a particular capability that is to be replaced by a new asset), to remove an asset (e.g., in the case of completion of any task requiring a particular capability for which the asset was included in the set of assets to provide), etc.

In various embodiments, server 105 communicates with client terminal 135 via a network such as network 115. Server 105 may cause client terminal 135 to display one or more user interfaces in connection with configuring the operation, displaying a status of the operation, and/or updating the operation (e.g., pausing, cancelling, or modifying the operation). Client terminal 135 may receive one or more user inputs to the various user interfaces and communicate an indication of the one or more user inputs to server 105. Server 105 may use the one or more user inputs to determine the various user interfaces to be displayed at client terminal 135, such as in connection with configuring the various user interfaces to create a wizard with which a user defines or inputs characteristics of the operation. During performance of the operation, server 105 may use a user input to change a status or parameter of the operation, and in response to such a change, server 105 may communicate the change to at least the leader asset/drone (e.g., to cause the leader drone to implement the change). For example, in response to changing a status or parameter of the operation, server 105 may update a high-level definition or description of the operation, and server 105 provide a corresponding high-level instruction or update to the leader drone in the set of assets performing an operation. In some embodiments, server 105 receives information pertaining to the operation (e.g., feedback information) from the set of assets, such as from the leader drone. The information pertaining to the operation may be indicative of a status of the operation, a real-time image or video of the operation, etc. In response to receiving the information pertaining to the operation, server 105 may provide a status update, a real-time operation status to client terminal 135. In some embodiments, server 105 may determine one or more recommendations or options for updating the operation, and provide at least one of the recommendations or options to a user via a user interface displayed at client terminal 135. As an example, the one or more recommendations or options may include an indication an option to increase a number of allocated assets in the set of assets to increase the speed with which the performance of the operation (e.g., indicate that adding a particular number of assets may decrease the time to completion by a computed estimated time).

Figure 2:
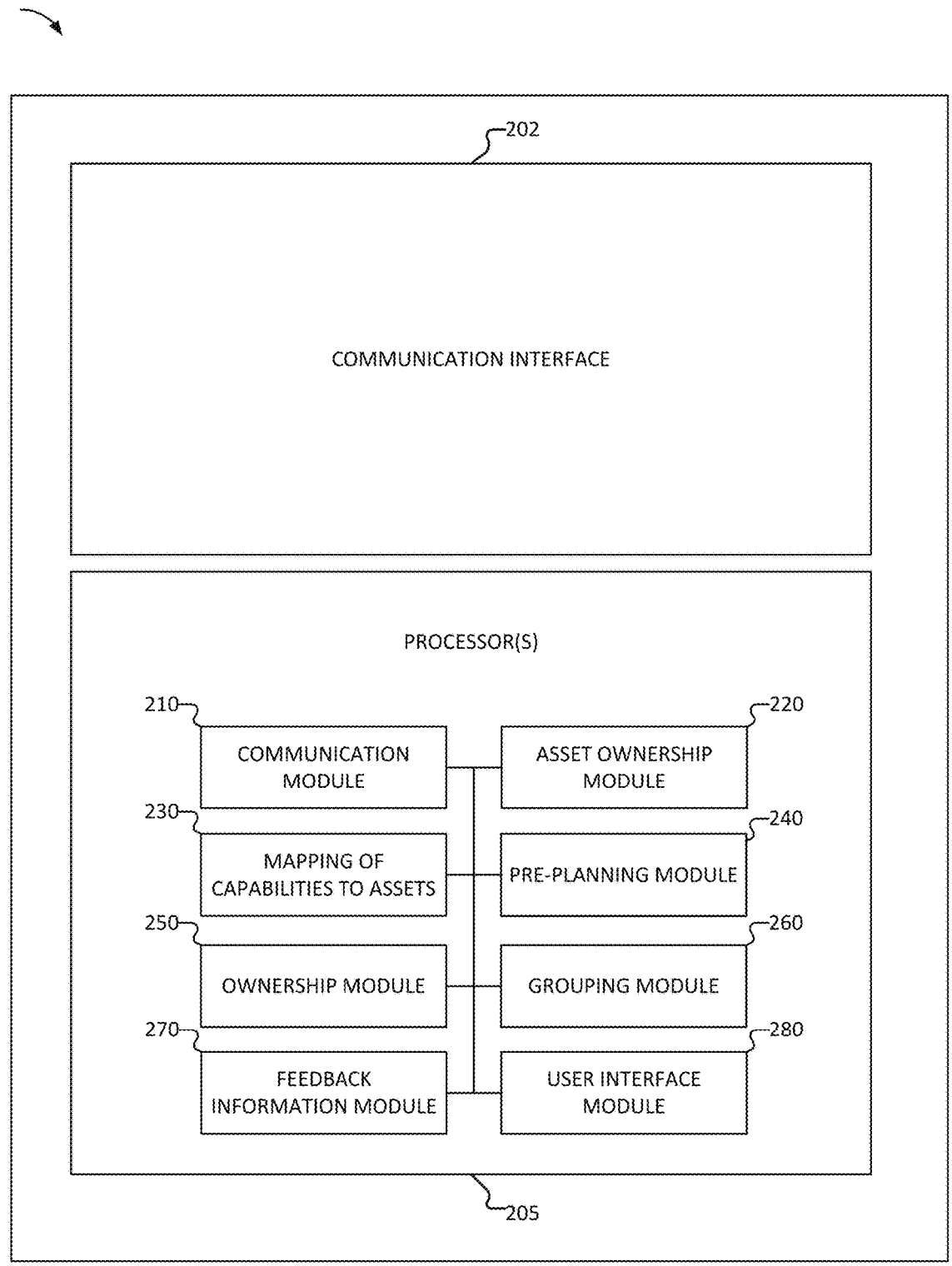
FIG. 2 is a block diagram illustrating a device to configure or control an operation according to various embodiments of the present application.

FIG. 2 is a block diagram illustrating a device to configure or control an operation according to various embodiments of the present application. In the example shown in FIG. 2, device 200 may comprise a communication interface 202 and/or one or more processors 205. Device 200 may correspond to server 105 of FIG. 1, control center 460 of FIGS. 4A-4C, and/or control center of FIGS. 5A-5C. Device 200 may implement process 700 of FIG. 7A, process 720 of FIG. 7B, process 1000 of FIG. 10A, and/or process 1020 of FIG. 10B, process 1100 of FIG. 11. According to various embodiments, one or more processors 205 may comprise or execute one or more of communication module 210, asset ownership module 220, mapping of capabilities to assets 230, operation definition module 240, grouping module 250, pre-planning module 260, feedback information module 270, and user interface module 280.

Device 200 may implement one or more modules in connection with determining an operation, including one or more characteristics of the operation, and determining a set of assets to perform the operation, and communicating an indication of the operation (e.g., a high level description of the operation) to one or more assets in the set of assets (e.g., the leader drone). During the implementation of the operation, device 200 may implement one or modules in connection with communicating information with at least the leader drone to receive information pertaining to a current status of the operation or to send an indication of a change to the operation, and/or communicating information a client terminal to provide an update on the status of the operation or to receive a change to the operation.

Device 200 may use communication module 210 to communicate with the set of assets, a client terminal, another server or terminal, etc. For example, the communication module may provide to communication interface 202 that is to be communicated. As another example, communication interface 202 may provide to communication module 210 information received by device 200.

According to various embodiments, the determination of the set of assets to perform an operation is based at least in part on an ownership of one or more assets in the set of assets. Device 200 may determine to include in the set of assets only those assets for which device 200 has ownership (e.g., an organization to which device 200 belongs owns or controls the asset), or for which device 200 may obtain at least a temporary ownership of the asset. Ownership of the asset may include the ability to control the asset, such as providing an instruction to the asset to perform a certain function (e.g., a task, an element of a task, etc.). As an example, ownership of an asset may include a lease during which the owner has the ability to control the asset. A lease may be for a fixed/pre-determined term, or associated with completion of a particular operation(s). In some embodiments, the transfer of ownership (e.g., in connection with the negotiation of ownership for determining the set of assets) is a permanent transfer of ownership, or otherwise for an undefined term, or until device 200 or its organization releases ownership of the asset. In some implementations, the set of assets is configured to cause the leader drone to be subject to a term of ownership (e.g., length of lease, permanent ownership) that is longer than the terms of ownership of other assets in the set of assets (e.g., the follower drones). In some implementations, if the operation is determined to include a relatively higher likelihood that a follower drone may lose communication during performance of the operation (e.g., based on a terrain of the area in which the operation is performed, etc.), device 200 may configure the set of assets to cause follower drones to have longer terms of ownership. The longer term of ownership may ensure that ownership over the follower drones survives the period(s) when the follower drone(s) are out of communication with the leader drone and/or device 200, etc. In some embodiments, the ownership of an asset includes a failover entity to which ownership of the asset is transferred in the event that the current entity having ownership fails. Information pertaining to ownership of an asset may be stored at one or more of (i) locally at the asset, (ii) a centralized ownership service such as a service hosted by one or more servers providing service across a plurality of organizations, (iii) device 200, and (iv) an owner of the asset. The information pertaining to an ownership of an asset may include one or more of an indication of the current owner, an indication of a length of current ownership, an availability of an ownership transfer such as an indication of an ability for another organization to acquire ownership (e.g., a willingness of a current owner to transfer ownership), a current failover owner, an indication of a protocol for negotiating transfer of ownership, etc. In some embodiments, the ownership of an asset may comprise an automatic take over ownership in which a device or organization requesting ownership (e.g., having appropriate permissions) may automatically take over ownership of the asset such as upon request for ownership.

In some embodiments, device 200 may use asset ownership module 220 in connection with determining an ownership of a particular asset and/or to negotiate obtaining ownership of an asset. Asset ownership module 220 may obtain the information pertaining to ownership of an asset, and device 200 may use such information in connection with determining the set of assets. For example, device 200 may use the information pertaining to ownership of the asset to determine whether a particular asset is available for allocation/assignment to the set of assets to perform the operation. Asset ownership module 220 may negotiate with an entity for transfer of ownership of the asset for use in connection with the operation. For example, asset ownership module 220 may request a lease for a predetermined term. The predetermined term may be an expected length of the operation, an expected length of time that the asset is expected to be required to perform a particular task or element of a task (e.g., a period of time for which the capability of the asset is needed in performance of the operation), etc. Asset ownership module 220 may request the information pertaining to ownership from the particular asset, or a particular asset may advertise information pertaining to ownership of such asset. In some embodiments, device 200 sends a request/instruction to obtain ownership of an asset in response to a determination of a set of assets to be used in connection with performing the operation. For example, device 200 may send the request to obtain ownership of an asset in conjunction with (e.g., as part of, or along with, etc.) providing to an asset an indication of the set of assets, such as an instruction indication indicating that the asset is included in the set of assets. As a further example, device 200 may send the request to obtain ownership of one or more assets in connection with providing the leader with an indication of the set of assets, and the leader can thereafter communicate with one or more assets in the set of assets in connection with obtaining the applicable ownership of the one or more assets (e.g., for performing at least a task in the operation).

According to various embodiments, the set of assets to be used in connection with performing the operation is determined and/or updated based at least in part on a capability of the corresponding assets included in the set of assets. In connection with configuring the operation, device 200 may determine a set of capabilities associated with performing the operation (e.g., capabilities required to perform the various functions comprised in performing the operation). Device 200 may use the set of capabilities associated with performing the operation in connection with determining the set of assets. For example, device 200 may match assets within a superset of assets that have capabilities matching set of capabilities associated with performing the operation. Device 200 may query a mapping of capabilities to assets (or to asset identifiers) in connection with determining the superset of assets having capabilities matching at least one capability in the set of capabilities associated with performing the operation. In response to a determination that a capability of the operation does not have a matching asset (e.g., an asset with the corresponding capability) within a superset of available assets, device 200 may determine whether two or more assets may be used to collectively attain the capability or whether to reconfigure the operation. For example, device 200 may provide to the client terminal/user an indication that a capability of the operation has no matching asset and/or prompt the user for an indication of whether to reconfigure the operation (e.g., based on further user input), or to cancel the operation.

In some embodiments, device 200 may use mapping of capabilities to assets 230 in connection with determining a capability of an asset. The mapping of capabilities to assets 230 may store a mapping of such capabilities locally, or may communicate with a remote service storing the mapping. Mapping of capabilities to assets 230 may query the mapping with a particular identifier for an asset to lookup the capabilities for such asset. Similarly, mapping of capabilities to assets 230 may query the mapping of a particular capability to lookup the assets having such a capability. In some implementations, in response to receiving one or more parameters of an operation, device 200 may determine one or more capabilities associated with the operation, and use mapping of capabilities to assets 230 to determine assets that have matching capabilities. For example, device 200 may determine the set of assets to perform the operation based at least in part on a determination that the set of assets collectively have capabilities matching the capabilities associated with performing the operation. Device 200 may determine the set of assets such that at least one asset in the set of assets has at least one capability matching a capability associated with performing the operation. Mapping of capabilities to assets 230 may be stored locally at device 200, or a module for obtaining a particular mapping of capabilities may be used to query a remote service providing the mapping of capabilities to assets 230. The mapping of capabilities to assets may be updated in response to a determination that a capability of an asset has changed. For example, an asset may advertise a new capability, a loss of a capability (e.g., in response to detecting a failure of a peripheral), and/or an update to a capability. In some implementations, device 200 may update the mapping of capabilities to assets. In some implementations, a remote service (e.g., a service hosted by a server) updates the capabilities mapped to a particular asset, and device 200 may periodically sync updates to the mapping of capabilities to assets, or device 200 may query the mapping of capabilities to assets, as necessary.

In some embodiments, an asset stores an indication of its capabilities. For example, an asset can locally store a capability definition and the asset may update the capability definition based on a current capability of the asset such as in response to failure of a module that provided a capability (e.g., a peripheral such as a sensor, a camera, or an added gimbal, etc.), addition of a new module (e.g., addition of a new peripheral, new software being loaded on the asset, an update to existing software, etc.). The capability definition may be a list of capabilities of an asset, or an indication of capabilities according to a predetermined format/protocol. In some implementations, an asset may advertise its capabilities such as via broadcast of the capability definition across one or more networks or to a leader drone during implementation of a plan/operation, etc., or the asset may provide an indication of its capabilities in response to a query from a server (e.g., a server configuring an operation), a centralized capability server, a leader drone, etc. In some implementations, device 200 (e.g., mapping of capabilities to assets 230), or a remote service that manages a mapping of capabilities to assets, may ping one or more assets for an update with respect to a current capability of the one or more assets, or otherwise provide a ping for a health update of an asset, etc., and the corresponding mapping of capabilities to assets may be updated (e.g., to reflect a current set of capabilities for the one or more assets and/or a state of the capabilities).

According to various embodiments, device 200 may define one or more operations to be performed by one or more assets. For example, definition of an operation may include at least one of setting one or more objectives associated with the operation, setting a location at which the operation is to be performed, setting a target of the operation, setting one or more restrictions with respect to performance of the operation (e.g., a rule of engagement for engaging the target, a restricted or permitted airspace, etc.), setting a date of an operation, etc. The one or more operations may be defined based at least in part on one or more user inputs, such as a user selection input to a user interface provided by user interface module 280. In some embodiments, device 200 uses operation definition module 240 to define the one or more operations. For example, operation definition module 240 may receive the one or more user inputs by the user to the user input from communication module 210 and/or user interface module 280, and operation definition module 240 may determine one or more characteristics/parameters associated with the operation in connection with defining the operation. An example of a definition of an operation may include an operation to find or track a particular target (e.g., human XYZ, truck ABC, etc.) in Los Angeles, from Jan. 1, 2021 to Jan. 3, 2021, the assets are not to travel 100 miles outside Los Angeles, or enter a permanent prohibited area or within 2 miles of an airport. In some embodiments, the one or more user inputs associated with the operation may include an indication of one or more types of assets that are to be used in connection with performance of the operation. Continuing with the foregoing example, the definition of the operation may further include an indication that the operation is to be performed using a drone and/or a fixed-wing aircraft.

In some embodiments, the operation may be deconstructed into a set of one or more associated capabilities or characteristics. For example, the definition of the operation (e.g., the operation defined using the operation definition module) may be analyzed and one or more capabilities associated with the operation may be determined based on the analysis. The set of one or more capabilities associated with the operation may be determined based at least in part on querying a mapping of operation parameters to capabilities. The parameters associated with an operation may be determined based on the definition of the operation. Examples of the operation parameters include a type operation (e.g., scanning road network, find, fix, track, loiter, scan along path, etc.), a operation classification (e.g., offensive, defense, reconnaissance, etc.), a location, a path along which a task is to be performed (e.g., a path for tracking/scanning), a type of asset (e.g., drone, fixed wing, helicopter, boat, etc.), a target (e.g., a person, an air vehicle, a ground vehicle, an unknown type of target, etc.), a range for performing the operation, a location of the operation, a rule set for performance of the operation, an indication of what can/cannot be performed (e.g., permitted actions), survivability during the operation (e.g., how likely is it that the asset be shot down or otherwise terminated), communication requirements (e.g., an indication of when the asset can engage in a communications silent mode or lose link, an indication of the type of communications to be used, or other parameters or restrictions on communications during the operation, etc.), target behaviors (e.g., an indication of expected target movement such as whether targets are static, moving on roads, movement patterns, etc.), potential threats (e.g., locations of sites that would be able to disrupt or disable the drone such as a SAM (surface to air missile launcher), an RF Jamming site, etc.), unlikely target zones (e.g., areas that are not expected to include any targets of interest as specified by the user, etc.), a maximum altitude (e.g., height) at which an asset is to travel, a keep-in area (e.g., an area in which the asset is to remain), a keep-out area (e.g., an area from which the asset is to be prevented/prohibited from entering), etc. In some implementations, operation definition module 240 determines the one or more capabilities associated with the operation. In other implementations, grouping module 250 determines the one or more capabilities associated with the operation.

According to various embodiments, device 200 determines a set of assets to perform the operation (e.g., a team of assets). Device 200 may determine the set of assets to perform the operation automatically in response to an operation being defined (e.g., based on one or more user inputs. The set of assets may be determined based at least in part on one or more (i) operation parameters, (ii) one or more capabilities associated with the operation, (iii) a capability of one or more assets, and (iv) an ownership of one or more assets. Various other factors/variables may be used in connection with determining the set of assets to perform the operation. In some embodiments, device 200 determines the set of assets based on a best fit based at least in part on one or more factors/variables associated an asset and/or the operation. For example, device 200 may use a cost function to determine the set of assets. For example, the cost function may comprise weightings for various factors used in determining the set of assets. Device 200 may determine a set of assets based on a minimization of the overall cost value determined by the cost function for the combination of assets in the set of assets. In some implementations, the set of assets may be determined such that the corresponding aggregated cost value using the cost function is below a threshold cost value. The threshold cost value may be configurable (e.g., by an administrator, a user, etc.), such as in association with definition of the operation. In some implementations, the threshold cost value is determined to correspond to a predefined percentile with respect to all possible sets of assets (e.g., so that the set of assets to perform the operation is in top 10 percent of all possible sets of assets, or other configurable percentile). One example of a cost function in a context including pairing assets to road assignments may comprise a weighting of a) distance from the road, b) probability that a target exists on the road. Using the aforementioned cost function, if there are assets that are far from the roads then the assets will not be selected because the distance component of the cost function will remove the assets from being desirable, etc. Similarly, if there are low probability roads the low probability roads will be scanned in the future, and higher priority roads will take precedence.

In some embodiments, the determining the set of assets may include determining a number of assets to include in the set of assets. The number of assets to include in the set of assets may be determined based at least in part on the operation (e.g., a capability associated with the operation) and a capability of an asset. For example, the determining the number of assets may be based on the cost value of a grouping of assets, and/or a set of capabilities provided by the grouping of assets in relation to the capabilities associated with the operation. As discussed further below, the number of assets to be included in the set of assets may be based at least in part on a determination to include in the set of assets a redundancy with respect to one or more capabilities among the assets in the set of assets and/or an extent to which redundancy is to be included among assets in the set of assets.

Device 200 may use grouping module 250 to determine the set of assets. Grouping module 250 may determine the set of assets based at least in part on the definition of the operation. For example, the set of assets may be determined based at least in part on the set of one or more capabilities associated with the operation, and/or one or more operation parameters. Grouping module 250 may determine a set of one or more assets having capabilities matching the set of one or more capabilities associated with the operation. As an example, grouping module 250 may determine the set of assets such that for each capability in the set of one or more capabilities associated with the operation the set of assets comprises at least one asset with a matching capability.

In some embodiments, device 200 determines a pre-plan of the operation in connection with determining the set of assets to perform the operation. Device 200 may use pre-planning module 260 to determine the pre-plan of the operation. The pre-plan for an operation may be a high-level description or decomposition of the operation (e.g., into a set of tasks or elements of tasks to be performed) to identify what is to be done during implementation of the operation. The generation of a pre-plan in connection with determining the set of assets to be used in the performance of the operation may allow grouping module 250 to assess the capabilities associated with the operation (e.g., the various capabilities that are required to implement the operation) and/or properties or characteristics of an asset that are required or desired for performance of the operation (e.g., the set of tasks or elements of tasks to be performed in the operation). In some implementations, in response to determining the pre-plan of the operation, device 200 determines assets having one or more capabilities of matching the capabilities or requirements of the operation.

Device 200 may determine to include redundancy in the set of assets for at least one of the one or more capabilities associated with the operation. For example, device 200 may use grouping module 250 to determine to include redundancy in the set of assets based at least in part on the type of operation, operation classification, location of operation, etc. (e.g., if the type of operation/operation classification/location is associated with a corresponding likelihood that an asset will fail that exceeds a threshold likelihood, or otherwise associated with an elevated risk of failure). If the operation is an offensive operation, or in a hostile environment, the likelihood that an asset fails may be elevated. The extent of redundancy that device 200 builds into the set of assets may be based on an extent to which an asset is likely to fail. For example, a plurality of thresholds may be defined, each threshold with a corresponding likelihood of asset failure, and the plurality of thresholds may be used in connection with determining an extent of redundancy to be built into the set of assets (e.g., an extent of redundancy may be mapped to a particular threshold corresponding likelihood of asset failure, and the mapping may be queried to determine the extent of redundancy to be applied to the set of assets). The extent of redundancy may indicate a number of assets to be included in the set of assets that each having a particular capability, such as a capability mapped to elevated risk of asset failure or a capability on an asset that is identified as having an elevated risk of asset failure.

Device 200 may communicate an indication of the set of assets in response to determining the set of assets to be used in connection with performing an operation. For example, in response to grouping module 250 determining the set of assets, device 200 uses communication module 210 to communicate an indication of the set of assets. In some embodiments, device 200 sends to at least the leader (e.g., the leader drone) in the set of assets. The leader drone may in turn provide to the other assets in the set of assets an indication that the other assets are in the set of assets. For example, the leader drone may inform each asset that they are on the team of assets (e.g., in the set of assets) for an operation. As another example, the leader drone provide to each asset in the set of assets an indication of the assets in the assets, so that each member knows, for example, the entire set of assets in the team to perform the operation. The indication provided to the leader drone or to one or more other assets in the set of assets may be communicated in conjunction with, or separate from, a task or plan associated with performing the operation.

According to various embodiments, a pre-plan for performing the operation may be determined via a remote service and thereafter provided to the set of assets, such as at least the leader drone. The remote service to determine the pre-plan may be performed by device 200, such as via use of pre-planning module 260, or via one or more third party pre-planning modules with which pre-planning module 260, or device 200, may communicate. For example, the pre-planning module 260 may comprise an application programming interface (API) with which the one or more third party pre-planning modules interface with device 200 to provide a pre-plan associated with the operation. The pre-planning module 260 and/or third-party pre-planning modules may obtain the definition of an operation and/or one or more parameters associated with the operation. In some embodiments, the determining the pre-plan for an operation is an iterative process of determining a pre-plan, providing information pertaining to the pre-plan to a user such as via user interface module 280 (e.g., causing the pre-plan to be displayed on a client terminal), receiving feedback information pertaining to the pre-plan (e.g., one or more inputs with respect to a parameter of the pre-plan or the associated operation, and updating the pre-plan based on the feedback information. The updated pre-plan may thereafter be provided to a user, and feedback information may be received with respect to the pre-plan for further refinement. The providing of the pre-plan and receiving of feedback information may be iteratively performed, such as until a user provides an indication that the operation is to be initiated. As an example, device 200 may determine a pre-plan indicating that the set of assets will track a target along a path, or will otherwise travel along a particular path, and device 200 may cause the path to be displayed to the user at a client terminal. The user may provide one or more inputs modifying the path of the set of assets, and device 200 may update the pre-plan accordingly. As another example, device 200 may determine a pre-plan indicating the manner in which the asset will fly when scanning some region. For example, in the case of performing or analyzing a lawn service, if may be useful for the operation to see the back and forth lawn mowing patterns on a polygon and potentially manner of flying to scan the region if the original polygon shape does not result in very optimal scanning. For example, if a user performed lawn mowing vertically but built a long horizontal polygon to scan/analyze the lawn mowing, performing the scanning according to the original long horizontal polygon may result in a significant overshoot and back and forth of the asset, so the user or the drone might adjust to a horizontal scanning pattern in this case.

In some embodiments, device 200 sends a pre-plan according to which the set of assets is to perform the operation, and the leader asset may determine the plan which the set of assets is to perform the operation based on the pre-plan. As an example, device may determine and send the pre-plan if the operation is defined to ensure that the set of assets performing the operation are to adhere to a framework of a plan. The pre-plan may be a high level definition or description of what is to be accomplished by the set of assets or a subset thereof, and the leader drone may determine a lower-level plan that further specifies the manner by which the set of assets are to perform the operation (or a task thereof). The leader drone may in turn provide the plan for performing the operation to another asset in the set of assets (e.g., a follower drone(s)), which may in turn determine an even more specific plan for performing the plan provided by the leader drone. As an example in the context of a surveillance operation, device 200 (e.g., a server) may determine a pre-plan indicating the path or perimeter that the set of assets are to travel to obtain surveillance information for a certain location, and device 200 may provide the pre-plan to a leader asset in the set of assets (e.g., a leader drone). In response to receiving the pre-plan, the first asset may decompose the perimeter or the path in the pre-plan into smaller segments, assign such segments to various follower assets (e.g., follower drones), and provide the various follower assets with an instruction to travel to the segments correspondingly assigned to the follower assets to capture surveillance information with respect to the segment. Continuing with the example, the various follower assets may receive an instruction to capture surveillance information with respect to a particular segment, and the various follower assets may determine a specific manner by which to travel the segment and capture the surveillance information (e.g., the follower drone may plan a route to avoid obstacles along the route, such as trees, etc.).

According to various embodiments, device 200 may obtain feedback information with respect to definition of an operation, a pre-plan for the operation, and/or a status or result of performing the operation. Device 200 may use feedback information module 270 to obtain the feedback information, such as via communication module 210). In some embodiments, feedback information module 270 may obtain information pertaining to defining an operation, such as one or more characteristics or parameters of the operation input to a user interface displayed on a client terminal. In response to receiving the information pertaining to the operation definition, feedback information module 270 may provide such information to operation definition module 240, etc. In some embodiments, feedback information module 270 may obtain information pertaining to a pre-plan for an operation (e.g., an input to change or update the pre-plan) such as via an input to a user interface provided by a client terminal. In response to receiving the information pertaining to a pre-plan, feedback information module 270 may provide the information pertaining to the pre-plan to per-planning module 260, which may in turn update the pre-plan based on such information. In some embodiments, feedback information module 270 may obtain information pertaining to a status or result of performing the operation. For example, feedback information module 270 may receive real-time operation information (e.g., an indication of an asset failure, a live video feed, etc.) from the set of assets (e.g., the leader drone) during performance of the operation. Feedback information module 270 may provide the real-time operation information to user interface module 280 in connection with display of a status of the operation. As another example, feedback information module 270 may receive an indicating that the operation has been completed. In response to receiving the indication that the operation has been completed, feedback information module 270 may provide the indication or corresponding instruction to one or more modules, including (i) user interface module 280 to provide an indication that the operation is complete, and (ii) asset ownership module 220 to release ownership or return ownership of one or more assets in the set of assets, etc.

According to various embodiments, device 200 may cause one or more user interfaces to be displayed at one or more client terminals. The user interfaces may be displayed in connection with configuring or defining an operation, providing and updating a pre-plan, and/or providing a status of the operation. Device 200 may use user interface module 280 to configure the user interfaces to be displayed at the client terminal(s). User interface module 280 may configure the user interfaces based at least in part on one or more templates. Further user interface module 280 may provide a wizard or workflow by which a plurality of user interfaces are generated and provided to a user to configure an operation based on one or more inputs to the plurality of user interfaces. In some implementations, a user input to one user interface during configuring the operation is used in connection with generating a subsequent user interface to be used in the configuring the operation. In this way, the user interface module 280 may provide to a client terminal one or more user interfaces (or pages of a user interface) to lead a user through an operation configuration process. In contrast, operations are currently defined in a single complex interface that requires all operation characteristics or parameters to be input to a single page. The use of a plurality of user interfaces logically connected via a user input to a previous user interface may simplify the configuration of the operation, thereby decreasing the level of skill of a human operator, and decreasing the risk of an error or incorrect input being made.

Figure 3:
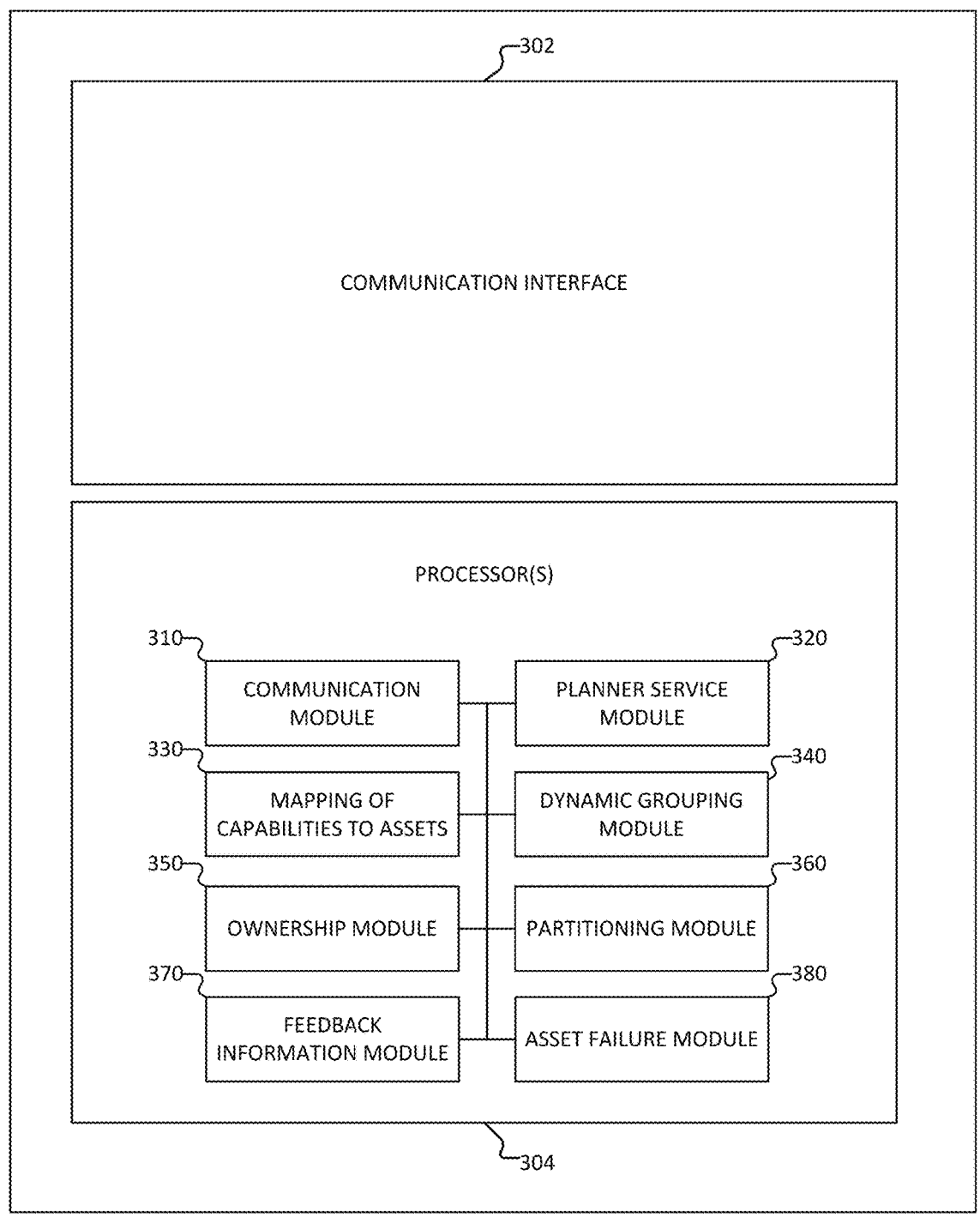
FIG. 3 is a block diagram illustrating a device to implement at least part of an operation according to various embodiments of the present application.

FIG. 3 is a block diagram illustrating a device to implement at least part of an operation according to various embodiments of the present application. In the example shown in FIG. 3, device 300 may comprise a communication interface 302 and/or one or more processors 304. Device 300 may correspond to asset 120, asset 125, and/or asset 130 of FIG. 1, asset 405, asset 410, asset 420, asset 430, asset 440 (e.g., a satellite), and/or asset 450 (e.g., a tower) of FIGS. 4A-4C, and/or asset 505, asset 510, asset 515, asset 520, asset 525, asset 530, asset 535, asset 540 (e.g., a satellite), and/or asset 545 (e.g., a tower) of FIGS. 5A-5C. Device 200 may implement process 800 of FIG. 8A, process 830 of FIG. 8B, process 830 of FIG. 8C, process 900 of FIG. 9A, process 930 of FIG. 9B, process 950 of FIG. 9C, process 951-2 of FIG. 9C, process 950 of FIG. 9D, process 1000 of FIG. 10A, process 1020 of FIG. 10B, process 1200 of FIG. 12A, process 1215 of FIG. 12B, process 1215 of FIG. 12C, process 1300 of FIG. 13, process 1400 of FIG. 14, process 1500 of FIG. 15, process 1800 of FIG. 18, process 1900 of FIG. 19A, and/or process 1940 of FIG. 19B.

According to various embodiments, one or more processors 304 may comprise or execute one or more of communication module 310, planner service module 320, mapping of capabilities to assets 330, dynamic grouping module 340, ownership module 350, partitioning module 360, feedback information module 370, and asset failure module 380. Device 300 may implement one or more modules in connection with implementing an operation, including determining a plan for the set of assets to perform a task (or element of a task) of an operation, dynamically modifying the set of assets, communicating with one or more other assets in the set of assets, updating the plan for performing the task such as based on information received from another asset in the set of asset, and communicating with one or more other assets in the set of assets assigned to perform the operation.

According to various embodiments, device 300 corresponds to a semiautonomous drone. Device 300 may receive a high level plan or instruction to perform an operation (or task or element thereof), and device 300 may autonomously determine a manner by which to implement the operation (or task or element thereof). In some embodiments, device 300 corresponds to a leader drone in a set of assets assigned to perform an operation. In some embodiments, device 300 corresponds to a follower drone in the set of assets assigned to perform an operation. Device 300 may comprise a same set of modules regardless of whether device is a leader drone or a follower drone. For example, a plurality of assets in the set of assets may comprise the same modules as the leader drone such as to provide redundancy in the event of a leader drone failure, or in the event that the set of assets is partitioned to provide different aspects of an operation (or task of an operation) and a plurality of partitions comprise a leader drone for the partition. As another example, the set of assets may include a dormant leader drone that syncs or backs up the leader drone to provide redundancy in the event of leader drone failure. In some implementations, certain types of assets comprise a same set of modules or leader capabilities as the leader drone, and other types of assets comprise a subset of the modules or leader capabilities. For example, the semi-autonomous drones within the set of assets may comprise a same set of modules or capabilities as the leader drone, and an autonomous tower, sensor, or satellite in the set of assets may have a different set of asset and may not comprise capabilities sufficient to become a leader of the set of assets.

Device 300 may use communication module 310 to communicate with the set of assets, another server or terminal (e.g., server 105 of system 100 of FIG. 1), etc. For example, communication module 310 may provide to communication interface 302 that is to be communicated. As another example, communication interface 302 may provide to communication module 310 information received by device 300. In response to receiving information from communication interface 302, communication module 310 may provide a corresponding module with such information. For example, in the case of receiving an indication that device 300 is to implement an operation, communication module 310 may provide such indication to planner service module 320. As another example, in the case of receiving feedback information from one or more follower drones during performance of the operation, communication module 310 may provide the feedback information to the feedback information module 370 and/or planner service module 320, etc.

According to various embodiments, planning of the manner by which the operation, a task, or element is to be performed flows down through the different entities in the system. The server that configures the operation may determine operation parameters and provide such parameters to a leader drone, and/or determine a high-level pre-plan by which a set of assets is to perform an operation and provide such pre-plan to a leader drone. Next, the leader drone may determine a plan that is lower-level than the parameters or pre-plan for the operation that was received from the server. The plan determined by the leader drone may autonomously fill in some gaps of the information received from the server in connection with performing the operation. The leader drone may provide the plan to perform a task or element of a task to one or more follower drones. In response to receiving the plan from the leader drone, the one or more follower drones may respectively determine a manner by which to implement the plan, including autonomously filling in the gaps in the plan received from the leader. The foregoing framework enables the system such as system 100 of FIG. 1 to be a modular system that supports hierarchical planning, which such corresponding planning by a leader drone and/or follower drone may be autonomous. In some embodiments, assets within the set of assets may advertise a level of planning or tasks that they respectively support. The leader drone may determine the corresponding plans for the assets within the set of assets based on the level of planning or tasks supported by the follower assets. For example, a follower drone with a more robust planning service may not require as detailed a plan as an asset with a rudimentary planning service (or no planning service at all). In some embodiments, the leader drone stores a mapping of planning capabilities or task capabilities to assets, and may use such mapping in connection with determining the respective plans for the follower assets. According to various embodiments, at least one follower drone has capability to run a robust planning service that is the same, or substantially the same, as the planning service run by the leader drone.

According to various embodiments, in response to receiving an indication that device 300 is comprised in a set of assets (e.g., from a server such as a server providing an operation control service), device 300 autonomously determines (e.g., generates) a plan for performing one or more tasks associated with an operation, and device 300 communicates at least part of a plan to one or more other assets. Device 300 may be a leader asset (e.g., a leader drone) among the set of assets for performing the one or more tasks associated with the operation. Device 300 may receive information pertaining to the operation that the set of assets is to perform. The information pertaining to the operation may include high-level definition or description of the operation. As an example, the high-level definition or description of the operation may include a high-level task to be performed (e.g., surveillance of an area or a target, delivery of a payload, etc.). Examples of information comprised in the high-level definition or description of the operation include one or more of (i) an indication of the set of assets, (ii) certain parameters of the operation such as a location, an indication of a restricted zone in which the assets are not to enter/operate, an indication of an area/zone in which the assets are to operate, etc., (iii) capabilities associated with the operation, and/or (iv) a pre-plan for performing the operation (or task thereof). In some implementations, the information pertaining to the operation is communicated to only the leader asset (or the leader asset and the dormant leader) among the set of assets. In response to receiving the information pertaining to the operation, the leader asset may communicate an indication of the set of assets to the other assets within the set of assets (e.g., to the follower drones).

In some embodiments, the information pertaining to the operation is sent to only a leader asset (e.g., a leader asset) of the set of assets. The information pertaining to the operation may also be sent to a dormant leader of the set of assets (e.g., which may also referred to herein as a secondary leader), and the dormant leader may be a backup to the leader asset that synchronizes operation information (e.g., current operation status, plans for performance of various tasks, etc.). In this manner, the dormant leader may have a complete backup of the operation information stored/managed at the leader asset. In some embodiments, the dormant leader is selected based on a negotiation among a plurality of assets within the set of assets (e.g., a negotiation among the semi-autonomous drones in the set of assets). An asset may be selected as the dormant leader for an operation based at least in part on a determination of one or more capabilities comprised in the asset, and/or an ownership availability (e.g., a lease or ownership is available for the duration of the operation), etc. For example, an asset may be selected as the dormant leader based at least in part on a determination that the dormant leader has one or more predefined capabilities (e.g., a planning service module), etc. As another example, an asset may be selected as the dormant leader based at least in part on a determination that the asset has a certain set of capabilities which match a set of capabilities of the leader asset (e.g., the dormant leader has all the capabilities of the leader asset, the dormant leader has all the planning or operation management capabilities of the leader asset, etc.). As another example, an asset may be selected as the dormant leader based at least in part on a determination that the asset is a best fit as the dormant leader among the other assets in the set of assets.

In some embodiments, a plurality of assets in the set of assets (e.g., each of the assets, each of the drones in the set of assets, etc.) may receive an indication of the set of assets. The indication of the set of assets may comprise information identifying the assets in the set of assets. The indication may further comprise an indication of the various capabilities of the assets in the set of assets. In some implementations, each asset in the set of assets (e.g., each member of the team performing the operation) may have knowledge of all other assets within the set of assets. Follower assets receive the indication of the set of assets from the leader asset for the set of assets, or the follower assets may receive the indication of the set of assets from a server (e.g., the server providing an operation control service). An asset may be determined to be the leader asset (e.g., the leader drone) for the set of assets based on a predefined leader ranking of assets, a negotiation among at least a subset of the set of assets, etc. In some implementations, the predefined leader ranking is input by a user, such as during configuration of the operation. In other implementations, the leader ranking is negotiated (or the predefined leader ranking is updated) by at least a subset of the set of assets, etc.

According to various embodiments, in response to receiving the information pertaining to the operation, the leader asset (e.g., leader drone) autonomously determines a plan for performing a task associated with the operation (or an element of a task of the operation). The leader asset may communicate at least part of a plan for performing the task or an element of the task to at least one follower asset, such as the follower asset that is determined to perform the task or the element of the task. The leader asset may determine plans for performing the task or the element of the task on a task-by-task basis, an element-by-element basis, or a follower asset-by-follower asset (e.g., a follower drone-by-follower drone basis). In some embodiments, the leader asset determines an individualized plan for a follower drone that the follower drone is to use in connection with performing the corresponding task or element of the task. The leader asset may determine individualized plans for each follower drone in the set of assets, for each follower drone having a currently assigned task or element of the task, etc.

In some embodiments, device 300 uses planner service module 320 in connection with determining the plan for performing a task or an element a task. In the case of device 300 being a leader drone, planner service module 320 may determine a plan for the set of assets to perform the operation (e.g., one or more tasks or elements of tasks associated with the operation). For example, planner service module 320 may determine a plan(s) that one or more follower drones are to implement in connection with performing a task or element of a task. The plan may be determined based on one or more parameters of the operation, and the set of assets. In some embodiments, the plan(s) may be determined based at least in part on a capability associated with the corresponding task or element of the task, and a capability of a follower drone. For example, planner service may determine one or more follower drones having a capability matching the capability associated with the corresponding task or element of the task, and determine at least one of such follower drones to be assigned to implement at least part of the task or element. In some embodiments, the plan determined by device 300 is a lower-level plan than a pre-plan (if any) received from the server (e.g., in connection with the instruction to perform the operation). For example, device 300 may determine a more specific implementation of the task or element than is provided in a corresponding pre-plan. An example is in the context of a road search (e.g., an operation to search a particular set of roads): the high level operation may a search polygon that comprises some set of roads and a set of prior target locations—places at which the target was believed to be located at some point in time. The leader drone may evaluate the set of roads contained in the polygon and diffuse the prior target probabilities across the roads, then assign assets (e.g., follower drones) to the highest priority and closest roads (e.g., to perform a search of those roads). The lower level plan provided to the follower drone will comprise roads for the follower drone to scan along and the order in which to scan these roads.

In some embodiments, device 300 uses planner service module 320 in connection with determining a manner for implementing a received plan. In the case of device 300 being a follower drone, in response to receiving a plan for performing a task or element of a task, device 300 may use planner service module 320 to plan an implementation of the plan. For example, planner service module 320 may determine an even more low-level plan to implement the plan received from the leader drone. The planner service module 320 may determine a particular manner to control device 300 to perform the assigned task or element of the task. As an example, if device 300 receives a plan to perform surveillance of a defined area, device 300 may obtain information pertaining to the area, such as a location of various obstacles or objects, and determine a path for moving device 300 within the area while avoiding the obstacles or objects. As another example, even if the plan received from the leader drone includes a defined path along which device 300 is to move, device 300 may perform dynamic monitoring of the area to perform collision avoidance during implementation of the plan, etc. In some embodiments, a follower drone receives a detailed plan from the leader drone that effectively identifies the different steps to be taken by the follower drone. The follower drone may implement the steps as defined by the leader drone, with dynamic monitoring or updating of the plan to prevent asset failure or to maintain the follower drone on course to implement the plan.

According to various embodiments, device 300 uses planner service module 320 in connection with determining a discrete representation of the geographic location associated with the operation or in which at least one asset of the set of assets is to perform the one or more tasks. As an example, the discretized representation comprises a plurality of discrete elements each corresponding to a volume in the geographic location. As another example, planner service module 320 determines the discrete representation in connection with determining a plan for device 300 or for an asset in the set of assets that are to perform the one or more tasks.

In some embodiments, after the discrete representation is determined (e.g., in response to determining the discrete representation of the geographic location), device 300 uses planner service module 320 to annotate the discrete representation such as to create an annotated representation. As an example, planner service module 320 annotates the discrete representation based at least in part on received information pertaining to the one or more tasks and/or the geographic location. Planner service module 320 annotates the discrete representation based at least in part on current information pertaining to the one or more tasks and/or the geographic location. The current information corresponds to information that device 300 stores, or to which device 300 has access, at a time when the annotated representation is created. In some embodiments, the system updates the annotated representation based at least in part on received information pertaining to the one or more tasks and/or the geographic location. For example, the system may iteratively update the annotated representation at periodic intervals, as updated or new information pertaining to the one or more tasks and/or the geographic location is received, etc. The annotated representation may be updated until the one or more tasks are complete (e.g., until a determination that the operation is complete, abandoned, paused, etc.). In some embodiments, the annotating the discretized representation of the geographic location includes respectively associating metadata with one or more discrete elements of the discretized representation. The metadata may include a value or indication associated with the one or more tasks, the geographic location, etc.

An example of annotating the discretized representation includes setting metadata associated at least a subset of the plurality of discrete elements to set a keep-in area (e.g., an area in which device 300 or an asset(s) in the set of assets are to be kept) or a keep-out area (e.g., an area in which device 300 or an asset(s) in the set of assets are to be kept out/prevented from entering). For example, each discrete element in the subset of discrete elements has a corresponding metadata field(s) corresponding to a keep-in indicator and/or a keep-out indicator. As an example, the keep-in area and/or keep-out area is configured in connection with configuration of the operation (e.g., the user inputs the keep-in area(s) and/or keep-out area(s), certain predefined keep-in and keep-out areas are set such as based on restricted airspace, etc., a third party service provides an input that sets the keep-in area(s) and/or keep-out area(s), etc.).

Another example of annotating the discretized representation includes setting metadata associated at least a subset of the plurality of discrete elements to set a location of one or more targets of the operation. In the case of an operation to perform surveillance of a particular target, the configuration of the operation includes obtaining a current location of the target, such as an expected location, a last known location, etc. As an example, a user sets the current location of the particular target in connection with configuring the operation. Planner service module 320 determines the particular discrete element corresponding to the current location of the particular target, and sets a metadata field(s) associated with the particular discrete element to indicate that the target is located at/within the discrete element. As another example, in the case of an operation to perform surveillance of a particular target(s) such as a building or a road, planner service module 320 determines the discrete elements corresponding to (or comprising) the particular target(s) such as the building or the road, and sets metadata field(s) corresponding to the discrete elements to indicate that the particular target(s) are comprised in the discrete elements.

Another example of annotating the discretized representation includes setting metadata associated at least a subset of the plurality of discrete elements to define a communication line of sight among assets, between an asset and a leader drone, between a leader drone and a ground control station, etc. As an example, the setting of the metadata to define the communication line of sight includes indicating for a particular discrete element whether a communication line of sight is obtainable if an asset is located at the geographic location corresponding to the particular discrete element.

Another example of annotating the discretized representation includes setting metadata associated at least a subset of the plurality of discrete elements to indicate whether the discrete element(s) are occupied or unoccupied. As an example, a discrete element is deemed occupied if an asset (e.g., an asset of the set of assets, another friendly asset that is not within the set of assets, etc.) is comprised in the discrete element. As another example, discrete element is deemed occupied if an asset is unable to travel to the discrete element such as because there is insufficient space within the discrete element to hold the asset without a risk of collision (e.g., a risk of a collision exceeding a threshold risk) with another asset or object such as a building, a tree, a mountain, etc. In some embodiments, planner service module 320 sets the metadata associated with a discrete element to indicate whether the discrete element is occupied or unoccupied in connection with registering or storing a flight plan. For example, device 300 determines a flight plan for an asset in the set of assets, or receives information pertaining to flight plan from an asset in the set of assets, planner service module 320 determines the discrete element(s) impacted by the flight plan (e.g., a set of discrete elements intersecting the flight plan), and sets metadata for such discrete element(s) to indicate that such discrete element(s) are occupied. The setting of the discrete elements corresponding to a flight plan as occupied may ensure that another flight plan intersecting the flight plan is not created or registered. For example, device 300 and/or other assets to which the annotated representation or model is published (or the information from which the annotated representation can be created) use the annotated representation in connection determining a new flight plan, and the annotated representation includes discrete elements set as occupied for existing flight plan (e.g., at least for an expected period of time corresponding to the flight plan). In some embodiments, planner service module 320 additionally sets a threshold number of adjacent discrete elements that are adjacent to a set of discrete element(s) corresponding to a flight plan. The adjacent discrete elements may serve as a buffer to provide additional clearance between the existing flight plan and any subsequently created flight plan, etc. The threshold of adjacent discrete elements may be configurable. As an example, for any particular discrete element corresponding to a flight plan, planner service module 320 sets, as occupied, N discrete elements in all directions of the particular discrete element, where N is a positive integer.

In some embodiments, device 300 uses planner service module 320 to update the annotated representation based at least in part on received information pertaining to the one or more tasks and/or the geographic location. For example, planner service module 320 iteratively updates the annotated representation such as at periodic intervals (e.g. a default interval, a configurable interval, etc.) after updated or new information pertaining to the one or more tasks and/or the geographic location is received, etc. As an example, planner service module 320 updates the annotated representation the one or more tasks are complete (e.g., until a determination that the operation is complete, abandoned, paused, etc.). In some embodiments, the annotating the discretized representation of the geographic location includes respectively associating metadata with one or more discrete elements of the discretized representation. The metadata may include a value or indication associated with the one or more tasks, the geographic location, etc. The iterative or continuous updating of the annotated representation refines the model of the geographic location or operation. For example, a resolution of an amount or type of information comprised in the model is improved as additional information is obtained regarding the geographic location, such as via an asset deployed at a particular location (e.g., a follower drone).

According to various embodiments, planner service module 320 uses the annotated representation in connection with determining a plan to perform the one or more tasks. For example, planner service module 320 uses metadata associated with discrete elements in the discretized representation to determine a destination for one or more assets in the set of assets, to determine a path(s) for the one or more assets, to determine an element to be performed by a particular asset, etc. In some embodiments, the resolution of the model of the geographic location/operation improves such as through receiving feedback information (e.g., updated information pertaining to a task or an element of a task, or information pertaining to a part of the geographic location of an asset) from an asset such as a follower drone. As the resolution of the model of the geographic location/operation improves, the plan to perform the one or more tasks is updated (e.g., refined).

According to various embodiments, device 300 uses a mapping of capabilities to assets in connection with assigning tasks or elements of the operation, and/or to determine a plan for a particular follower asset to perform the task or element. In the case of device 300 being a leader drone, device 300 may store mapping of capabilities to assets 330 locally at device 300, and query the mapping of capabilities to assets to assign the tasks or elements, or to determine a plan. At the beginning of an operation (e.g., in response to receiving an instruction to perform an operation), the leader drone can receive a current set of capabilities for the various assets within the set of assets. For example, the leader drone can cause the set of assets to provide the leader drone with the current capabilities (e.g., send a request to the follower drones to register their corresponding capabilities with leader drone). As another example, the leader drone may receive the set of capabilities for the various assets within the set of assets from a server. The leader drone may update mapping of capabilities to assets 330 during performance of the operation. For example, the leader drone may ping/request the follower drones to provide an update on a then-current set of capabilities for the respective follower drones, and leader drone may update the mapping accordingly. As another example, the leader drone may determine an update to the capabilities of a particular follower drone based on feedback information communicated by the follower drone to the leader drone during performance of the operation (e.g., implementation of the plan by the follower drone). Device 300 may determine from the feedback information that a particular sensor or camera from the follower drones is not functioning properly or has failed (e.g., the feedback information may have no intelligible signal associated with normal operation for such sensor/camera).

According to various embodiments, device 300 may use a mapping of capabilities to an asset in connection with implementation of a plan, and/or use the mapping to maintain a current status of the capabilities of asset. In the case of device 300 being a follower drone, device 300 may provide to the corresponding leader drone a current set of capabilities of the follower drone, or a status of the different capabilities in the capability set associated with the follower drone (e.g., an indication of whether a particular capability is fully operable, partially operable, or out of order, etc.). Device 300 may provide such information to the leader drone at predefined intervals, in response to a request from the leader drone, or in conjunction with feedback information communicated to the leader drone during implementation of the plan.

According to various embodiments, the set of asset assigned to perform an operation may be dynamically updated during performance of the operation. For example, assets within the set of assets may be modified/updated in response to (i) a user request to reallocate an asset in the set of assets to another operation, (ii) a loss of ownership of an asset within the set of assets, (iii) a loss of capability of an asset within the set of assets (e.g., if a capability required to complete the operation is lost during performance of the operation, a new/additional asset with such capability may be assigned to the set of assets, (iv) a user input to change a speed by which the operation is expected to be completed (e.g., an additional asset(s) is added to speed up completion, or an asset is removed from the set of assets if the user determines to slow down the completion), (v) a cost function associated with performance of a plurality of operations indicates that a more optimal completion of the plurality of operations includes use of an additional asset or reassignment of an asset from the set of assets, (vi) a determination that an asset in the set of assets has failed, (vii) a condition of defined within the operation being satisfied (e.g., under a surveillance operation, a condition may include detection of a target upon which another or different asset is assigned to intercept the target, etc.). The set of assets may be dynamically updated in response to various other contexts. The set of assets may be dynamically updated by the server, the leader drone, or both.

In some embodiments, dynamic grouping module 340 may be used in connection with dynamically updating the set of assets. Device 300 may use dynamic grouping module 340 to determine whether another asset is to be added to the set of assets, and/or whether an asset is to be released from the set of assets. In response to dynamic grouping module 340 determining to update the set of asset, dynamic grouping module may provide such an indication to various other modules, such as to planner service module 320 to update or create new plans for implementation of the tasks or elements using an updated set of assets, or to mapping of capabilities to assets 330 to update a mapping of capabilities for the updated set of assets, or to communication module 310 to inform the server of the update or to request such an update from the server, or to an ownership module 350 to request/update ownership of an asset to be added to, or released from, the set of assets.

According to various embodiments, a leader drone may manage ownership of assets within the set of assets. In response to receiving an indication that the leader drone is within a set of assets to perform the operation, the leader drone may obtain the corresponding ownership permissions and/or ownership status for the assets within the set of assets (e.g., a transfer of ownership of the corresponding assets to the organization for which the operation is being performed, as applicable). A transfer of ownership may correspond to a transfer of ownership of an asset for (i) part of the operation such as for performance of a particular task or element, (ii) duration of the operation, (iii) an indefinite period (e.g., a permanent transfer of ownership until the transferee organization releases ownership). An ownership permission may include an automatic takeover (e.g., that permits the ownership to be transferred to the transferee organization/leader drone upon request), a negotiation of the acceptance/rejection of an asset takeover (e.g., a conditional transfer pending an arising need of transferor organization, a defined time period/lease during which ownership is transferred, a defined task/element for which ownership is transferred, etc.). An ownership status may indicate whether an asset is available for transfer to the leader drone (or organization for which leader drone is performing the operation), an asset is unavailable for transfer, a set of conditions under which an asset may be transferred or not transferred, etc. In some embodiments, the leader drone may obtain the ownership permissions and/or ownership status based on a querying of an ownership service (e.g., a third party service or centralized service to which various organizations can register assets/transfer ownership), query a mapping of assets to ownership stored locally or remotely at the server managing the operation (e.g., the server that configured the operation), and/or querying the various assets within the set of assets (e.g., each asset may store its corresponding ownership permissions and/or ownership status, and/or a protocol by which the leader drone may request an ownership transfer). The leader drone may use ownership module 350 to manage/update the ownership of assets within the set of assets and/or to negotiate or request transfer of an asset to/from the set of assets. For example, in response to an indication that an asset is to be added to the set of assets, or that ownership of an asset in the asset is required or to be updated, the ownership module 350 may be called to request/arrange for the transfer of ownership of the asset.

During the course of performing an operation, the leader drone may determine that the operation (or a task/element of the operation) may be performed more effectively or efficiently by one or more subsets of the set of assets, the leader drone may partition the set of assets. The leader drone may determine a manner by which to partition the set of assets. For example, the various partitions may be determined based on capabilities of the tasks/elements to be performed by the various partitions and/or capabilities of the assets within the set of assets. In some embodiments, a partition is assigned a corresponding leader asset. For example, each partition has a corresponding leader drone. Accordingly, a follower drone may be elevated to a position of leader drone of a particular partition. The leader drone of the set of assets may be a primary leader, and the various partition leaders may report feedback information such as a status of the task/element to which the partition is assigned. The primary leader may in turn aggregate the feedback information received from the partition leaders and/or any assets that report directly to the primary leader (e.g., an asset within the same partition as the primary leader), and provide feedback information to the server, and/or provide an instruction to the partition leader(s) such as a modification to a task or element assigned to the partition(s). In response to a partitioning of the set of assets, the primary leader may provide the partitions (e.g., the partition leaders) with an instruction to perform a task or element that the primary leader has assigned to the partition. In response to receiving the indication that the partition is to perform a task or element, the partition leader may determine a plan for the corresponding set of partitioned assets. As an example, the partition leader may serve a role with respect to the partition such that the role is similar to that served by the primary leader with respect to the set of assets (e.g., before partitioning). Similarly, a partition may have one or more follower assets that (i) receive plans from the partition leader, (ii) implement the plans received from the partition leader, and/or (iii) communicate feedback information to the partition leader. According to various embodiments, in response to a determination that a partition has completed the task/element assigned to the partition, the partitioned assets may be (i) re-aggregated into the set of assets (e.g., with the partition corresponding to the primary leader), (ii) reallocated to another partition to assist with completion of the task/element assigned to such other partition, or (iii) disbanded from the set of assets (e.g., released to perform a different operation for another leader or organization). In some implementations, in the event that a partition is created, a set of constraints within which the partition is to operate may be determined. The primary leader drone may provide the set of constraints to the corresponding partition leader.

According to various embodiments, device 300 uses partitioning module 360 in connection with determining whether to partition the set of assets and a manner by which the set of assets are to be partitioned. Partitioning module 360 may determine assets to be comprised in the various partitions. In response to a determination that a partition has completed a task/element assigned to the partition, if the assets within the partition are to be assigned to a different partition or re-aggregated into the set of assets, then partitioning module 360 may determine whether the partition to which such assets are to be comprised. In some embodiments, a partition is redeployed to perform a different task/operation after the completion of a task/operation assigned to the partition (e.g., the primary leader, or the planner service module on the primary leader, determines to assign a different task/operation).

Device 300 may send/receive feedback information pertaining to performance of an operation. In the case that device 300 is a leader drone, device 300 may receive feedback information from one or more follower drones, such as information obtained by a sensor/camera of the follower drone, a status of a task/element assigned to the follower drone, a status of a task/element assigned to the follower drone, a drone status, a status or update to a capability of the drone, etc. In addition, or alternatively, device 300 may send feedback information to a server such as the server that is managing an operation (or that configured the operation). For example, the leader drone may send a status of the operation, a live feed of information obtained by one or more sensors among the set of assets, a request for further instructions with respect to the operation, etc. In the case that device 300 is a follower drone, device 300 may send to the leader drone feedback information such as information obtained by a sensor/camera of the follower drone, a status of a task/element assigned to the follower drone, a drone status, a status or update to a capability of the drone, etc. Device 300 may use feedback information module 370 to communicate feedback information. Feedback information module 370 may receive feedback information, determine various parts of information comprised in the feedback information, and route the information to a corresponding module. As an example, in the event that feedback information comprises an indication that a sensor on a follower device has failed, feedback information module 370 may determine that such information pertains to a capability of an asset and provide such information to the mapping of capabilities to assets 330 so that the mapping of capabilities to assets in the set of assets is updated. As another example, in the event the follower drone communicate sensor information (e.g., an image, a live feed, a weather status, etc.) to the leader drone, feedback information module 370 may determine such sensor information among the feedback information and provide such information to the planner service module in order for the leader drone to be able to use such information in connection with determining a status of the operation and/or determining whether to update a plan for the follower drones (or other follower drones).

According to various embodiments, a team of assets is dynamically managed through performance of the operation, such as from a time that the operation is configured to a time at which the operation is completed. Assets may be added/removed from the set of assets assigned to perform the operation during performance of the operation. The determination to add/remove an asset may be performed at the server. In some instances, the determination to add/remove an asset may be performed by a leader drone of the set of assets. Dynamic management of the team provides an extensible framework that can adjust for changes among the set of assets, unexpected or conditional events occurring during performance of the operation, or changes in the configuration of the operation such as user-drive changes to the operation. Examples of changes among the set of assets may include an asset failure, a failure/loss of a capability of an asset, a partitioning of the set of assets (e.g., the set of assets may only have one occurrence of a particular capability that is required by multiple partitions, thereby causing a desire to add an asset with the particular capability), etc. Examples of unexpected or conditional events occurring during performance of the operation may include a new target appearing during surveillance of an area, a weather or environmental change that necessitates a certain capability or for which such capability may improve effectiveness (e.g., a larger drone to withstand inclement weather such as higher winds, rain, etc.), an operation stretching into nighttime thereby increasing the effectiveness of having a night vision capability, etc. Examples of changes in the configuration of the operation may include a user request to complete the operation faster (e.g., to speed up performance by the set of assets), a user request or other determination to prioritize another operation, a user request to pause the operation, etc. In some embodiments, in response to determining that a new asset is to added to the set of assets, the server sends to the leader an indication that the new asset is now included in the set of assets. In turn, the leader drone may correspondingly determine the plan for performing the operation and/or manage the ownership of the new asset (e.g., obtain the applicable ownership of the new asset). In some embodiments, in response to a follower drone is removed from the set of assets, an instruction is sent to the follower drone that indicates that the follower drone is no longer part of the set of assets. The server and/or the leader drone may send such instruction to the follower drone.

According to various embodiments, in response to a determination that a follower drone has failed during performance of the operation, the leader drone may update the plan for performing the operation. For example, the leader drone may determine a status of the tasks/elements that were assigned to the follower drone that failed and reassign remaining portions of the task/elements (or the tasks/elements in their entirety) to another asset in the set of assets. The leader drone may update the capabilities of the set of assets in response to a follower drone failure, and the leader drone may use the updated capabilities to reassign/reallocate the elements of the plans to other follower drones. In some embodiments, in response to determining that a follower drone failed, the leader drone may add an additional asset to the set of assets, or send a request (e.g., to the server) to add the additional asset. For example, the leader drone may identify one or more capabilities of the failed follower drone and seek to replace those capabilities (or those capabilities for which the set of assets had no or insufficient redundancy). A leader drone may determine that a follower drone has failed in response to a determination that the leader drone has not received feedback information from the follower drone within a predefined period of time and/or by an expected time (e.g., the expected time may be based on the plan currently assigned to the follower drone, such as in the case when the follower drone is expected to be out of communication for a period of time). In some implementations, if the leader drone has not received feedback information from the follower drone within the predefined period of time or by the expected time, the leader drone may send to the follower drone a ping for a health status of the follower drone, and in response to the follower drone failing to reply to the ping (e.g., within a threshold period of time), the leader drone determines that the follower drone has failed. In some implementations, the server may determine that a follower drone has failed based at least in response to a determination that the server has not received any information or pings from the follower within a predefined period of time and/or by an expected period of time, and the server may inform the leader drone that the follower drone has failed.

According to various embodiments, in response to a determination that a leader drone has failed during performance of the operation, a remaining asset in the set of assets is elevated to leader status and such asset is the new leader drone for performance of the operation. The leader drone may be determined to have failed if the leader drone dies or loses communication with a subset or all the assets. The remaining assets in the set of assets may negotiate to resolve new leadership among the set of assets. The negotiation to resolve the new leadership may be based at least in part on a leader ranking of assets (or a priority list of assets) in the set of assets. The leader ranking may be a predefined ranking that is determined during configuration of the operation and that is provided to all assets in the set of assets, or that is provided to at least one asset other than the initial leader asset), and the highest ranking asset among the remaining assets is elevated to new leader drone. In some implementations, the remaining assets negotiate a new leader ranking of assets, and the highest ranking asset among the remaining assets is elevated to new leader drone. In some embodiments, if a dormant leader is comprised in the set of assets (and the dormant leader is among the remaining assets), the dormant leader is automatically elevated to new leader done.

According to various embodiments, a partition may form based on a network or communication failure. For example, if a subset of assets loses communication with the leader drone, the subset of assets may determine (individually or collectively) that the leader drone has failed. In response to a determination that the leader drone has failed, the subset of assets may form a group of assets (e.g., a partition) and the subset of assets may negotiate a partition leader. If a partition leader is resolved, the partition leader may determine a plan for the partition to continue performing the operation (or the collective tasks/elements that were assigned to the subset of assets). The partition leader may attempt to establish a communication with the server and/or another partition associated with the same operation. In response to establishing communication with the server, the partition leader may provide feedback information pertaining to the performance of the operation (or the part of the operation being performed by the partition). In response to establishing communication with a partition leader of another partition, the partition leader may request, or otherwise attempt, to group the two partitions, or the partition leader may provide to the other partition leader feedback information pertaining to the operation. In some embodiments, the different partition leaders may negotiate a division of the tasks/elements associated with the operation so that the different partitions perform different parts of the operation. A partition may have predefined or negotiated constraints within which the partition is to operate. Examples of the constraints include geographical limits, time limits, restrictions on certain actions (e.g., restriction against engaging with a target), etc.

In some embodiments, if a partition leader has failed, the remaining assets in the partition may failover to a partition or group of assets (e.g., the partition having a leader drone corresponding to the highest ranking leader in a predefined leader ranking). The remaining assets in the partition may failover to a predefined partition or group of assets in response to if a new partition leader cannot be resolved.

According to various embodiments, each operation has a default plan that is to be implemented by the assets within the set of assets in the event that new leadership cannot be resolved. For example, the default plan may be that each asset returns to its respective home in response to a determination that the new leadership cannot or is not e.g., within a predefined period of time) resolved.

Device 300 may use asset failure module 380 in connection with determining that an asset has failed, and to determine the failover protocol to implement in the event that an asset is determined to have failed. For example, in the case that the asset that failed was the leader drone, asset failure module 380 may determine to negotiate with the remaining assets to resolve the new leader drone. As another example, in the case that the asset that failed was a follower drone, if device 300 is the leader drone, asset failure module 380 may determine to reallocate parts of the plan assigned to the failed follower drone among the remaining assets.

According to various embodiments, in addition to determining a plan for performing a task or element, the leader drone determines a manner by which to communicate the plan to a follower drone. The leader drone may determine the manner by which to communicate the plan based on a communication link between the leader and the follower drone, a quality of the communication link, etc. In some embodiments, the leader drone may determine the manner by which to communicate the plan based on an expected quality of communication between the leader drone and follower drone at a future time (e.g., at a certain point in performance of the task/element). For example, the leader drone may determine that in connection with performing a task a follower drone will travel to another side of a mountain and that the follower drone may lose communication with the leader drone, or that the communication link is likely to have a relatively poor quality of service. In response to such a determination, the leader drone may determine to provide a greater extent of the plan for the follower drone to perform the task/operation. As another example, if the leader drone determines that a current communication link is relatively poor (e.g., a slow speed/ low bandwidth), and in response to such a determination the leader drone may determine to send only a relatively small portion of the plan for the operation to the follower drone, and to send a larger portion of the plan at a future time when the communication link is better or expected to be better. According to various embodiments, the leader drone may determine the granularity with which the plan is to be broken up and communicated to the follower drone based on a network status and/or a network constraint. The network status and/or network constraint used in such a determination may be a current status/constraint or an expected status/constraint at a particular future point in time. Examples of a network constraint may be one or more values pertaining to one or more of network topology (e.g., regions where a network is accessible by the leader drone or follower drone), a communication bandwidth, a link quality, etc. The determination of the granularity with which the plan is to be broken up/communicated to the follower drone, and/or a manner by which the plan is to be communicated to the follower drone, may be a part of the planning process performed by the leader drone. For example, the leader drone may plan the operation in phases and serially send the parts of the current plan or part of the plan in phases of the operation. Similarly, in some embodiments, the server managing/configuring the operation may determine a manner/ extent to which information pertaining to the operation (e.g., operation parameters) are to be communicated to the leader drone based at least in part on a network status and/or a network constraint, and/or a planning service capability of the leader drone.

Figure 4A:
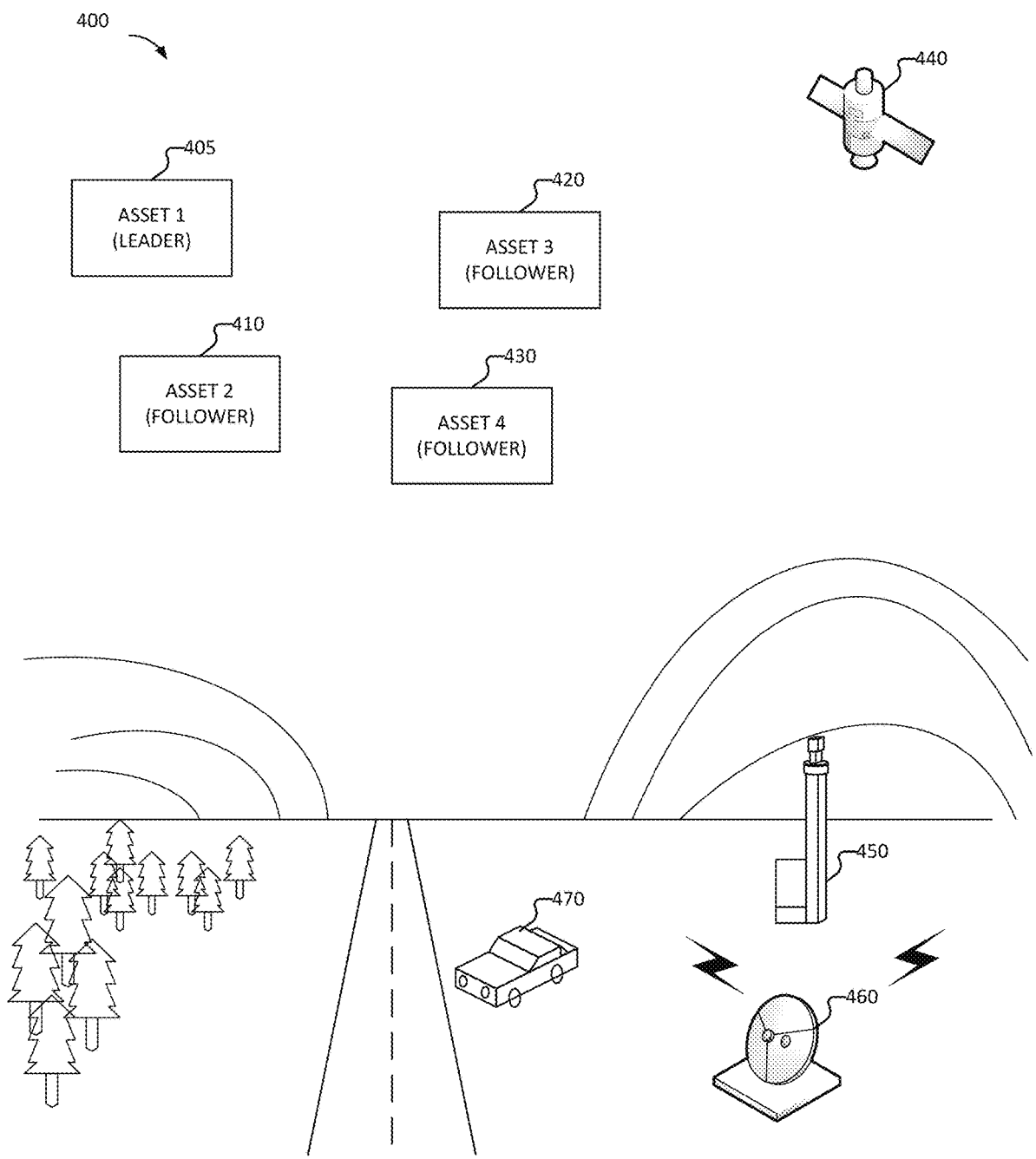
FIG. 4A is a diagram illustrating a system for implementing at least part of an operation according to various embodiments of the present application.

FIG. 4A is a diagram illustrating a system for implementing at least part of an operation according to various embodiments of the present application. In the example illustrated in FIG. 4A, system 400 may comprise a set of assets (e.g., assets 405, 410, 420, 430, 440, and/or 450) and a control center 460, such as a server providing an operation control service. System 400 may be implemented by system 100 of FIG. 1. Control center 460 may be implemented by device 200 of FIG. 2. One or more of the set of assets may be implemented by device 300 of FIG. 3. For example, asset 405, asset 410, asset 420, and/or asset 430 may be implemented by device 300 of FIG. 3. In some embodiments, asset 405, asset 410, asset 420, and/or asset 430 are semi-autonomous drones. Asset 440 may be a satellite in communication with control center 460 and/or another asset such as asset 405. Asset 450 may be a tower such as a semi-autonomous tower. Asset 450 may be in communication with control center 460 and/or another asset such as asset 405.

In the example illustrated in FIG. 4A, the set of assets may be instructed to perform an operation. For example, the operation may be a tracking of vehicle 470 and/or surveillance of the road (and tracking of a particular vehicle or any vehicle travelling along the road). Control center 460 may configure the operation and provide the operation parameters to the set of assets, such as asset 405. Asset 405 may be determined to be the leader asset, and the other assets (e.g., asset 410, asset 420, and/or asset 430) may be determined to be follower assets. In response to the leader asset receiving the operation parameters and pre-plan, if any, from the control center 460, the leader asset may determine the plans for the different follower assets to perform tasks or elements of the operation. Continuing with the example above, leader asset may determine a plan for follower asset 2 (asset 410) to track vehicle 470, a plan for follower asset 4 (asset 430) to perform surveillance of a first part of the road, and a plan for follower asset 3 (asset 420) to perform surveillance of a second part of the road. In response to determining the plans for the follower assets, the leader asset may correspondingly send the plans to the respective follower assets. The follower assets may implement the plans in response to receiving the plans from the leader drone, and the follower assets may fill in any gaps in the plan provided by the leader drone. Leader asset may determine that asset 440 (e.g., the satellite) is to provide surveillance of the road and tracking assistance with vehicles that drive along the road. Leader asset may determine a plan for asset 450 to capture information pertaining to the area/environment using one or more sensors. The captured information may be provided back to the leader asset as feedback information, which may be used by the leader asset to update the plans for the various assets in the set of assets.

Figure 4B:
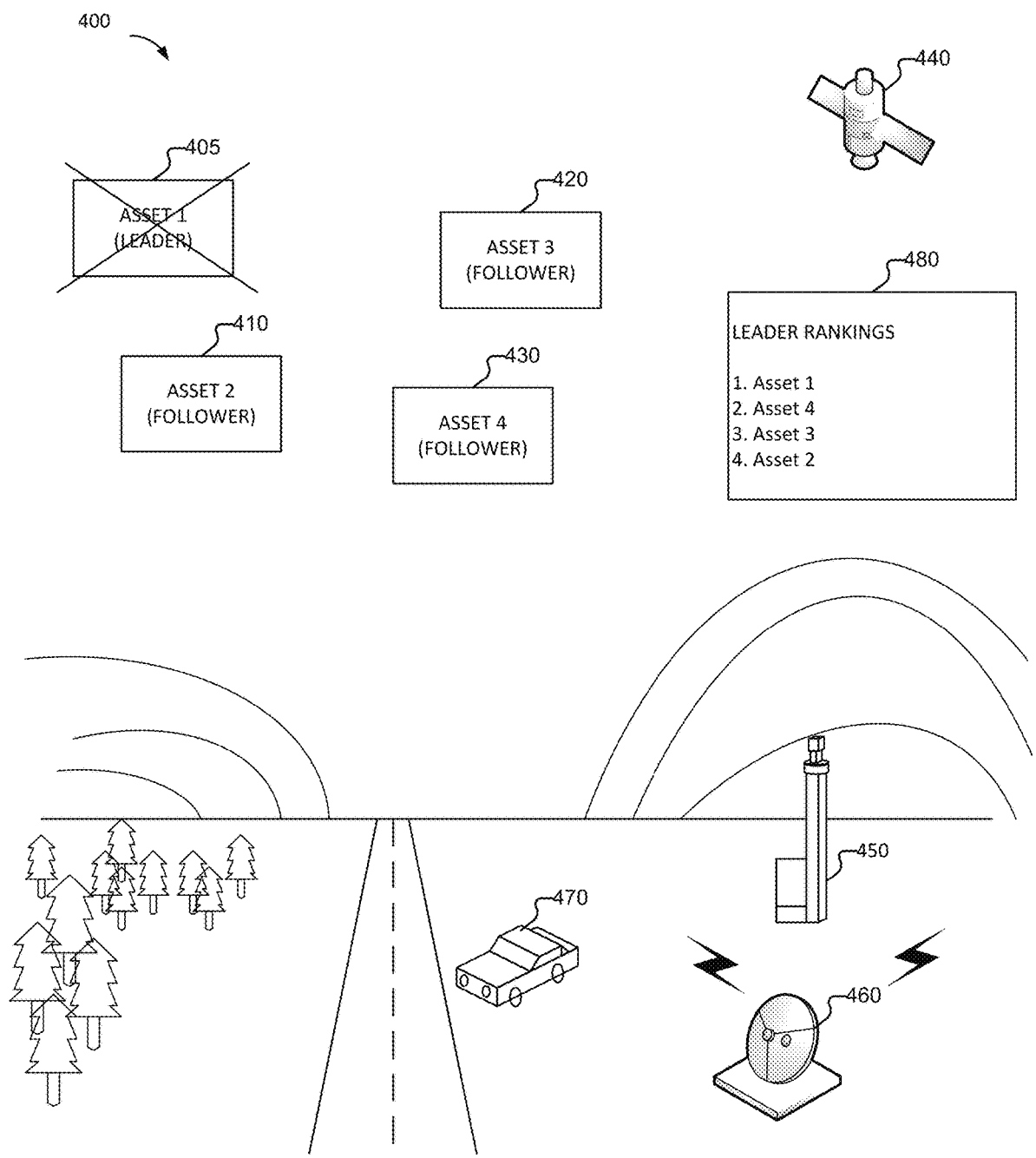
FIG. 4B is a diagram illustrating a system for implementing at least part of an operation according to various embodiments of the present application.

FIG. 4B is a diagram illustrating a system for implementing at least part of an operation according to various embodiments of the present application. In the example of system 400 illustrated in FIG. 4B, the leader asset (asset 405) is determined to have failed. In response to determining that the leader asset has failed, a determination of a new leader for the set of assets is resolved among the remaining assets. For example, asset 410, asset 420, and asset 430 may negotiate the new leader asset.

According to various embodiments, the resolving the new leader asset includes determining the new leader asset based on a leader ranking. For example, leader ranking 480 may be obtained by one or more of the remaining assets. In some implementations, each asset stores a predefined leader ranking. In some implementations, the follower assets obtain the leader ranking by negotiating the ranking of leaders such as based on respective capabilities of the remaining assets. In the example illustrated in FIG. 4B, leader ranking 480 is predefined such as configured by control center 460 contemporaneous with configuration of the operation. Leader ranking 480 asset 1 is the highest ranking asset, and asset 4 is the next highest ranking asset. Because asset 1 is determined to have failed, asset 4 is determined to be the highest ranking asset among the remaining assets. Accordingly, asset 4 is determined to be the next leader asset for the set of assets. In some embodiments, in response to asset 4 being resolved as the new leader asset, asset 4 determines a status of the operation, and determines plans for performance of at least the remaining parts of the operation. Asset 4 may send to the remaining follower assets the corresponding plans for which the follower assets have been assigned.

Figure 4C:
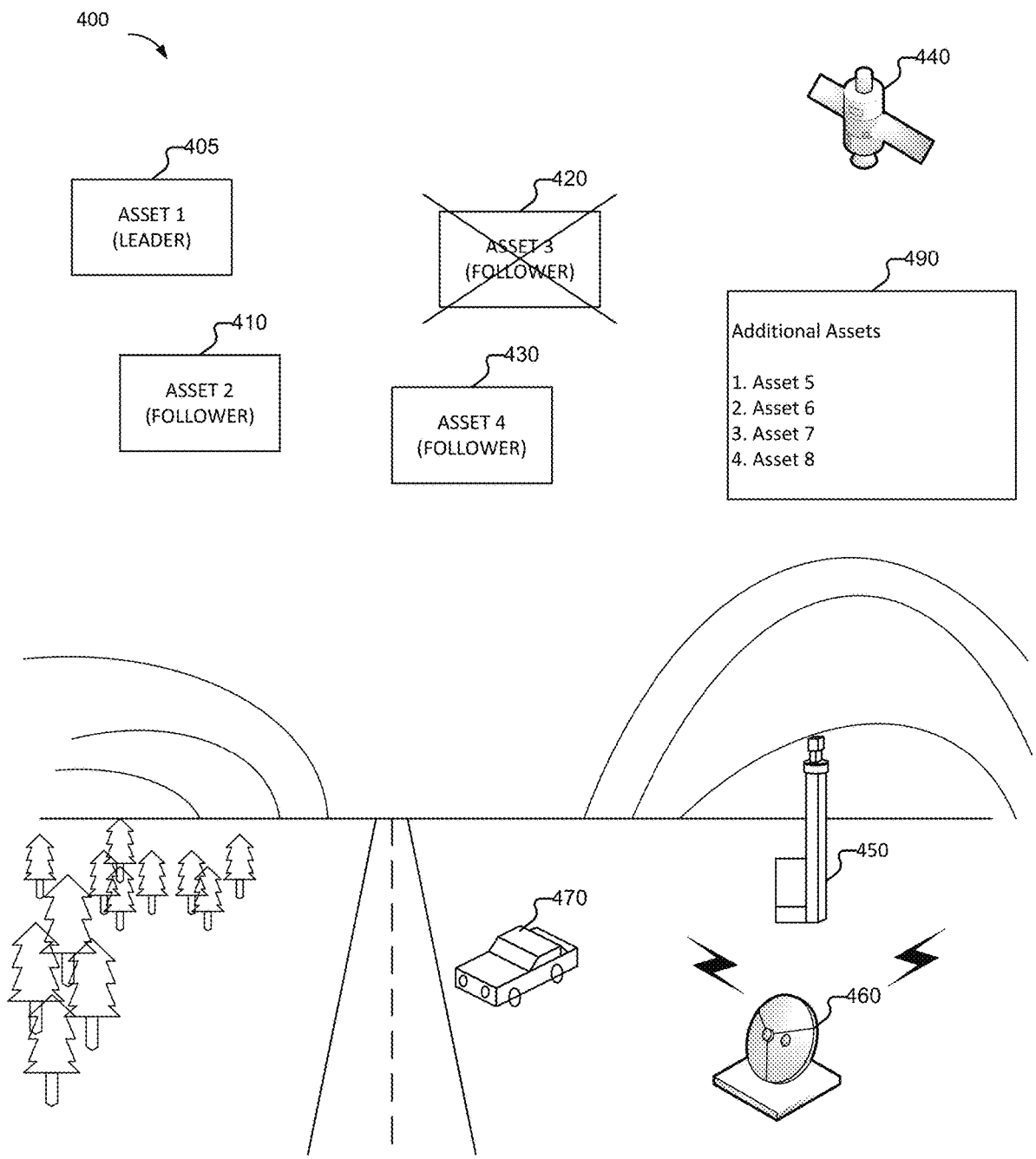
FIG. 4C is a diagram illustrating a system for implementing at least part of an operation according to various embodiments of the present application.

FIG. 4C is a diagram illustrating a system for implementing at least part of an operation according to various embodiments of the present application. In the example of system 400 illustrated in FIG. 4C, a leader asset (asset 420) is determined to have failed. In response to determining that the leader asset has failed, leader asset may determine a status of the operation, and/or determine updated plans for the remaining assets (e.g., asset 410 and asset 430). According to various embodiments, in response to determining that a follower asset has failed, the leader asset may reallocate among the remaining assets the tasks/elements (or the remaining tasks/elements) that were assigned to the failed follower asset. The leader asset may update the plans for the remaining assets based at least in part on the determined reallocation of tasks/elements. In some embodiments, leader drone and/or asset 450 may determine to add one or more assets to the set of assets (e.g., to replace a capability lost by failure of asset 430, to expedite performance of the operation, etc.). For example, a list of additional assets 490 may be determined. The leader drone and/or asset 450 (e.g., a tower that includes a computer system) may dynamically update the set of assets such as by adding one or more of additional assets in the list of additional assets 490. In some embodiments, the list of additional assets 490 may be determined based at least in part on a capabilities of the corresponding assets such that the assets on the list of additional assets 490 have at least one capability matching a capability of a remaining task to be completed. In some embodiments, the list of additional assets 490 may be determined based at least in part on an availability of the ownership of the assets on the list of additional assets (e.g., the assets are currently available for the operation or may be reallocated for performance of the operation upon sending a request to take-over ownership or to take out a lease for the asset).

In some embodiments, a control center (e.g., control center 460 of FIG. 4A, 4B, or 4C) is one of a plurality of control centers that control the system that includes semi-autonomous drones. In various embodiments, the control center comprises a ground based control center, an airborne control center, a water based control center, or any other appropriate control center. In various embodiments, a single control center is controlling, each control center control portions of the system assets, a controlling control center is rotated among the plurality of control centers with a coordinated hand off when control is changed, or any other appropriate allocation of control to the control centers.

Figure 5A:
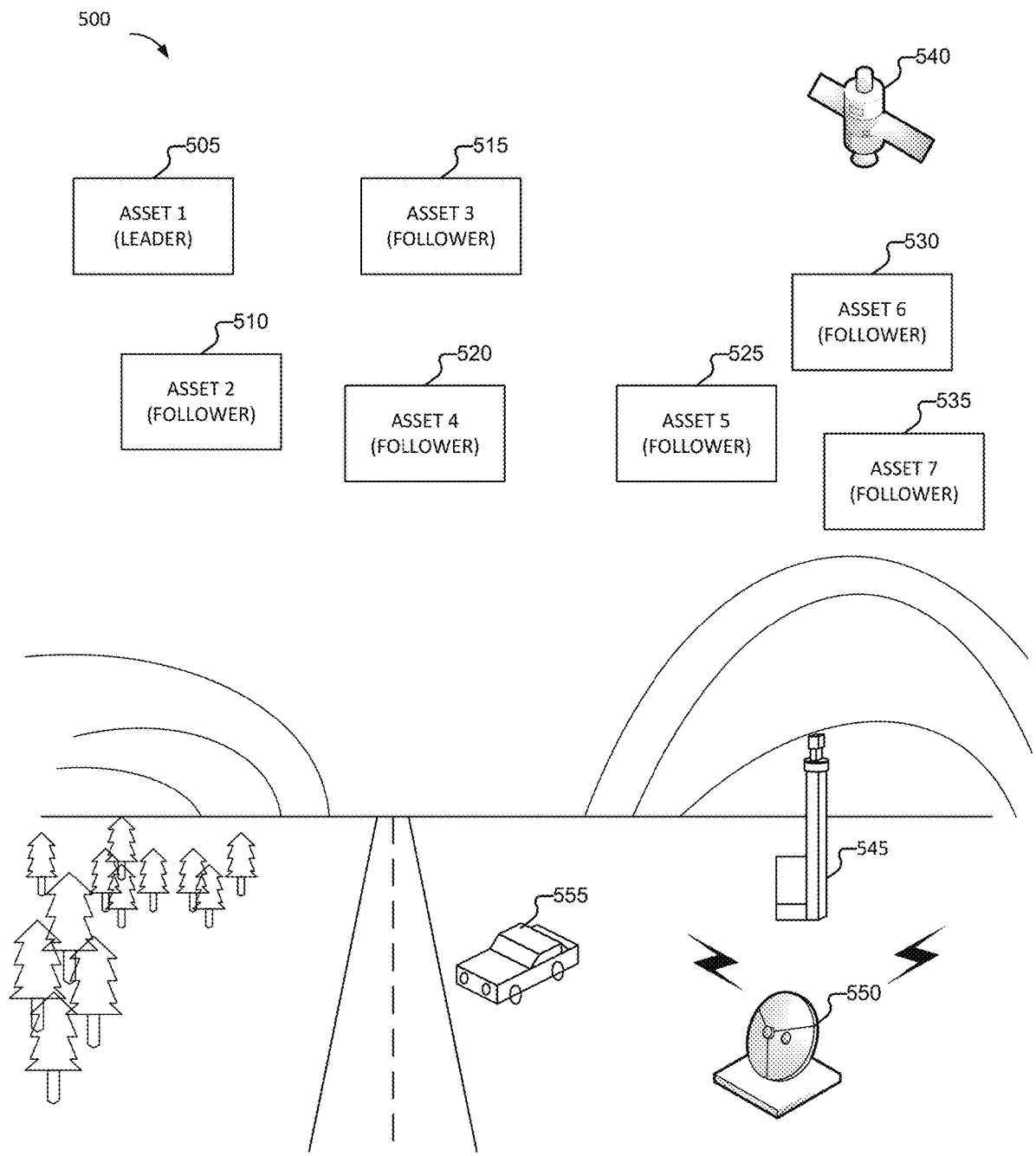
FIG. 5A is a diagram illustrating a system for implementing at least part of an operation according to various embodiments of the present application.

FIG. 5A is a diagram illustrating a system for implementing at least part of an operation according to various embodiments of the present application. In the example illustrated in FIG. 5A, system 500 may comprise a set of assets (e.g., assets 505, 510, 515, 520, 525, 530, 535, 540, and/or 545) and a control center 550, such as a server providing an operation control service. System 500 may be implemented by system 100 of FIG. 1. Control center 550 may be implemented by device 200 of FIG. 2. One or more of the set of assets may be implemented by device 300 of FIG. 3. For example, asset 505, asset 510, asset 515, asset 520, asset 525, asset 530, and/or asset 535 may be implemented by device 300 of FIG. 3. In some embodiments, asset 505, asset 510, asset 515, asset 520, asset 525, asset 530, and/or asset 535 are semi-autonomous drones. Asset 540 may be a satellite in communication with control center 550 and/or another asset such as asset 505. Asset 545 may be a tower such as a semi-autonomous tower. Asset 545 may be in communication with control center 550 and/or another asset such as asset 505.

In the example illustrated in FIG. 5A, the set of assets may be instructed to perform an operation. For example, the operation may be a tracking of vehicle 555 and/or surveillance of the road (and tracking of a particular vehicle or any vehicle travelling along the road). Control center 550 may configure the operation and provide the operation parameters to the set of assets, such as asset 505. Asset 505 may be determined to be the leader asset, and the other assets (e.g., asset 505, asset 510, asset 515, asset 520, asset 525, asset 530, and/or asset 535) may be determined to be follower assets. In response to the leader asset receiving the operation parameters and pre-plan, if any, from the control center 550, the leader asset may determine the plans for the different follower assets to perform tasks or elements of the operation. Continuing with the example above, leader asset may determine a plan for follower asset 525 to tracking vehicle 555, a plan for follower asset 510 to perform surveillance of a first part of the road, and a plan for follower asset 515 to perform surveillance of a second part of the road. In response to determining the plans for the follower assets, the leader asset may correspondingly send the plans to the respective follower assets. The follower assets may implement the plans in response to receiving the plans from the leader drone, and the follower assets may fill in any gaps in the plan provided by the leader drone. Leader asset may determine that asset 540 (e.g., the satellite) is to provide surveillance of the road and tracking assistance with vehicles that drive along the road. Leader asset may determine a plan for asset 545 to capture information pertaining to the area/environment using one or more sensors. The captured information may be provided back to the leader asset as feedback information, which may be used by the leader asset to update the plans for the various assets in the set of assets.

Figure 5B:
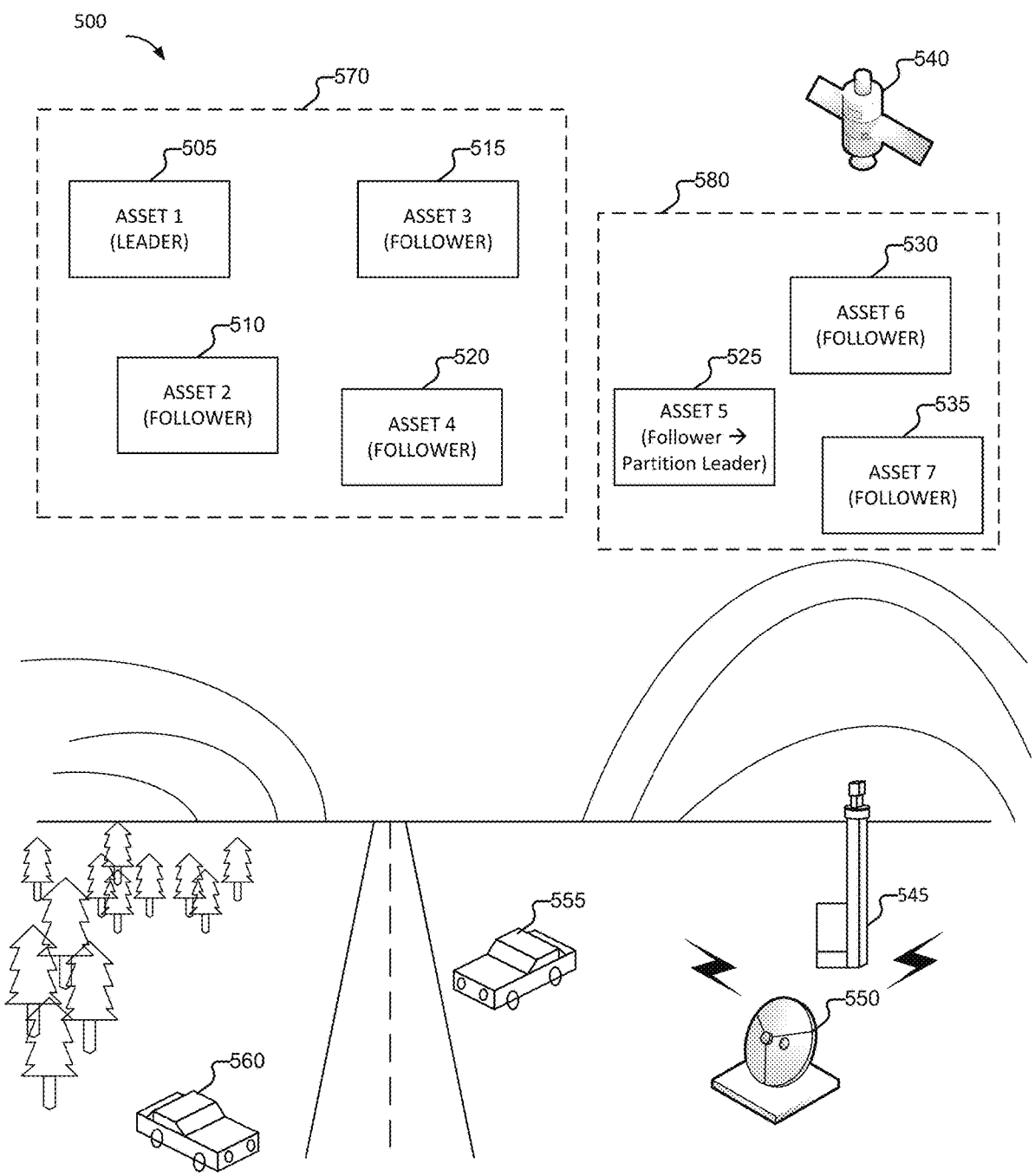
FIG. 5B is a diagram illustrating a system for implementing at least part of an operation according to various embodiments of the present application.

FIG. 5B is a diagram illustrating a system for implementing at least part of an operation according to various embodiments of the present application. In the example of system 500 illustrated in FIG. 5B, an additional vehicle 560 has appeared and travels along the road being subject to surveillance by the set of assets. One or more of the set of assets may capture an image of vehicle 560. For example, the satellite may identify vehicle 560 travelling along the road. As another example, asset 510, asset 520, and/or asset 515 may provide feedback information to leader asset (asset 505), and leader asset may process the feedback information to determine that the vehicle 560 is within the geographical area set by the operation parameters and/or satisfies the condition of tracking vehicles travelling along the road.

In response to detecting vehicle 560, leader asset may determine to partition the set of assets. For example, leader asset may determine that the operation (e.g., including tracking vehicle 555 and vehicle 560) is likely to be more effectively performed if the set of assets were partitioned into two partitions. In response to determining to partition the set of assets, the leader asset may instruct the corresponding follower assets in the set of assets, such as to provide the follower assets with an indication of the partition to which the follower assets belong. Assets 505, 510, 515, 520, 525, 530, and 535 may be portioned into two partitions: a first partition 570 and a second partition 580. In some embodiments, because the leader asset is within first partition 570, the leader asset is determined to be the partition leader of first partition 570. In some embodiments, because second partition 580 comprises assets that were formerly follower assets in the set of assets, at least one of the assets in second partition 580 is elevated to partition leader of second partition 580. The assets in second partition 580 may negotiate to resolve leadership of second partition 580. For example, the partition leader may be resolved on a pre-defined leadership ranking, such as a leadership ranking determined contemporaneous with configuration of the operation. The partition leader may be determined to be the asset among the assets second partition 580 having a highest corresponding ranking on the leadership ranking. In the illustrated example, asset 525 may be elevated to partition leader.

In the illustrated example, the task of tracking vehicle 560 may be assigned to first partition, the task of tracking vehicle 555 may be assigned to second partition 580, the task of providing surveillance of the road may be assigned to asset 540, and the task of monitoring the environment may be provided to asset 545 (e.g., a tower). In some embodiments, leader asset in first partition 570 may determine the respective plans for asset 510, asset 515, and asset 520 to perform corresponding elements of the task of tracking vehicle 560. In response to receiving the plan to perform the corresponding element, asset 510, asset 515, and asset 520 may implement the plans and fill in any gaps in the plan (e.g., provide collision avoidance such as avoid the hills, or the trees, determine a height at which to travel, determine when to capture an image, etc.). Asset 510, asset 515, and asset 520 may provide feedback information to leader asset, the feedback information pertaining to a status of the performing the elements of the task of tracking vehicle 560 and/or information captured by one or more sensors (e.g., a live video feed, an image such as an image of a license plate, etc.). Leader asset may provide feedback information to control center 550, including information pertaining to vehicle 560.

In some embodiments, partition leader in second partition 580 may determine the respective plans for asset 530, and asset 535 to perform corresponding elements of the task of tracking vehicle 555. In response to receiving the plan to perform the corresponding element, asset 530, and asset 535 may implement the plans and fill in any gaps in the plan (e.g., provide collision avoidance such as avoid the hills, or the trees, determine a height at which to travel, determine when to capture an image, etc.). Asset 530 and asset 535 may provide feedback information to partition leader, the feedback information pertaining to a status of the performing the elements of the task of tracking vehicle 555 and/or information captured by one or more sensors (e.g., a live video feed, an image such as an image of a license plate, etc.). In some embodiments, partition leader may provide feedback information to leader asset (asset 505), which may in turn provide the feedback information (or information including such feedback information aggregated or processed/analyzed in connection with feedback information from first partition 570). Leader asset may in turn provide the feedback information to control center 550, including information pertaining to vehicle 560. In some embodiments, partition leader may provide the feedback information directly to control center 560 (e.g., provide the information to control center without providing such information to leader asset).

Figure 5C:
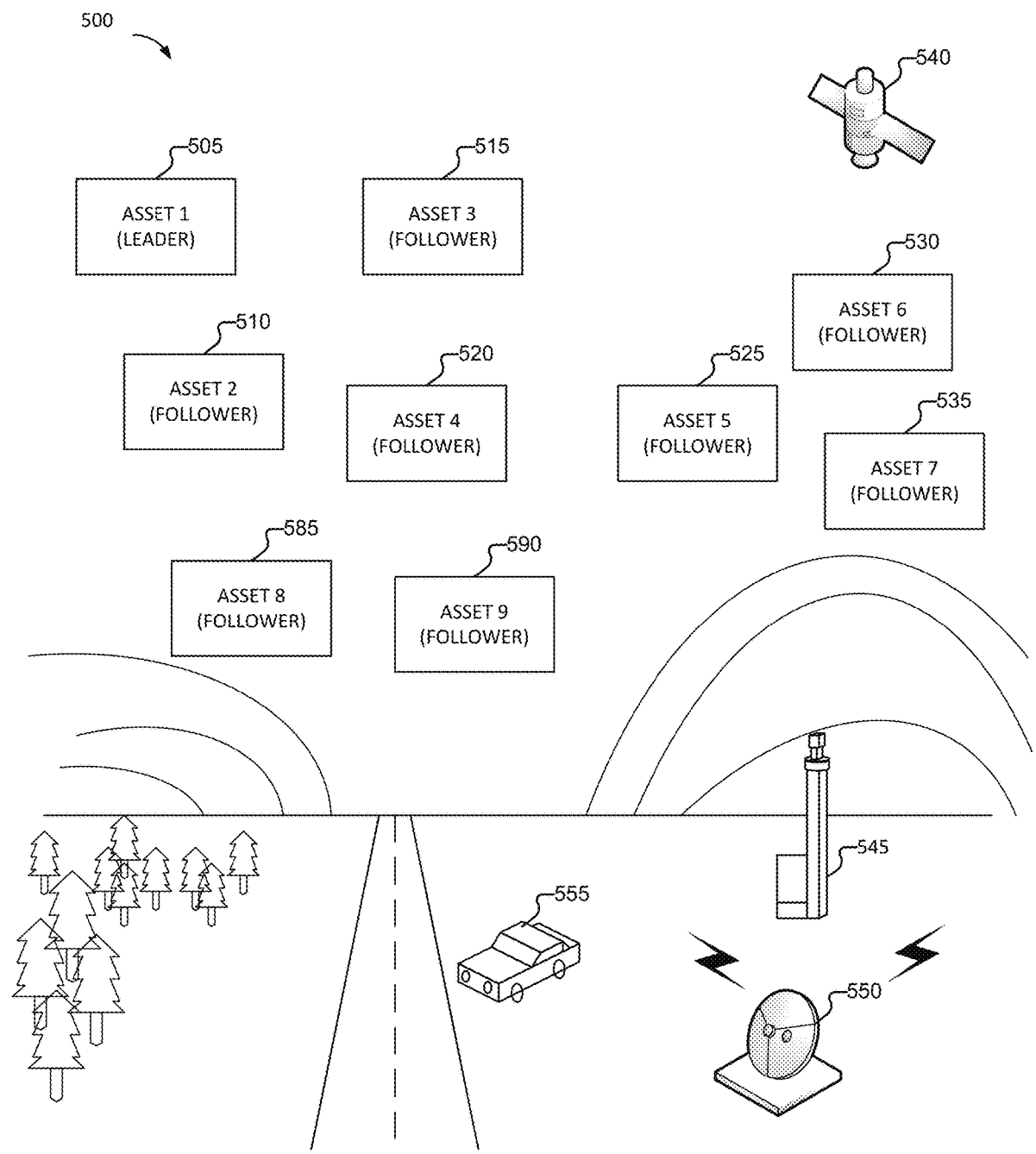
FIG. 5C is a diagram illustrating a system for implementing at least part of an operation according to various embodiments of the present application.

FIG. 5C is a diagram illustrating a system for implementing at least part of an operation according to various embodiments of the present application. In the example illustrated in FIG. 5C, the leader asset may determine that tracking of vehicle 555 is no longer to be performed based at least in part on the feedback information, such as the feedback information from asset 510, asset 515, and/or asset 520. In some embodiments, leader asset may determine that the status of vehicle 555 no longer satisfies the operation parameters for tracking a vehicle travelling the road subject to surveillance. For example, based on the feedback information, leader asset may determine that vehicle 555 has exited (is no longer within) a geographical area subject to surveillance or tracking based at least in part on the operation parameters and/or constraints. As another example, leader asset may determine that vehicle 555 has entered an area that is a restricted area according to the operation parameters and that the set of assets are not to enter such an area.

In some embodiments, system 500 may determine to dynamically add assets to the set of assets. For example, leader asset and/or control center 550 may determine to add asset 585 and/or asset 590 to the set of assets. The asset(s) may be added to the set of assets in response to a determination that better coverage of the geographical area/road is desired for surveillance of the road (e.g., such as based on user input to a user interface operatively provided by control center 550). In response to a determination to add asset 585 and/or asset 590 to the set of assets, the leader asset may update a mapping of capabilities to assets, and update a plan for performing the operation. The leader asset may determine a plan for asset 585 to perform a task based at least in part on a capability of asset 585, etc.

In some embodiments, a control center (e.g., control center 550 of FIG. 5A, 5B, or 5C) is one of a plurality of control centers that control the system that includes semi-autonomous drones. In various embodiments, the control center comprises a ground based control center, an airborne control center, a water based control center, or any other appropriate control center. In various embodiments, a single control center is controlling, each control center control portions of the system assets, a controlling control center is rotated among the plurality of control centers with a coordinated hand off when control is changed, or any other appropriate allocation of control to the control centers.

Figure 6:
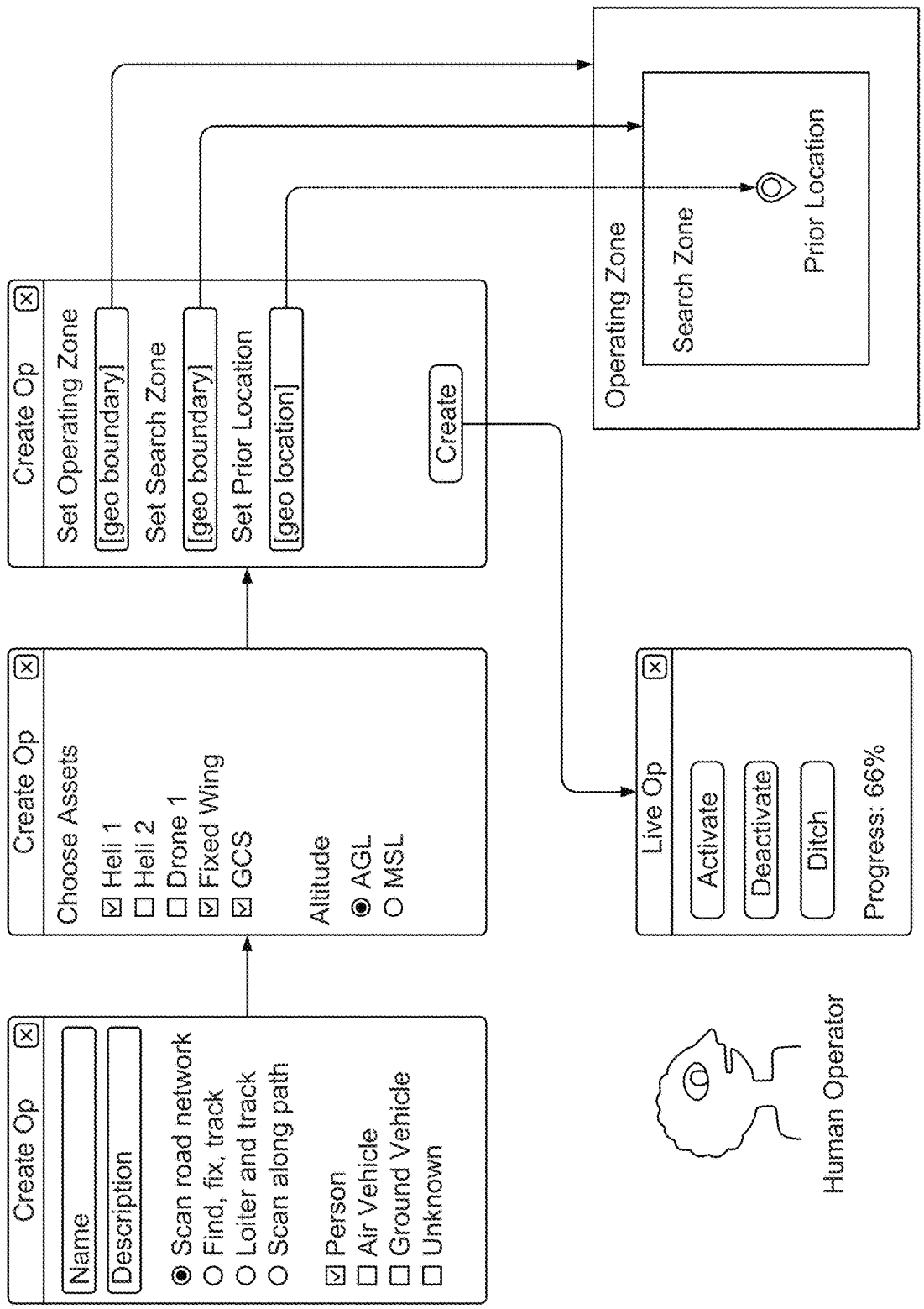
FIG. 6 is a diagram illustrating a user interface for configuring, monitoring, and/or controlling an operation according to various embodiments of the present application.

FIG. 6 is a diagram illustrating a user interface for configuring, monitoring, and/or controlling an operation according to various embodiments of the present application.

According to various embodiments, the server may configure one or more user interfaces in connection with configuring an operation. For example, the server may generate and configure a set of user interfaces to create a wizard that effectively and intuitively causes the operation to be defined in a configuration process. In some embodiments, a user interface is configured based on a user input to a preceding user interface (e.g., an immediately preceding user interface).

As illustrated in FIG. 6, a set of user interfaces 610, 630, and 650 may be displayed to the user to cause the user to methodically define parameters for the operation.

At interface 610, the user interface includes elements for the user to: (i) input a name and description of the operation, (ii) select a type of operation (e.g., scan a road network, scan along a path, loiter and track, and find, fix target, and track), (iii) select a type of target subject to the operation (e.g., a target of surveillance or tracking). In response to the inputs to interface 610, user interface 630 may be configured.

At user interface 630, the user interface includes selectable elements for the user to select a type of asset, and/or a parameter associated with a manner by which the asset will travel (e.g., fly, ground, sea). The various selectable elements on user interface 630 may be determined based on a user input to interface 610.

At user interface 650, the user interface includes selectable elements for the user to select one or more parameters associated with the operation. For example, the user may define a geography or boundary within which the operation is to be performed. As another example, the user may define restricted areas in which the assets performing the operation may not enter, etc. As another example, the user may defined a date and time in which the operation is to be performed, or a date or time during which the operation is restricted. User interface 650 may include selectable element to cause the server to generate the operation. For example, the server may generate the operation based on the user-defined operation configuration/definition.

In response to generating the operation, the server may cause a user interface pertaining to a live operations screen to be displayed. The live operations screen may include selectable elements for the user to select to activate the operation, to deactivate the operation, or to ditch the operation. In some embodiments, the live operation screen includes current status information pertaining to a status of the performing the operation. For example, the live operation screen may indicate a percentage of the operation completed. As another example, the live operation screen may include a livestream of a video captured by at least one asset in the set of assets. In some embodiments, the live operations screen may include a selectable element with which the user can invoke a user interface (or a wizard of user interfaces) for modifying the operation. For example, the user may cause the server to add one or more assets to the set of assets. As another example, the user interface may display options (e.g., server-generated options such as possible modifications) that allow the user to select to modify the operation according to a proposed modification. The server may cause the user interface to display an improvement to the operation by adding a particular asset, adding an asset with a particular capability, or adding one or more assets. The user may input selection to modify the operation according to the proposed modification presented by the server. In some implementations, the server may cause the user interface to display a cost associated with performing the operation using the set of assets, and/or a difference in cost, or an impact to cost, if an asset is added to, or an asset is removed from, the set of assets.

Figure 7A:
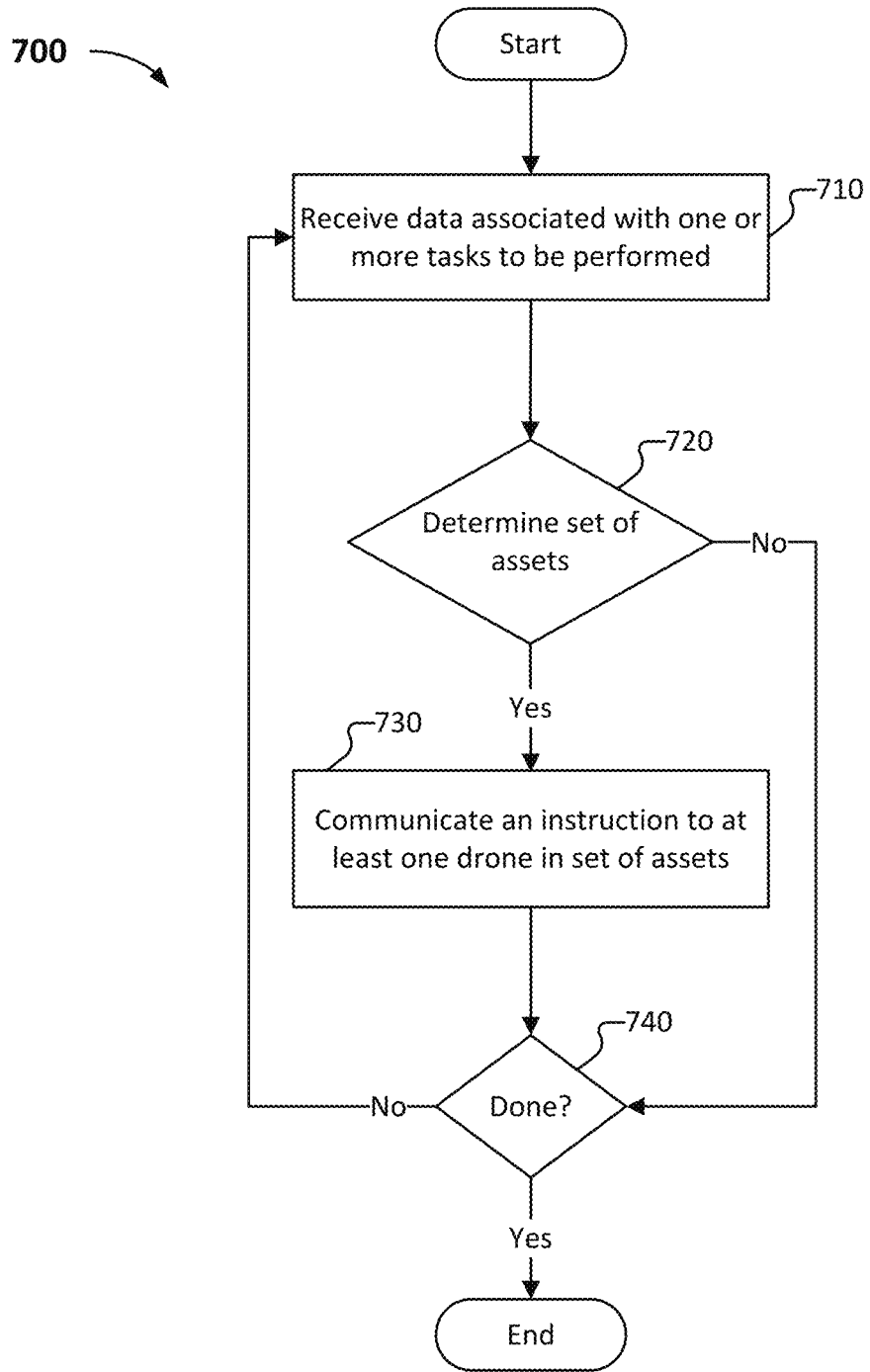
FIG. 7A is a diagram illustrating a method for configuring an operation according to various embodiments of the present application.

FIG. 7A is a diagram illustrating a method for configuring an operation according to various embodiments of the present application. In some embodiments, process 700 of FIG. 7A is performed by server 105 of system 100 of FIG. 1, and/or device 200 of FIG. 2.

At 710, data associated with one or more tasks to be performed is received. In some embodiments, a server receives the data associated with the one or more tasks in connection with configuring an operation. The data associated with the one or more tasks may be received based at least in part on one or more user inputs to a user interface provided to a user interface presented on a client terminal. According to various embodiments, the data associated with the one or more tasks comprises one or more operation parameters and/or operation constraints. The one or more tasks to be performed may correspond to an operation to be performed.

At 720, a set of assets is determined. In some embodiments, the server determines a set of assets to collectively perform the one or more tasks, or an operation comprising the one or more tasks. The set of assets may be determined based on one or more capabilities associated with the one or more tasks/operation and/or a capability of an asset. For example, the server may determine a set of assets having capabilities matching the capabilities of associated with the one or more tasks/operation.

According to various embodiments, the set of assets may be determined based at least in part on an availability of an asset and/or an ownership (or availability of transfer of ownership) of an asset. For example, the server may determine a superset of assets (e.g., a set of all assets across a plurality of organizations) and query the assets or a third party service for an indication of whether the assets are available and/or an indication of the availability for a transfer of ownership for use in performing the operation. The third party service may be an ownership service that manages ownership of assets across a plurality of organizations and/or the transfer or license of ownership according to negotiated conditions (e.g., a fixed term lease, a lease for a particular task, a lease for a particular operation, a permanent transfer, etc.).

In response to a set of assets being determined to perform the one or more tasks (or corresponding operation), process 700 proceeds to 730 at which an instruction is communicated to at least one drone in the set of assets. In some embodiments, the server determines a leader drone among the set of assets, and the server communicates the instruction to the leader drone. The instruction may include, or be communicated in connection with, an indication that the leader drone is in the set of assets. In some embodiments, the instruction communicated to the leader drone comprises operation parameters. The instruction may also include a pre-plan if the server or other service has generated a high-level pre-plan of the operation.

In response to communicating the instruction to the at least one drone, process 700 proceeds to 740 at which a determination is made as to whether the process is complete. As an example, the process may be determined to be complete based at least in part on a user input such as an input to cancel or pause an operation. As another example, the process may be determined to be complete in response to a user selecting to initiate performance of the operation. If the process is deemed complete, process 700 ends. Otherwise, process 700 returns to 710 at which further data associated with one or more tasks is received. In some embodiments, process 700 may be deemed to not be done at 740 in response to a user input to further refine/configure the operation. As an example, before initiating the operation, the user may input to a user interface a request to edit the operation. As another example, during implementation of the operation by the set of assets, the user may input a selection to modify the operation such as to dynamically add an asset to the set of assets to accelerate completion of the operation, to remove an asset based on a re-prioritization of the operation relative to another operation, etc.

If a set of assets is not determined at 720, process 700 may proceed to 740. A set of assets may not be determined if no assets are available, ownership of assets matching the capabilities of the one or more tasks or the operation is not available, a set of assets collectively matching capabilities to the capabilities of the operation is not found, etc. At 740, a prompt may be provided to a user indicating that a set of assets may not be determined, and request the user to modify the configuration of the operation, or whether the user requests to cancel the operation.

Figure 7B:
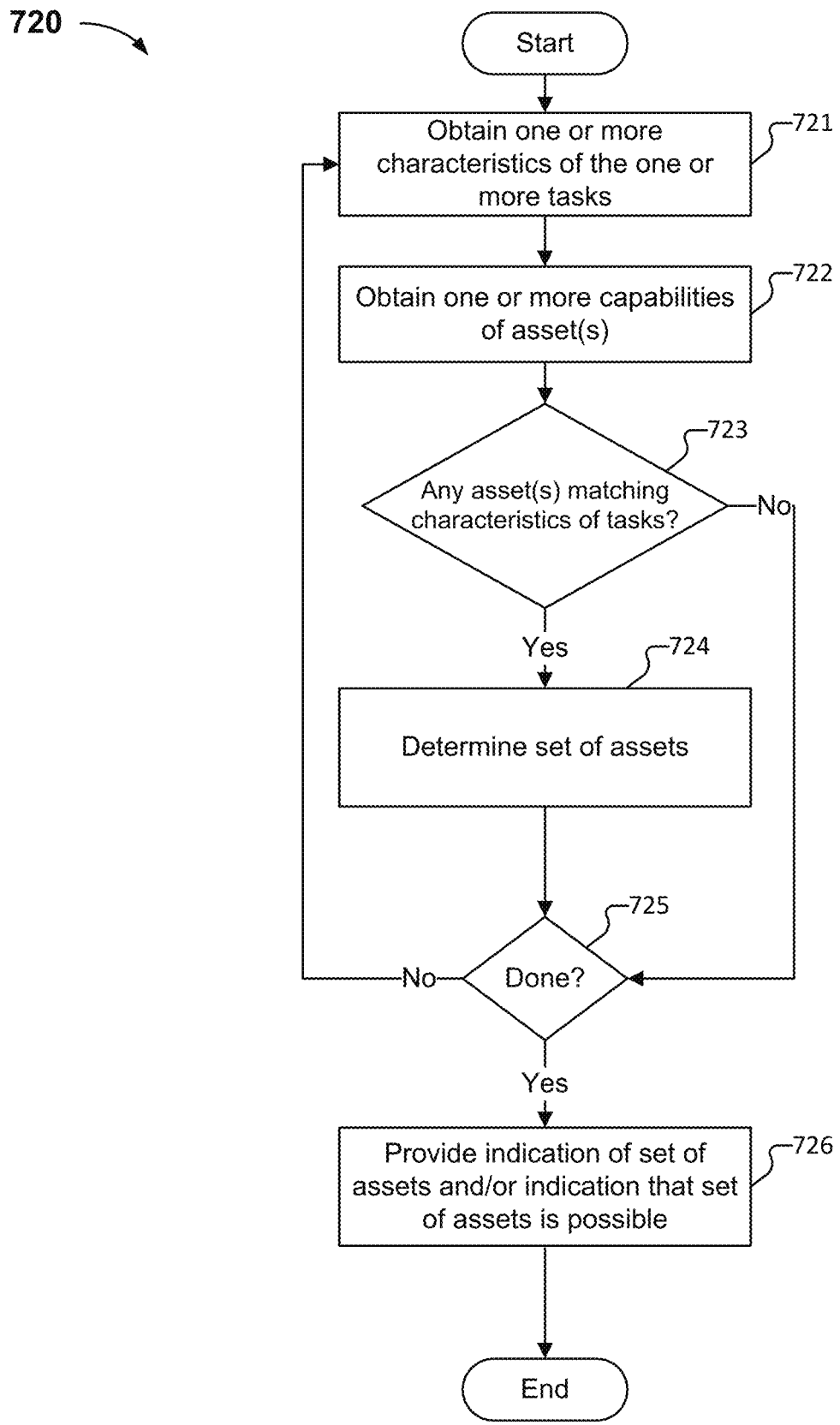
FIG. 7B is a diagram illustrating a method for configuring an operation according to various embodiments of the present application.

FIG. 7B is a diagram illustrating a method for configuring an operation according to various embodiments of the present application. In some embodiments, process 720 of FIG. 7B is performed by server 105 of system 100 of FIG. 1, and/or device 200 of FIG. 2. 720 of FIG. 7B may correspond to 720 of FIG. 7A.

At 721, one or more characteristics of the one or more tasks are obtained. In some embodiments, the server may obtain the one or more characteristics based on a definition of the operation (e.g., an operation parameter).

At 722, one or more capabilities of the assets are obtained. In some embodiments, the server may obtain the one or more capabilities of the assets based on a mapping of capabilities to assets. The mapping of capabilities of assets may be determined based on a querying the assets for an indication of their capabilities (or their current capabilities), based on the assets registering/advertising their capabilities, etc.

At 723, a determination is made as to whether any assets match the characteristics of the tasks. In some embodiments, the server determines one or more capabilities corresponding to the characteristics of the tasks, and determines assets having capabilities matching the capabilities corresponding to the characteristics of the tasks. In response to determining that an asset or a set of assets comprises capabilities matching the characteristics of the tasks, process 720 may proceed to 727.

At 724, the set of assets is determined. In some embodiments, the server determines the set of assets from among the assets having a capability matching a characteristic of the one or more tasks. The server may select an asset to be included in the set of assets based availability of the asset, an ownership of the asset, an availability of transfer of ownership of the asset, a determination for the set of assets to have redundancy with respect to a capability, etc. In some embodiments, the server uses a cost function in connection with selecting an asset(s) to include in the set of assets. For example, the server may use the cost function to optimize a cost of the set of assets, or to select a set of assets having a cost less than a threshold cost value.

In response to determination of the set of assets, process 720 proceeds to 725 at which a determination is made as to whether the determination of the set of assets is complete. For example, the server may prompt a user to confirm the set of assets, or provide a selectable element with which a user may select to refine/modify the one or more tasks or capabilities of the tasks. In response to determining that the determination of the set of assets is not complete, process 720 returns to 721. Otherwise, process 720 proceeds to 726. At 723, if assets matching the characteristics of the tasks are not found (or if, for each characteristic of the task, an asset having a corresponding capability is not found), process 720 may proceed to 725.

At 726, an indication of a set of assets and/or an indication that a set of assets is possible (e.g., that a set of assets may be grouped in connection with performing the operation) is provided.

Figure 8A:
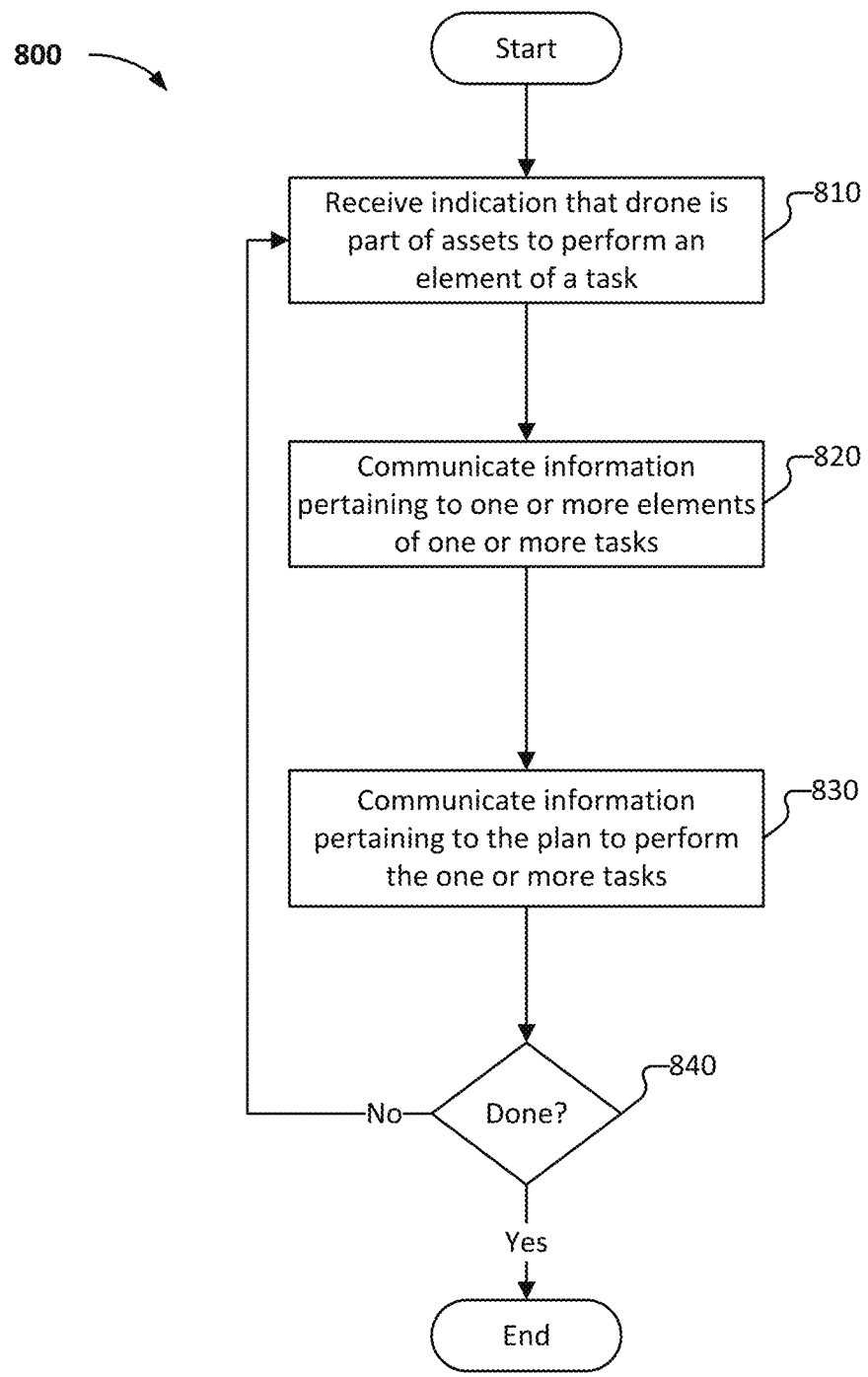
FIG. 8A is a diagram illustrating a method for implementing at least a task of an operation according to various embodiments of the present application.

FIG. 8A is a diagram illustrating a method for implementing at least a task of an operation according to various embodiments of the present application. In some embodiments, process 800 of FIG. 8A is performed by asset 120, asset 125, and/or asset 130 of system 100 of FIG. 1, and/or device 300 of FIG. 3. According to various embodiments, process 800 is implemented by a semi-autonomous drone.

In some embodiments, process 800 is implemented by a leader drone among the set of assets to perform an operation. In some embodiments, process 800 is implemented by a follower drone among the set of assets to perform the operation.

At 810, an indication that a drone is part of a set of assets to perform an element of a task is received. The drone may receive the indication that the drone is part of the set of assets in connection with the configuring of the operation.

According to various embodiments, in the case that process 800 is implemented by a leader drone, the leader drone may receive the indication that the drone is a part of the set of assets from a server (e.g., a server that configures the operation), such as in connection with the operation parameters associated with the operation for which the element of the task is to be performed.

According to various embodiments, in the case that process 800 is implemented by a follower drone, the follower drone may receive the indication that the drone is a part of the set of assets from the leader drone.

At 820, information pertaining to the one or more elements of the one or more tasks is communicated. The information pertaining to the one or more elements may comprise a parameter of the element(s) and/or a constraint for performing the element(s).

According to various embodiments, in the case that process 800 is implemented by a leader drone, the leader drone may communicate a plan(s) for performing the one or more elements. The leader drone may communication the plan(s) for performing the one or more elements to one or more follower drones that are assigned to perform the one or more elements.

According to various embodiments, in the case that process 800 is implemented by a follower drone, the follower drone may receive a plan for performing the one or more elements. The follower drone may receive the plan from the leader drone. The plan may be determined based on a capability of the follower drone, a capability associated with the element(s), a context of the follower drone (e.g., availability, location, etc.), etc.

At 840, a determination is made as to whether process 800 is completed. In response to a determination that process 800 is completed, process 800 ends. In response to a determination that process 800 is not complete, process 800 may return to 810. According to various embodiments, process 800 is determined to be complete in response to a determination that the one or more elements are complete, or that the operation is complete. Process 800 may also be determined to be complete if the operation is paused or cancelled/abandoned.

Figure 8B:
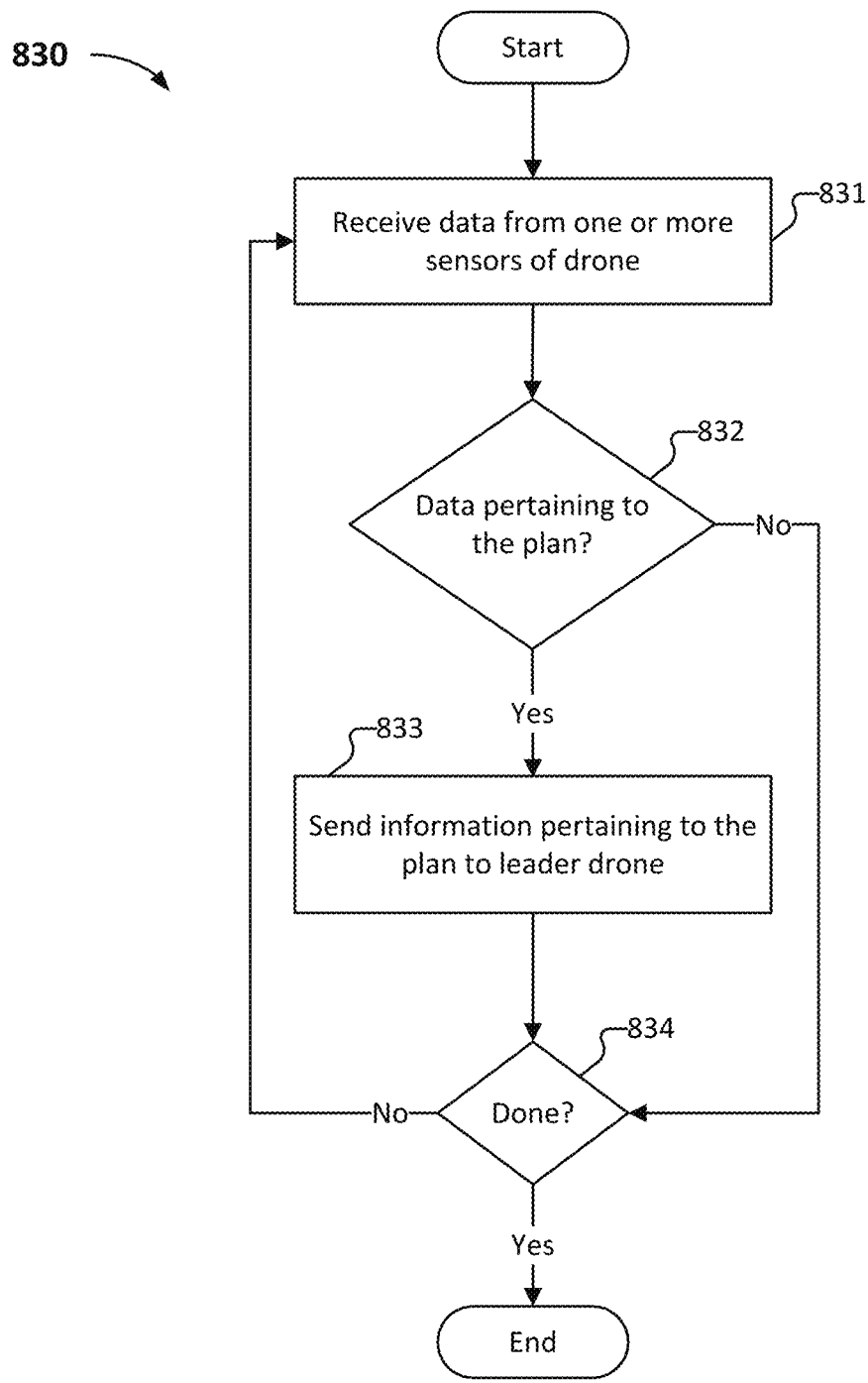
FIG. 8B is a diagram illustrating a method for implementing at least a task of an operation according to various embodiments of the present application.

FIG. 8B is a diagram illustrating a method for implementing at least a task of an operation according to various embodiments of the present application. In some embodiments, process 830 of FIG. 8B is performed by asset 120, asset 125, and/or asset 130 of system 100 of FIG. 1, and/or device 300 of FIG. 3. According to various embodiments, process 830 is implemented by a semi-autonomous drone. Process 830 of FIG. 8B may correspond to 830 of process 800 of FIG. 8A. Process 830 of FIG. 8B may be implemented by a follower drone in a set of assets assigned to perform an operation.

At 831, data from one or more sensors of the drone is received. In some embodiments, during implementation of a plan, such as a plan provided by a leader drone, the follower drones obtains information pertaining to the element/operation. For example, the follower drone may capture information such an image, a live stream video, a weather information, etc.

At 832, a determination is made as to whether the data pertains to the plan. In some embodiments, in response to receiving data from sensors on the drone, the drone determines whether such data relates to the plan being implemented. As an example, in the case of a plan to track a target, data received from a sensor may include an image. The drone may determine whether the image includes the target for which the drone is to track. For example, the drone may perform an image analysis and determine that the target is in the image (or that the likelihood that the image comprises the target exceeds a predefined threshold), etc.

In response to determining that the data pertains to the plan, process 830 may proceed to 833 at which information pertaining to the plan is sent to the leader drone. In some embodiments, the follower drone may determine that the captured information relates to the plan (e.g., indicates a status of the element/operation, includes a target/subject of the plan, includes information pertaining to the geographical area in which the plan is to be operated, etc.).

In response to sending the information pertaining to the plan to the leader drone, process 830 proceeds to 834 at which a determination is made as to whether 830 is complete. In some embodiments, process 830 is determined to be complete in response to a determination that the operation is complete, abandoned, and/or paused. In response to a determination that process 830 is complete, process 830 ends. In response to a determination that process 830 is not complete, process 830 may return to 831 at which the drone continues to monitor for data/information captured by its sensors and iteratively send relevant information to the leader drone. As an example, process 830 is determined not to be complete in response to a determination that task is not complete (e.g., if the drone was tasked with scanning a road and the drone was not able to maintain a set of tight turns in the road and missed scanning portions of the road, the task may deemed not to be complete and the drone may double back and re-scan the missed portions of the road).

If the data is determined to not pertain to the plan at 832, process 830 proceeds to 834, and 834 is performed as discussed above.

Figure 8C:
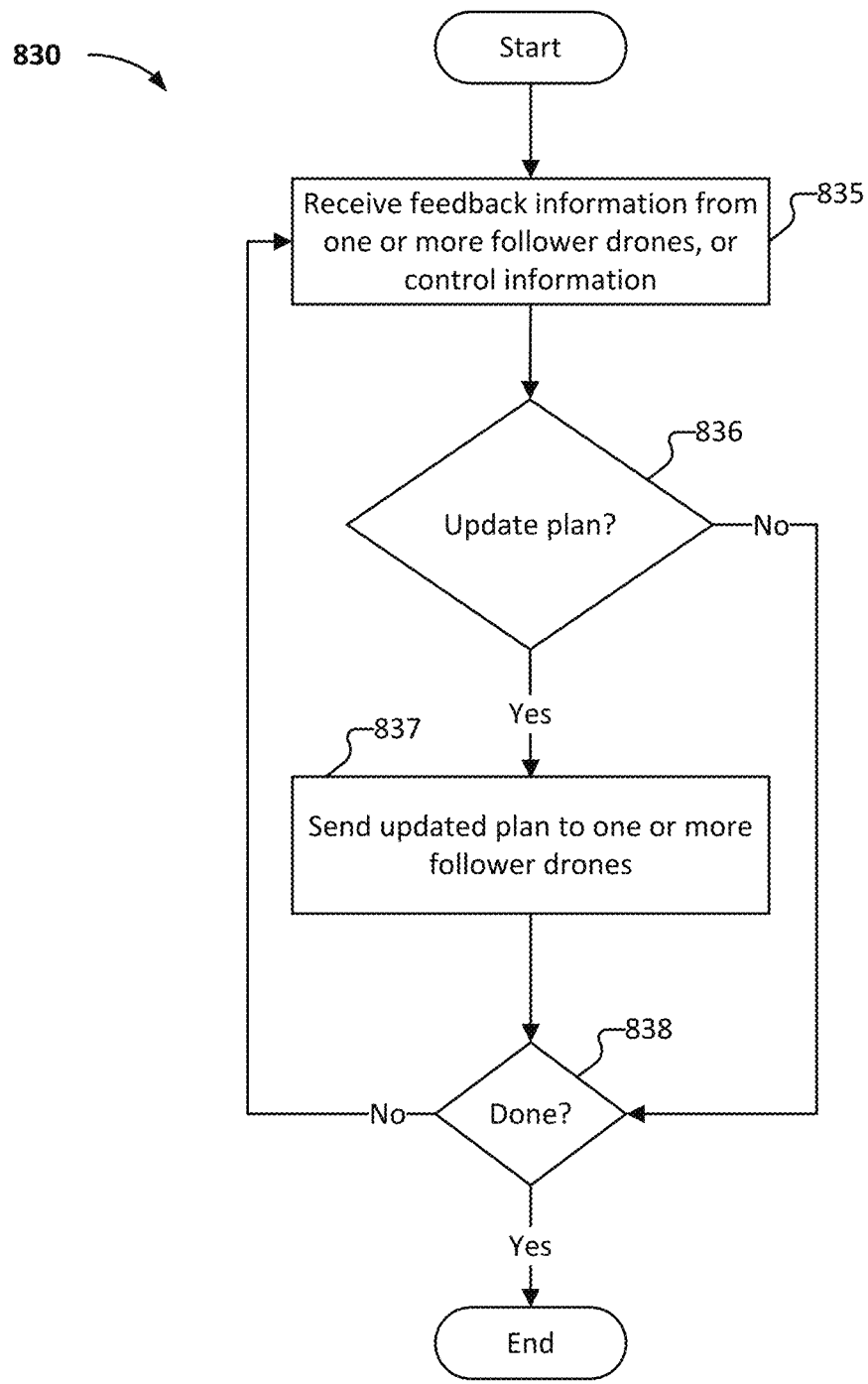
FIG. 8C is a diagram illustrating a method for implementing at least a task of an operation according to various embodiments of the present application.

FIG. 8C is a diagram illustrating a method for implementing at least a task of an operation according to various embodiments of the present application. In some embodiments, process 830 of FIG. 8C is performed by asset 120, asset 125, and/or asset 130 of system 100 of FIG. 1, and/or device 300 of FIG. 3. According to various embodiments, process 830 is implemented by a semi-autonomous drone. Process 830 of FIG. 8C may correspond to 830 of process 800 of FIG. 8A. Process 830 of FIG. 8C may be implemented by a leader drone in a set of assets assigned to perform an operation.

At 835, feedback information is received from one or more follower drones, or control information is received. According to various embodiments, a leader drone receives feedback information from a follower drone contemporaneous with performance of a plan pertaining to a task or an element of a task associated with an operation.

The feedback information may include current/contemporaneous information such as a current location, a live video stream, a current status of the operation (e.g., in the case of a surveillance operation, the status may be no targets present in defined zone of the operation), etc.

The control information may include information provided to the leader drone from the server. For example, the control information may include an indication that the operation is updated, an operation parameter, an operation constraint, an indication/instruction for modifying the set of assets, etc.

At 836, a determination is made as to whether to update the plan. According to various embodiments, the leader drone determines whether to autonomously update the plan based on the feedback information or on control information. For example, if the feedback information indicates that an element or task of the operation is completed, the leader drone may update the plan for the corresponding follower drone so that the follower drone performs a new task/element. As another example, in the case of surveillance in a defined zone, in response to a determination that the feedback information indicates that a target is within the defined zone, the leader drone may determine to update the plan to move closer to the target to obtain specific details pertaining to the target, or the leader drone may determine to update the plan to instruct the follower drone to switch to a tracking task to track the target.

In response to a determination that the plan is to be updated at 836, process 830 may proceed to 837 at which an updated plan is sent to one or more follower drones and process 830 proceeds to 838. Conversely, in response to a determination that the plan is not to be updated at 836, process 830 proceeds to 838.

At 838, a determination is made as to whether 830 is complete. In some embodiments, process 830 is determined to be complete in response to a determination that the operation is complete, abandoned, and/or paused. In response to a determination that process 830 is complete, process 830 ends. In response to a determination that process 830 is not complete, process 830 may return to 835 at which the drone continues to monitor for feedback information or control information pertaining to the operation.

Figure 9A:
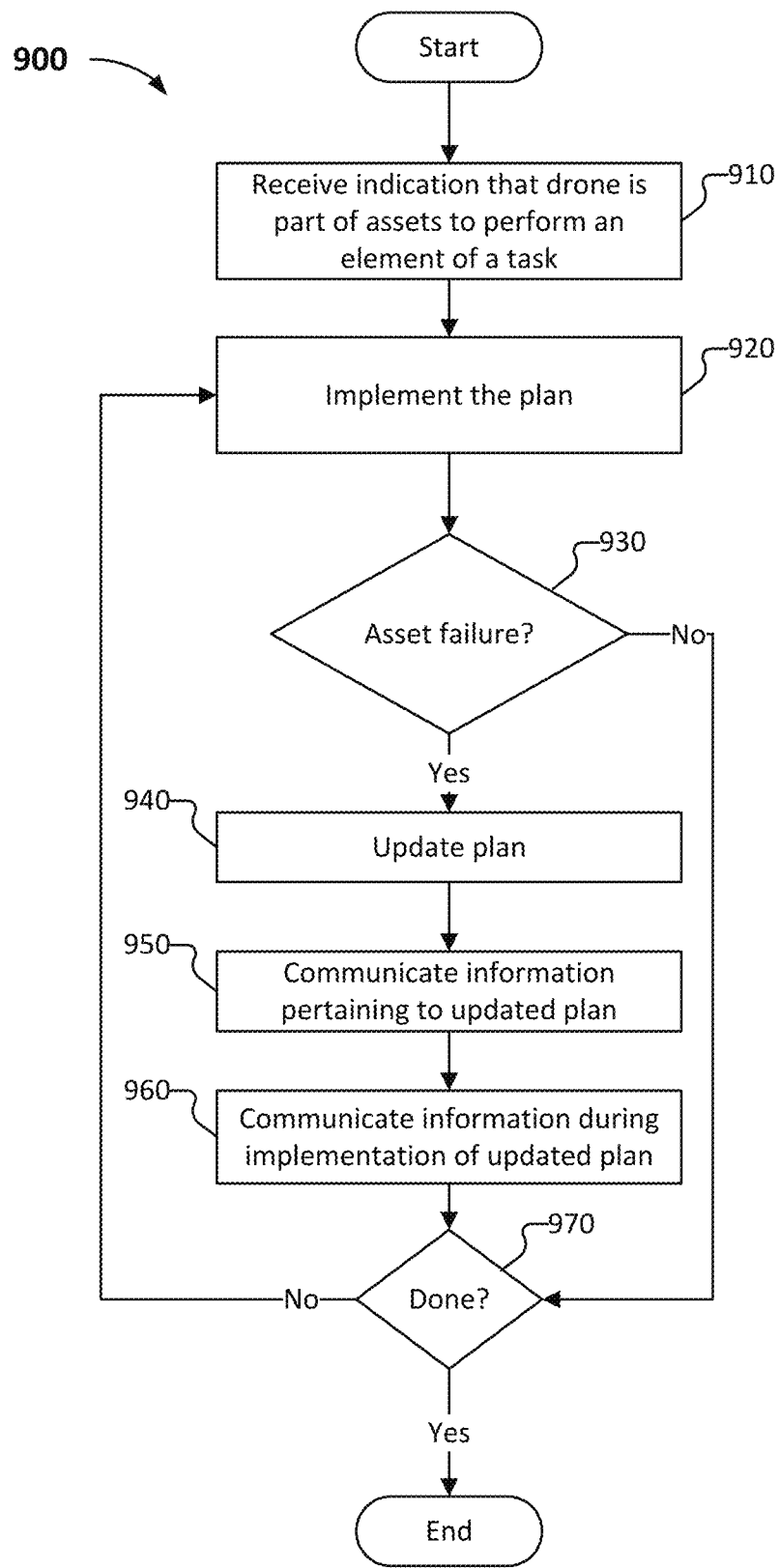
FIG. 9A is a diagram illustrating a method for implementing a plan associated with an operation according to various embodiments of the present application.

FIG. 9A is a diagram illustrating a method for implementing a plan associated with an operation according to various embodiments of the present application. In some embodiments, process 900 of FIG. 9A is performed by asset 120, asset 125, and/or asset 130 of system 100 of FIG. 1, and/or device 300 of FIG. 3. According to various embodiments, process 800 is implemented by a semi-autonomous drone.

At 910, an indication that a drone is part of a set of assets to perform an element of a task is received. The drone may receive the indication that the drone is part of the set of assets in connection with the configuring of the operation.

According to various embodiments, in the case that process 900 is implemented by a leader drone, the leader drone may receive the indication that the drone is a part of the set of assets from a server (e.g., a server that configures the operation), such as in connection with the operation parameters associated with the operation for which the element of the task is to be performed.

According to various embodiments, in the case that process 900 is implemented by a follower drone, the follower drone may receive the indication that the drone is a part of the set of assets from the leader drone.

At 920, a plan is implemented. In some embodiments, the drone obtains the plan associated with performing the operation and implements the plan.

According to various embodiments, in the case that process 900 is implemented by a leader drone, the leader drone may receive control information from a server such as a server that configured the operation. The control information may include operation parameters, constraints for performing the operation, a pre-plan, any combination of the foregoing, etc. The leader drone may determine plans for performance of the operation based on high-level information for the operation. For example, the leader drone may determine plans for one or more follower drones to perform a task or an element of task of the operation, and instruct the follower drones to implement the plans for performing the task/element.

According to various embodiments, in the case that process 900 is implemented by a follower drone, the follower drone may implement a plan to perform the task/element. The follower drone may receive the plan from the leader drone. In some embodiments, the follower drone may update the plan to fill in gaps in the plan received from the leader drone. For example, the follower drone modifies the plan to have more granularity than the plan received from the leader drone.

At 930, a determination is made as to whether an asset has failed. According to various embodiments, the determination of whether an asset has failed may be based on an amount of time since the asset last communicated with the drone, or a lack of response to a ping for a health status of the asset. In response to determining that an asset has failed, process 900 proceeds to 940.

At 940, the plan is updated. According to various embodiments, the plan is updated in consideration of the determination that the asset has failed.

According to various embodiments, in the case that process 900 is implemented by a leader drone, the leader drone may determine a status of the operation, such as a status of a task/element that was assigned to the asset determined to have failed. The leader drone may update the plan based on the status of the task/element and to reallocate any remaining assignments (e.g., uncompleted portions of the task/element assigned to the asset) to one or more remaining assets in the set of assets assigned to perform the operation.

According to various embodiments, in the case that process 900 is implemented by a follower drone, the follower drone may update the plan in response to a determination that a leader drone has failed. In response to determining that the leader drone failed, the follower drone may negotiate to resolve a new leadership with one or more other remaining assets in the set of assets. In response to the leader drone being elevated to new leader drone, the new leader drone may update the plan based on the status as the new leader drone. For example, the new leader drone may determine one or more plans for the remaining assets. The new leader drone may determine the plans based on the respective capabilities of the remaining assets and capabilities or characteristics associated with tasks/elements remaining to be completed in the performance of the operation.

At 950, information pertaining to the updated plan is communicated. In some embodiments, the updated plan is communicated to the remaining assets.

At 960, information is communicated during implementation of the updated plan.

According to various embodiments, in the case that process 900 is implemented by a leader drone, the leader drone may receive information from a follower drone/asset or the server. As an example, the leader drone may receive control information from a server such as a server that configured the operation. The control information may include updated operation parameters, constraints for performing the operation, a pre-plan, any combination of the foregoing, etc. As another example, the leader drone may receive from a follower drone feedback information pertaining to the operation such as feedback information obtained by the follower drone during implementation of the updated plan.

According to various embodiments, in the case that process 900 is implemented by a follower drone, the follower drone send to the leader drone feedback information.

At 970, a determination is made as to whether process 900 is completed. In response to a determination that process 900 is completed, process 900 ends. In response to a determination that process 900 is not complete, process 900 may return to 920. According to various embodiments, process 900 is determined to be complete in response to a determination that the one or more elements are complete, or that the operation is complete. Process 900 may also be determined to be complete if the operation is paused or cancelled/abandoned. Process 900 may proceed to 970 in response to a determination at 930 that an asset failure has not occurred.

Figure 9B:
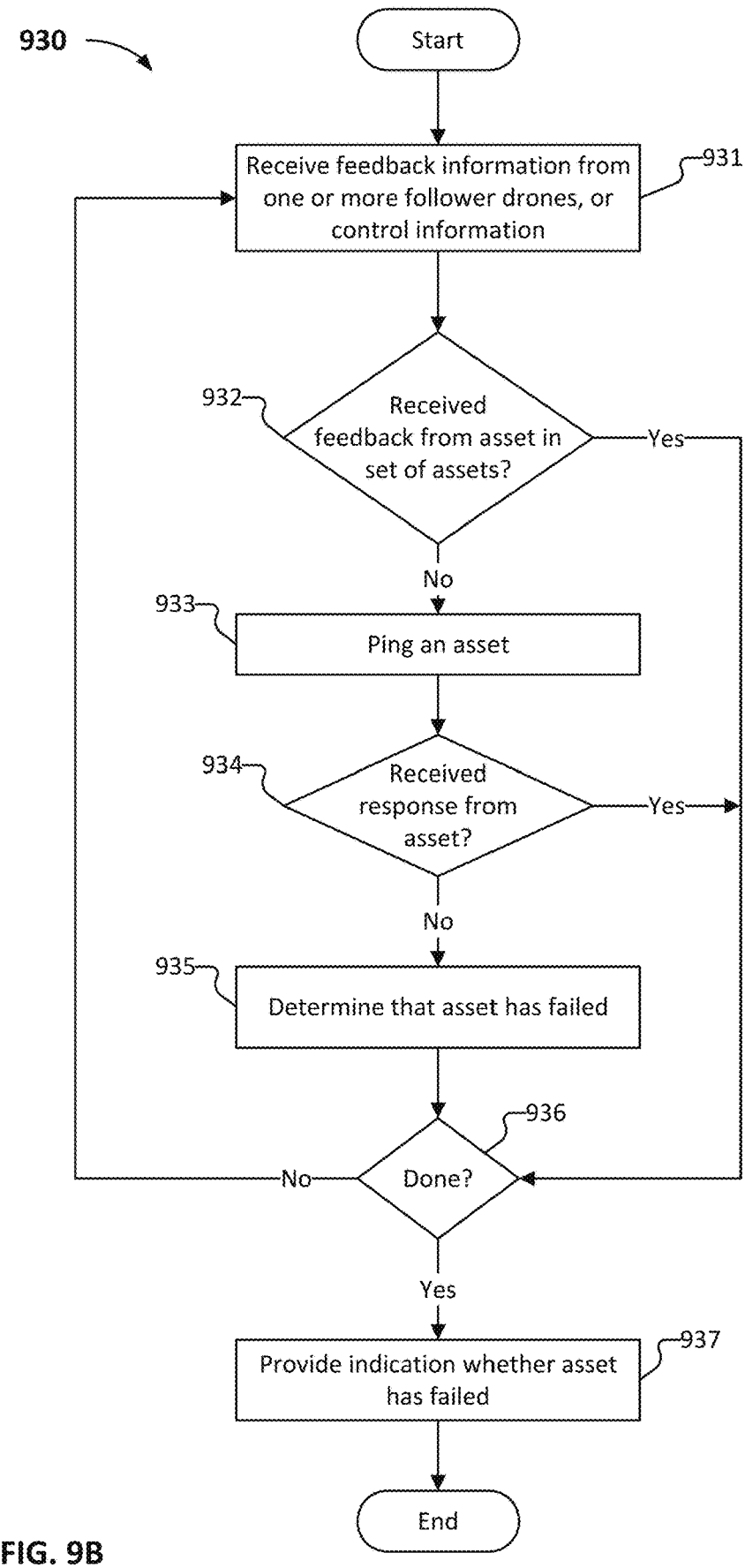
FIG. 9B is a diagram illustrating a method for implementing a plan associated with an operation according to various embodiments of the present application.

FIG. 9B is a diagram illustrating a method for implementing a plan associated with an operation according to various embodiments of the present application. In some embodiments, process 930 of FIG. 9A is performed by asset 120, asset 125, and/or asset 130 of system 100 of FIG. 1, and/or device 300 of FIG. 3. Process 930 of FIG. 9B may correspond to 930 of process 900 of FIG. 9A.

At 931, feedback information is received from one or more follower drones, or control information is received. In some embodiments, a leader drone may receive feedback information from a follower drone contemporaneous with the follower drone implementing a plan to perform a task/operation. In some embodiments, a leader drone may receive control information (e.g., updated control information) from a server. For example, the control information may include an indication that the operation is updated, an operation parameter, an operation constraint, an indication/instruction for modifying the set of assets, etc.

At 932, a determination is made as to whether feedback from an asset in the set of assets has been received. In some embodiments, the leader drone performs process 930 of FIG. 9B with respect to each asset in the set of assets. For example, the leader drone may determine whether feedback information has been received from a particular follower drone. In some embodiments, the determination of whether feedback information has been received from a particular asset may be based on a time elapsed since a last time the particular asset communicated feedback information. In some embodiments, the determination of whether feedback information has been received from a particular asset within a predefined threshold of time is made. In some embodiments, the determination of whether feedback information has been received from a particular asset by a predetermined time such as an expected time (e.g., the expected time may be determined based at least in part on the plan being implemented by the asset, a location of the asset, a communication link with the asset, etc.) is made.

In response to a determination that feedback information has been received from the asset in the set of assets at 932, process 930 proceeds to 936. At 936, a determination is made as to whether process 930 is completed. In response to a determination that process 930 is completed, process 930 proceeds to 937. In response to a determination that process 930 is not complete, process 930 may return to 931. According to various embodiments, process 930 is determined to be complete in response to a determination that the one or more elements are complete, or that the operation is complete. Process 930 may also be determined to be complete if the operation is paused or cancelled/abandoned. At 937, an indication of whether the asset has failed is provided. In some embodiments, a module that determines whether an asset has failed provides the indication of whether the asset has failed to a planning service of a leader drone (e.g., a service that determines/updates a plan for performing one or more tasks associated with an operation).

In response to a determination that feedback information has not been received from the asset in the set of assets at 932, process 930 proceeds to 933. At 933, a ping is sent to the asset. The leader drone may send the ping as a health check for the asset.

At 934, a determination is made as to whether a response is received from the asset. In some embodiments, the leader drone determines whether the response is received based on a determination of whether the asset has replied to the ping within a threshold period of time. In response to a determination that a response (to the ping) is received from the asset, process 930 proceeds to 936. Conversely, in response to a determination that a response (to the ping) was not received, process 930 proceeds to 935 at which the asset is determined to have failed. Process 930 then proceeds to 936.

Figure 9C:
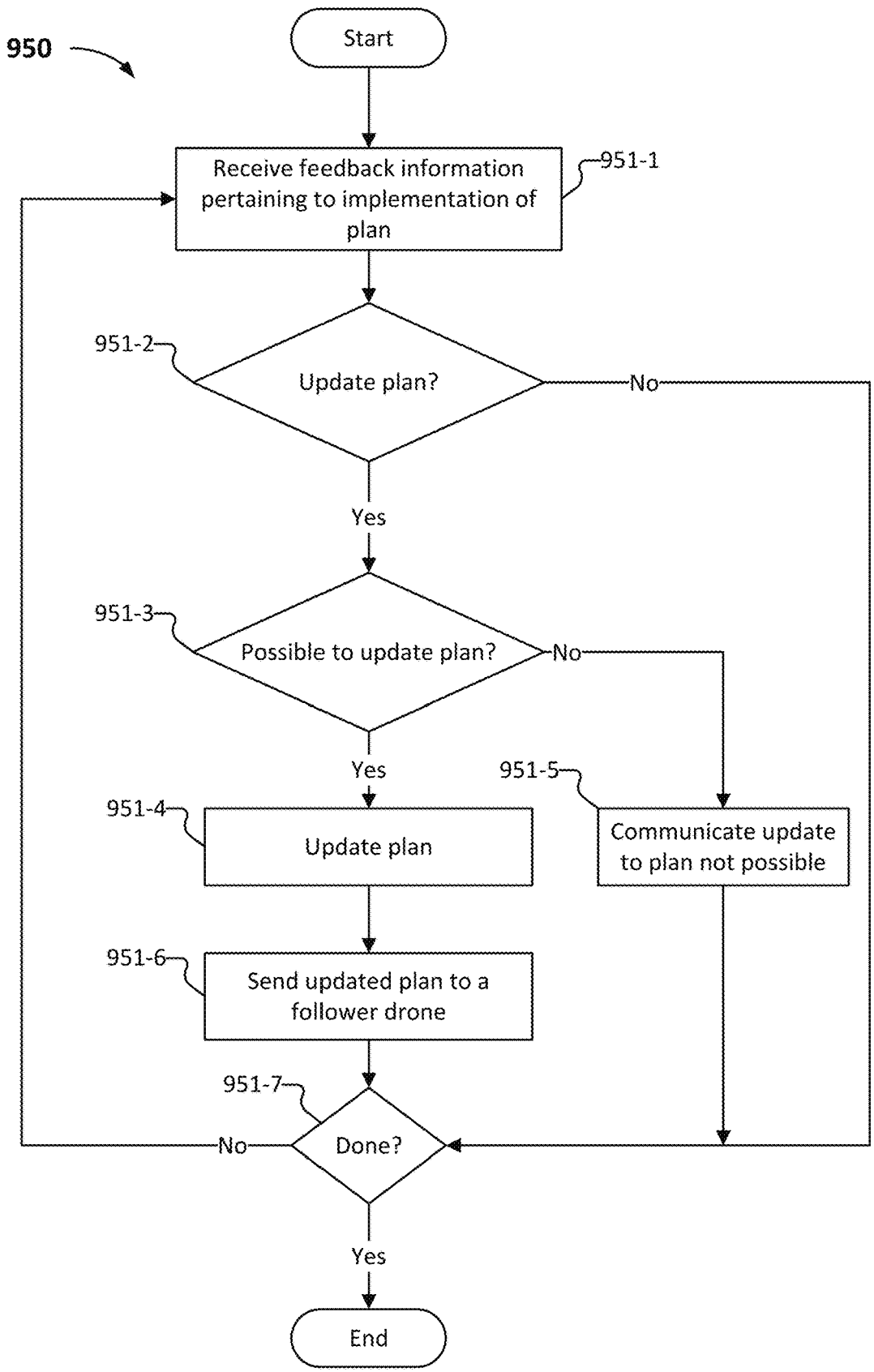
FIG. 9C is a diagram illustrating a method for implementing a plan associated with an operation according to various embodiments of the present application.

FIG. 9C is a diagram illustrating a method for implementing a plan associated with an operation according to various embodiments of the present application. In some embodiments, process 950 of FIG. 9C is performed by asset 120, asset 125, and/or asset 130 of system 100 of FIG. 1, and/or device 300 of FIG. 3. Process 950 of FIG. 9C may correspond to 950 of FIG. 9A. In some embodiments, 950 is implemented by a semi-autonomous leader drone.

At 951-1, feedback information pertaining to implementation of the plan is received. According to various embodiments, a leader drone receives feedback information from a follower drone contemporaneous with performance of a plan pertaining to a task or an element of a task associated with an operation. The feedback information may include current/contemporaneous information such as a current location, a live video stream, a current status of the operation (e.g., in the case of a surveillance operation, the status may be no targets present in defined zone of the operation), etc.

At 951-2, a determination is made as to whether the plan is to be updated. In some embodiments, the leader drone determines whether to update the plan (e.g., a plan for a particular follower drone or for a plurality of follower drones) based at least in part on the feedback information.

In response to a determination that the plan is not to be updated, process 950 proceeds to 951-7 at which a determination is made as to whether process 950 is completed. In response to a determination that process 950 is completed, process 950 ends. In response to a determination that process 950 is not complete, process 950 may return to 951-1. According to various embodiments, process 950 is determined to be complete in response to a determination that the one or more elements are complete, or that the operation is complete. Process 950 may also be determined to be complete if the operation is paused or cancelled/abandoned.

In response to a determination that the plan is to be updated, process 950 proceeds to 951-3 at which a determination is made as to whether updating the plan is possible. In some embodiments, the leader drone determines whether updating the plan is possible based on the parameters of the operation, a status of the operation, a capability of one or more assets in the set of assets, etc. For example, if the operation is determined to be updated or a required capability to perform the operation is changed or newly determined, the leader drone may determine whether the set of assets comprises an asset having the required capability.

In response to a determination that updating the plan is not possible at 951-3, process 950 proceeds to 951-5 at which an indication that an update to the plan is not possible is communicated. In some embodiments, leader drone may provide a prompt to a user at a user interface or to the server (which may cause a prompt at the client terminal) that the plan may not be updated. The prompt may include an element by which a user may cancel the operation, modify the operation, etc. Process 950 then proceeds to 951-7.

In response to a determination that updating the plan is possible at 951-3, process 950 proceeds to 951-4 at which the plan is updated. In some embodiments, the leader terminal correspondingly updates the plan (e.g., based at least in part on the feedback information). The plan may be updated based at least in part on a capability of a follower drone.

At 951-6, the updated plan is sent to the follower drone. Process 950 may then proceed to 951-7.

Figure 9D:
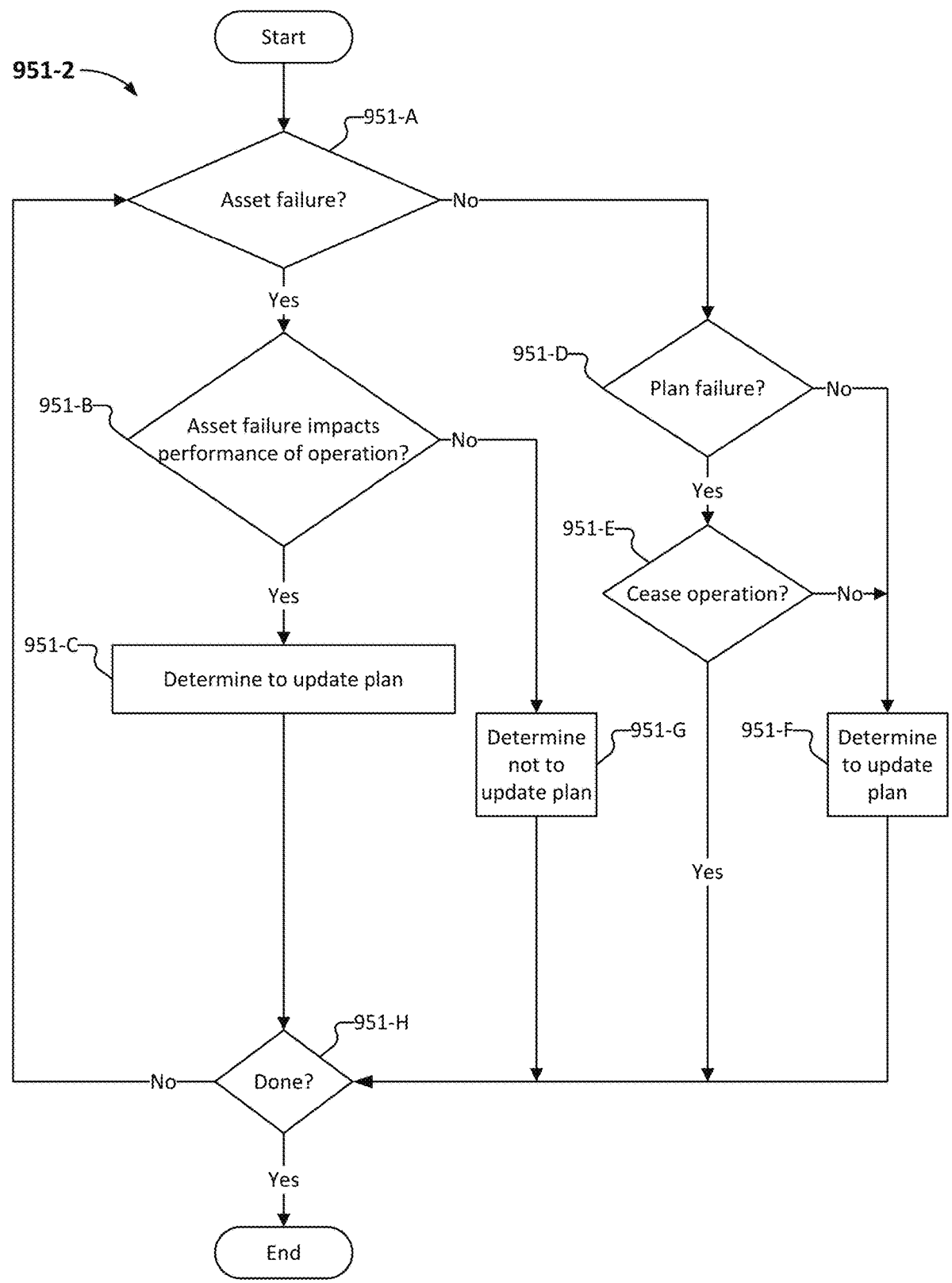
FIG. 9D is a diagram illustrating a method for implementing a plan associated with an operation according to various embodiments of the present application.

FIG. 9D is a diagram illustrating a method for implementing a plan associated with an operation according to various embodiments of the present application. In some embodiments, process 951-2 of FIG. 9D is performed by asset 120, asset 125, and/or asset 130 of system 100 of FIG. 1, and/or device 300 of FIG. 3. Process 951-2 of FIG. 9D may correspond to 951-2 of FIG. 9C. In some embodiments, 951-2 is implemented by a semi-autonomous leader drone.

At 951-A, a determination is made as to whether an asset failure has occurred. According to various embodiments, the determination of whether an asset has failed may be based on an amount of time since the asset last communicated with the drone, or a lack of response to a ping for a health status of the asset.

In response to determining that an asset failure has occurred, process 951-2 proceeds to 951-B at which a determination is made as to whether the asset failure impacts performance of the operation. The leader drone may determine whether the asset that has failed had any outstanding tasks or elements that impacted the operation.

In response to determining that the asset failure does not impact performance of the operation, process 951-2 may proceed to 951-G at which a determination is made not to update the plan. Process 951-2 may then proceed to 951-H at which a determination is made as to whether process 951-2 is completed. In response to a determination that process 951-2 is completed, process 951-2 ends. In response to a determination that process 951-2 is not complete, process 951-2 may return to 951-A. According to various embodiments, process 951-2 is determined to be complete in response to a determination that the one or more elements are complete, or that the operation is complete. Process 951-2 may also be determined to be complete if the operation is paused or cancelled/abandoned.

In response to determining that the asset failure impacts performance of the operation, process 951-2 may proceed to 951-C at which a determination is made to update the plan. Process 951-2 may then proceed to 951-H at which a determination is made as to whether process 951-2 is completed. In response to a determination that process 951-2 is completed, process 951-2 ends.

In response to determining that an asset has not failed, process 951-2 proceeds to 951-D. At 951-D, a determination is made as to whether the plan has failed. In some embodiments, the leader drone may determine whether the plan failed based on a determination whether the asset has failed. For example, if the plan had a corresponding capability (e.g., a required capability) and if the failed asset had a capability for which the set of assets did not include redundancy across at least one other asset (and a determination that a new asset/capability cannot be acquired), the leader drone may determine that the plan failed.

In response to determining that the plan has failed, process 951-2 proceeds to 951 -E at which a determination is made as to whether the operation is to be ceased (or paused). The leader drone may determine to cease the operation in response to a determination that the plan is a required component (comprises a task/element required by the operation) of the operation. The leader drone may determine to cease the operation based at least in part on a determination that the operation has a corresponding capability (e.g., a required capability) and that the failed asset had a capability for which the set of assets do not include redundancy across at least one other asset (and a determination that a new asset/capability cannot be acquired).

In response to determining to cease the operation at 951-E, process 951-2 proceeds to 951-H.

In response to a determination that a plan failure did not occur at 951-D, or that operations are not to be cased at 951-E, process 951-2 proceeds to 951-F at which the plan is determined to be updated.

Figure 9E:
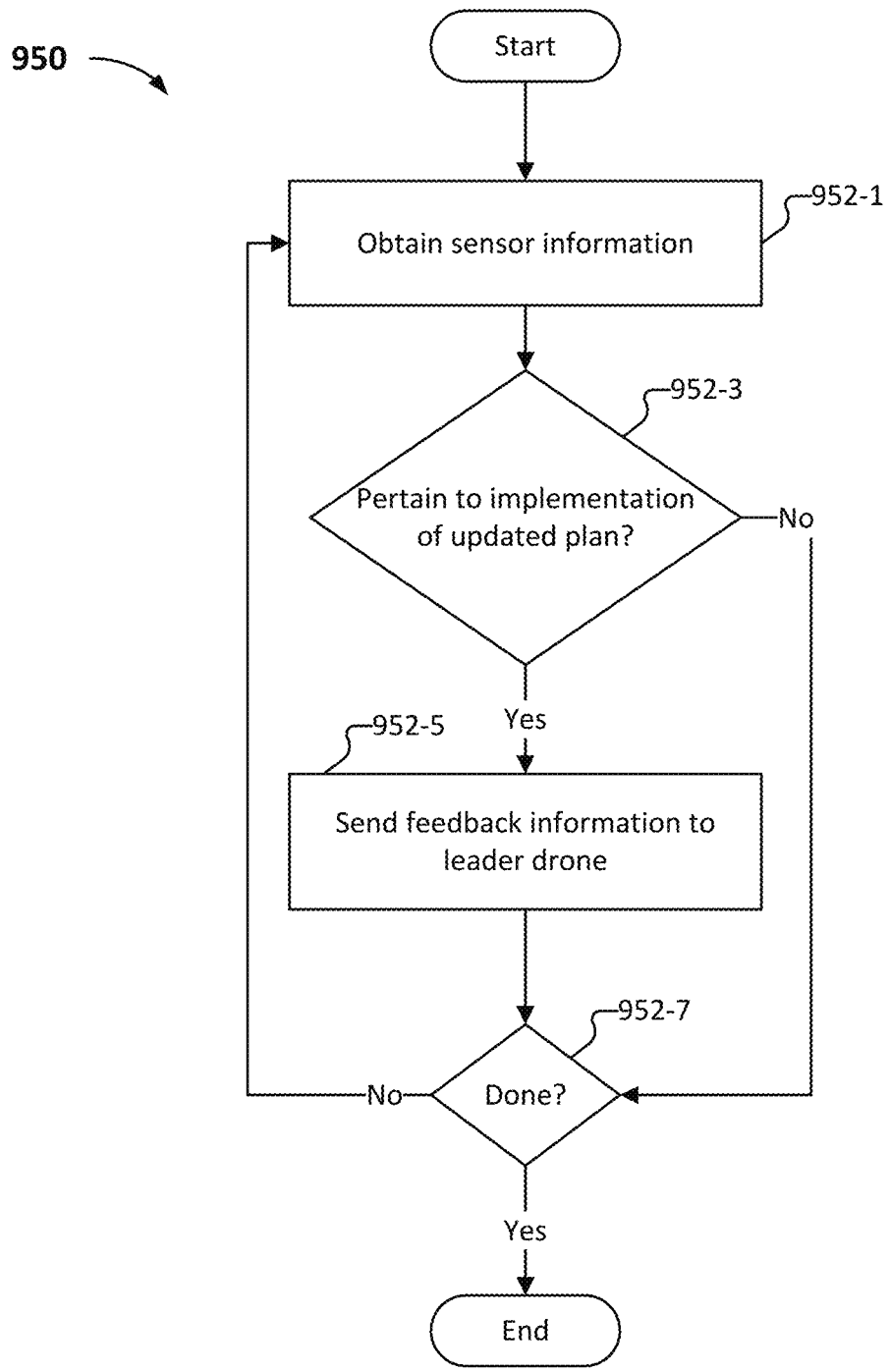
FIG. 9E is a diagram illustrating a method for implementing a plan associated with an operation according to various embodiments of the present application.

FIG. 9E is a diagram illustrating a method for implementing a plan associated with an operation according to various embodiments of the present application. In some embodiments, process 950 of FIG. 9E is performed by asset 120, asset 125, and/or asset 130 of system 100 of FIG. 1, and/or device 300 of FIG. 3. Process 950 of FIG. 9E may correspond to 950 of FIG. 9A. In some embodiments, 950 is implemented by a semi-autonomous follower drone.

At 952-1, data from one or more sensors of the drone is received. In some embodiments, during implementation of a plan, such as a plan provided by a leader drone, the follower drones obtains information pertaining to the element/operation. For example, the follower drone may capture information such an image, a live stream video, a weather information, etc.

At 952-3, a determination is made as to whether the data pertains to the plan. In some embodiments, in response to receiving data from sensors on the drone, the drone determines whether such data relates to the plan being implemented. As an example, in the case of a plan to track a target, data received from a sensor may include an image. The drone may determine whether the image includes the target for which the drone is to track. For example, the drone may perform an image analysis and determine that the target is in the image (or that the likelihood that the image comprises the target exceeds a predefined threshold), etc.

In response to determining that the data pertains to the plan, process 950 may proceed to 952.5 at which information pertaining to the plan is sent to the leader drone. In some embodiments, the follower drone may determine that the captured information relates to the plan (e.g., indicates a status of the element/operation, includes a target/subject of the plan, includes information pertaining to the geographical area in which the plan is to be operated, etc.).

In response to sending the information pertaining to the plan to the leader drone, process 950 proceeds to 952-7 at which a determination is made as to whether 950 is complete. In some embodiments, process 950 is determined to be complete in response to a determination that the operation is complete, abandoned, and/or paused. In response to a determination that process 950 is complete, process 950 ends. In response to a determination that process 950 is not complete, process 950 may return to 952-1 at which the drone continues to monitor for data/information captured by its sensors and iteratively send relevant information to the leader drone.

If the data is determined to not pertain to the plan at 952-3, process 950 proceeds to 952-1, and 952-1 is performed as discussed above.

Figure 10A:
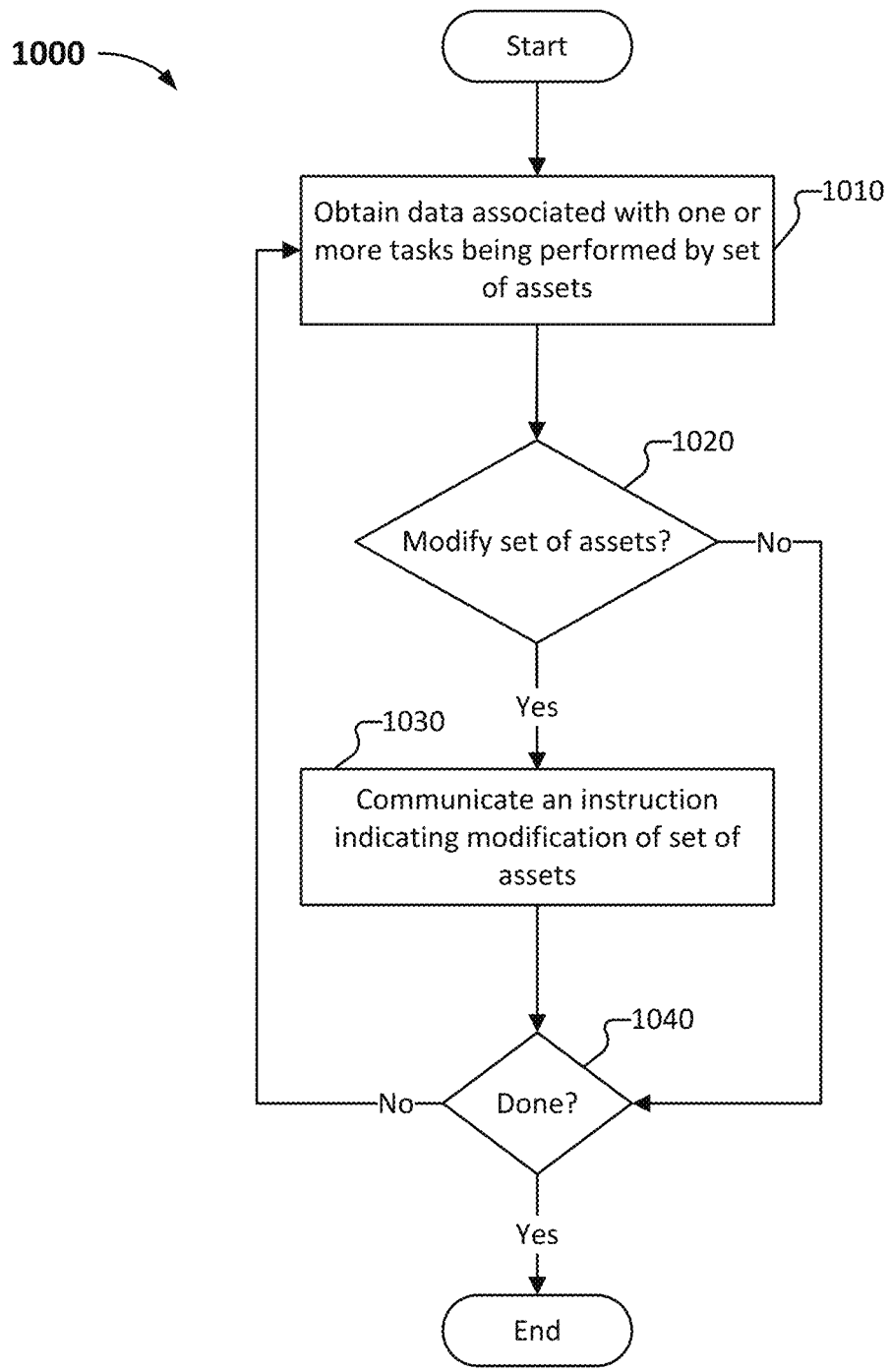
FIG. 10A is a diagram illustrating a method for implementing a plan associated with an operation according to various embodiments of the present application.

FIG. 10A is a diagram illustrating a method for implementing a plan associated with an operation according to various embodiments of the present application. In some embodiments, process 1000 of FIG. 10A is performed by server 105, asset 120, asset 125, and/or asset 130 of system 100 of FIG. 1, device 200 or FIG. 2, and/or device 300 of FIG. 3. According to various embodiments, process 1000 is implemented by a semi-autonomous drone, or a server that manages an operation.

At 1010, data associated with one or more tasks being performed by a set of assets is obtained. According to various embodiments, the data associated with the one or more tasks may comprise information relating to an update to a configuration/definition of an operation, or feedback information obtained and communicated during performance of a task or element of a task. The update to the configuration/definition of an operation may be based at least in part on one or more user inputs corresponding to a user request to modify the operation (e.g., to accelerate the completion of the operation, to change a priority of the operation such as relative to at least one other operation, etc.). The feedback information may include a change in a context of the operation, such as a condition being satisfied that triggers one or more other tasks. As an illustrative example, it the context of a surveillance operation in a defined geographical zone, the operation may be defined to trigger a tracking task if a target object/vehicle is detected within the geographical zone. Accordingly, if during a surveillance task by one or more follower drones a target is sighted in the geographical zones, a follower drone may provide feedback information to the leader drone indicating the sighting. As another illustrative example, the feedback information may include an indication that a follower drone has failed or been destroyed. Failure or destruction of a follower drone may reduce the capabilities of the set of assets, or the redundancy of a capability of the set of assets.

According to various embodiments, in the case of the process 1000 implemented by a leader drone, the leader drone may receive the data associated with the one or more tasks from the server such as via control information, or from one or more follower drones such as via feedback information sent contemporaneous with the follower drones implementing a plan(s) in connection with performing the operation (e.g., implementing the one or more tasks).

According to various embodiments, in the case of the process 1000 implemented by a server, the server may receive the data associated with the one or more tasks from the server such as via a user input to a user interface. The user may input an instruction or request to a user interface which may cause the operation to be modified or parameters of the operation to be modified.

At 1020, a determination is made as to whether the set of assets is to be modified. According to various embodiments, the determination of whether to modify the set of assets may be based at least in part on the data associated with the one or more tasks being performed by the set of assets (e.g., operation data pertaining to a current status or characteristics of the operation). The determination of whether to modify the set of asset may comprise a determination to add one or more assets to the set of assets. Similarly, the determination of whether to modify the set of asset may comprise a determination to remove one or more assets from the set of assets. For example, a device may determine that new tasks are to be performed based at least in part on the data. As another example, the new tasks may include, or require, a capability for which the current set of assets does not comprise an asset with the corresponding capability. As another example, the device may determine that an asset failure has caused the set of assets to lose a capability or a redundancy in a capability. Redundancy in a capability may permit multiple tasks requiring the capability to be performed (e.g., in parallel) by a plurality of assets having the capability. A loss of a redundancy of the capability may reduce the number of tasks that may be performed in parallel, or may reduce the flexibility with which the leader drone may assign tasks or determine plans across the set of assets.

According to various embodiments, the determination to modify the set of assets may be based on a determination to add a capability to the set of assets, and/or on a determination that a capability of the set of assets is no longer required for the current operation (or not expected to be required). The set of assets may be determined to be modified to add one or more assets, or to remove one or more assets, or both add one or more assets and remove one or more assets. In some embodiments, the determination of whether to modify the set of assets may be based on a cost (e.g., as determined using a predefined cost function) associated with using the set of assets to perform the operation, or the remainder of the operation. The determining of whether to modify the set of assets during performance of the operation allows for a dynamic management of resources that may, for example, ensure that the appropriate capabilities are allocated to the set of assets. Further, the dynamic management of resources may allow for an optimization or improvement of costs associated with performing operations.

In response to a determination to modify the set of assets at 1020, process 1000 proceeds to 1030 at which an instruction indicating a modification of the set of assets is communicated. The instruction may be provided to the assets impacted (e.g., being added to, or removed from, the group), and/or the leader asset(s) for the corresponding set of assets.

According to various embodiments, in the case of the process 1000 implemented by a leader drone, the leader drone may send the instruction to modify the set of assets to the asset impacted by the modification, and/or to the server such as the server managing or configuring the operation. In some implementations, the leader drone may send the instruction or an indication of the modification to an ownership service that manages the ownership of assets across a plurality of organizations. For example, the instruction may be sent to the ownership service in connection with negotiation of an ownership for the asset(s) impacted by the modification.

According to various embodiments, in the case of the process 1000 implemented by a server, the server communicate the instruction to modify the set of assets to the leader drone and/or to the asset(s) impacted by the modification. The server may also provide an indication to a user via a user interface on a client terminal, wherein the indication notifies the user that the set of assets is modified.

In response to communicating the instruction indicating modification of the set of assets, process 1000 proceeds to 1040 at which a determination is made as to whether 1000 is complete. In some embodiments, process 1000 is determined to be complete in response to a determination that the operation is complete, abandoned, and/or paused. In response to a determination that process 1000 is complete, process 1000 ends. In response to a determination that process 1000 is not complete, process 1000 may return to 1010 at which the drone continues to monitor for data/information captured by its sensors and iteratively send relevant information to the leader drone. In addition, in response to a determination that the set of assets is not to be modified at 1020, process 1000 may proceed to 1040.

Figure 10B:
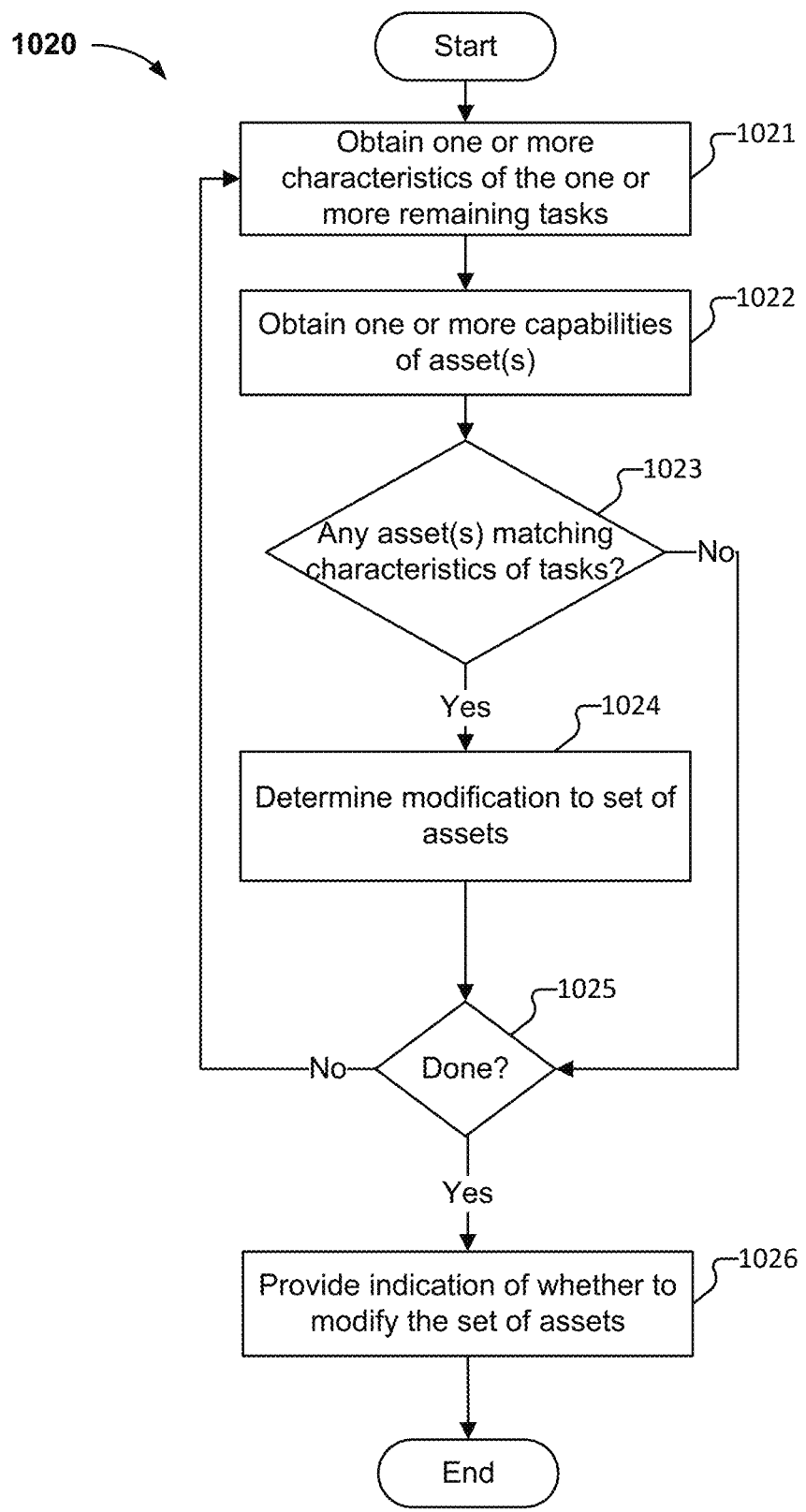
FIG. 10B is a diagram illustrating a method for implementing a plan associated with an operation according to various embodiments of the present application.

FIG. 10B is a diagram illustrating a method for implementing a plan associated with an operation according to various embodiments of the present application. In some embodiments, process 1020 FIG. 10B is performed by server 105, asset 120, asset 125, and/or asset 130 of system 100 of FIG. 1, device 200 of FIG. 2, and/or device 300 of FIG. 3. Process 1020 of FIG. 10B may correspond to 1020 of FIG. 10A.

At 1021, one or more characteristics of the one or more remaining tasks is obtained. In some embodiments, the device (e.g., a server or drone such as a leader drone) may determine the remaining task(s) for an operation, and determine one or more characteristics associated with the remaining task(s). The one or more characteristics associated with the remaining tasks may be determined based on a mapping of tasks to characteristics. For example, the device may query the mapping of tasks to characteristics using the remaining task(s).

At 1022, one or more capabilities of the assets are obtained. In some embodiments, the device may obtain the one or more capabilities of the assets based on a mapping of capabilities to assets. The mapping of capabilities of assets may be determined based on a querying the assets for an indication of their capabilities (or their current capabilities), based on the assets registering/advertising their capabilities, etc.

At 1023, a determination is made as to whether any assets match the characteristics of the remaining task(s). In some embodiments, the server determines one or more capabilities corresponding to the characteristics of the tasks, and determines assets having capabilities matching the capabilities corresponding to the characteristics of the tasks. In response to determining that an asset or a set of assets comprises capabilities matching the characteristics of the remaining task(s), process 1020 may proceed to 1024.

At 1024, a modification to the set of assets is determined. In some embodiments, the device determines the set of assets from among the assets having a capability matching a characteristic of the one or more remaining tasks. In some embodiments, the device determines the modification to the set of assets based on the assets within the set of assets having a set of capabilities that do not match a characteristic of the one or more remaining tasks (e.g., there is no overlap between the capabilities of the asset to be removed and the characteristics/capabilities of the remaining task(s)). The device may select an asset to be added in the set of assets based availability of the asset, an ownership of the asset, an availability of transfer of ownership of the asset, a determination for the set of assets to have redundancy with respect to a capability, etc. In some embodiments, the device uses a cost function in connection with selecting an asset(s) to include in, or to remove from, the set of assets. For example, the server may use the cost function to optimize a cost of the set of assets, or to select a set of assets having a cost less than a threshold cost value.

In response to determination of the set of assets, process 1020 proceeds to 1025 at which a determination is made as to whether the determination of the set of assets is complete. For example, the device may prompt a user to confirm the set of assets, or provide a selectable element with which a user may select to refine/modify the one or more tasks or capabilities of the tasks. In response to determining that the determination of the set of assets is not complete, process 1020 returns to 1021. Otherwise, process 1020 proceeds to 1026. At 1023, if assets matching the characteristics of the remaining task(s) are not found (or if, for each characteristic of the task, an asset having a corresponding capability is not found), process 1020 may proceed to 1025. At 1026, an indication of whether to modify the set of assets is provided. In some embodiments, the indication of whether to modify the assets is provided to a planning service running on the leader drone. In some embodiments, the indication of whether to modify the assets is provided to a control service at a server, etc.

Figure 11:
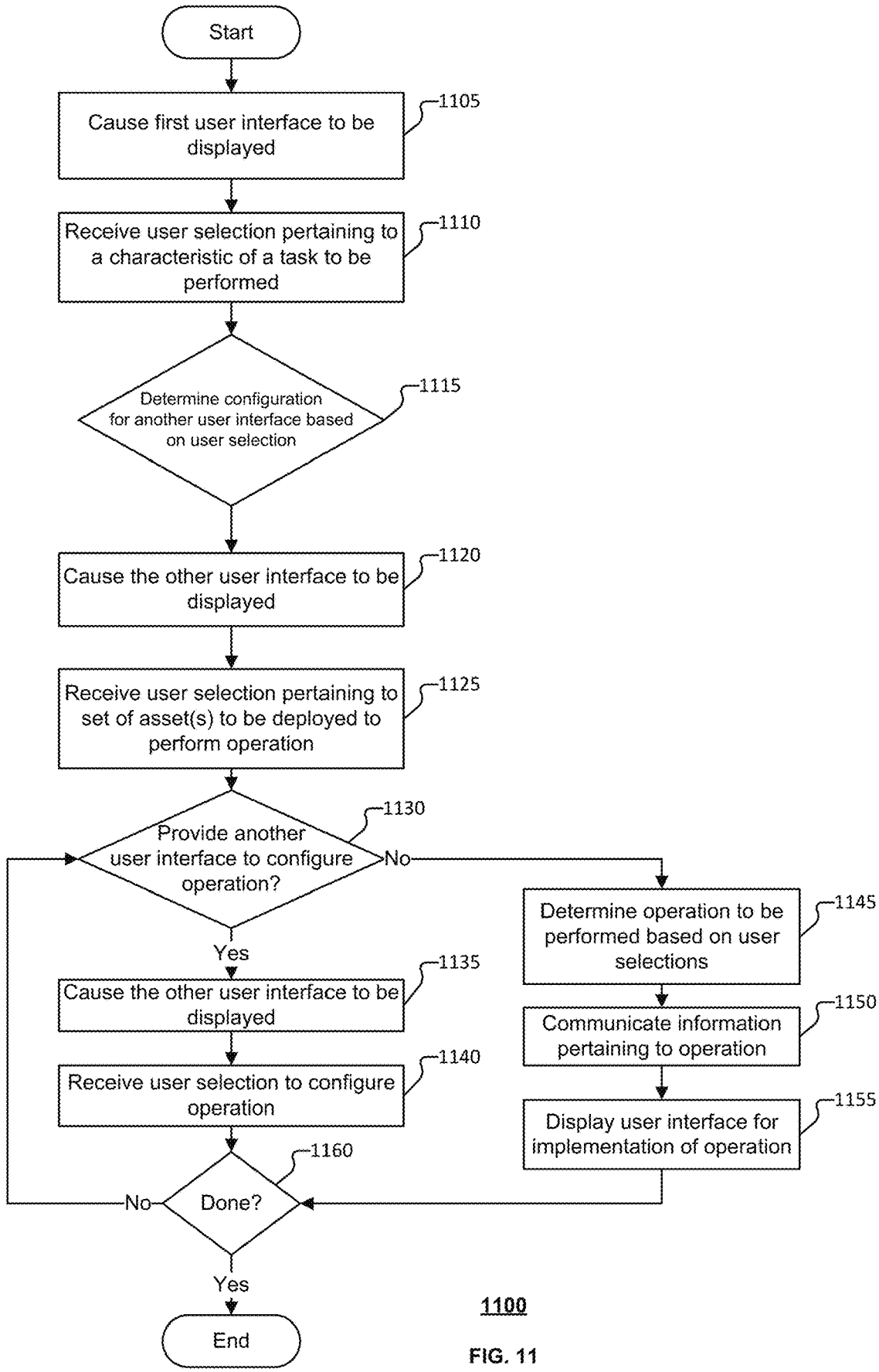
FIG. 11 is a diagram illustrating a method for configuring an operation according to various embodiments of the present application.

FIG. 11 is a diagram illustrating a method for configuring an operation according to various embodiments of the present application. In some embodiments, process 1100 of FIG. 11 is performed by server 105, asset 120, asset 125, and/or asset 130 of system 100 of FIG. 1, or device 200 of FIG. 2. According to various embodiments, process 1100 is implemented by a server such as a server that configures and/or manages an operation. Process 1100 may be implemented by a server in conjunction with a client terminal.

At 1105, a first user interface is displayed. In some embodiments, the server causes a client terminal to display the first user interface. The first user interface may correspond to an interface via which one or more characteristics or parameters associated with an operation are input by a user. For example, the first user interface may be used in connection with the defining of an operation. The user may input the one or more characteristics or parameters via one or more selectable elements provided on the user interface.

At 1110, a user selection pertaining to a characteristic of a task to be performed is received. The user selection may be made to the client terminal and the client terminal may communicate the user selection to the server via one or more networks.

At 1115, a configuration for another user interface is determined based at least in part on the user selection. In some embodiments, the server determines one or more characteristics, parameters, or constraints mapped to the user selection (e.g., mapped to the characteristic of a task). For example, if a user selection to the first user interface is selection of a type of operation, such as surveillance, the server may determine another user interface to include definition of context for the surveillance, such as a time, a date, a geographic location, a type of target (e.g., a moving target, a static target, etc.). As another example, For example, if a user selection to the first user interface is selection of a type of operation and/or a context of the operation, such as surveillance, the server may determine another user interface to include definition of one or more characteristics pertaining to an asset to be used in connection with performing the operation.

At 1120, the other user interface is displayed. In some embodiments, in response to determining a configuration of the other interface, the server causes a client terminal to display the other user interface.

At 1125, a user selection pertaining to a set of assets to be deployed to perform the operation is received. The user selection may be a selection of particular assets, or types of assets, to be deployed to perform the operation. In some embodiments, the user selection pertaining to a set of assets to be deployed to perform the operation comprises a user selection to one or more parameters of the operation from which the server determines a set of assets or types of assets to deploy. The user selection may be made to the client terminal and the client terminal may communicate the user selection to the server via one or more networks.

At 1130, a determination of whether to provide another user interface to configuration the operation is made. The determination of whether to provide another user interface may be based at least in part on the parameters of the operation and/or set of assets obtained in the first user interface and the other user interface. In some embodiments, the determination of whether to provide another user interface is based on a user input such as to cancel the operation, or to initiate the operation. For example, the server may fill in the gaps of the definition of the operation and deploy the corresponding set of assets. As an example, the server may determine any remaining parameters of the operation based at least in part on one or more of (i) historical information such as information of similar/past operations, (ii) a best fit in relation to the user-defined parameters of the operation, (iii) a determined cost, using a cost function, of performing the operation.

In response to determining that another user interface is to be provided to configure the operation, process 1100 proceeds to 1135 at which another interface is caused to be displayed. The other interface may be configured based at least in part on the user selection pertaining to the characteristic of the task to be performed, and/or the user selection pertaining to the set of assets to be deployed.

At 1140, a user selection to the other user interface is received. The user selection may be a further input pertaining to a definition or configuration of the operation. The user selection may be made to the client terminal and the client terminal may communicate the user selection to the server via one or more networks. Process 1100 may then proceed to 1160.

At 1160, a determination is made as to whether the determination of the configuration of the operation is complete. For example, the device may prompt a user to confirm the set of assets, confirm a configuration of the operation, or provide a selectable element with which a user may select to refine/modify the one or more tasks or capabilities of the tasks. In response to determining that the configuration of the operation is not complete, process 1100 returns to 1130 at which point the process iteratively configures a user interface based on a user input to the previous user interface, or a user input to one or more previous user interfaces. Otherwise, process 1100 ends.

In response to a determination to not provide a user interface in connection with configuring the operation at 1130, process 1100 may proceed to 1145 at which the operation to be performed is determined (e.g., defined) based at least in part on the user selections. Other variables may be used in connection with determining the operation, including historical information (e.g., information for similar operations), a cost of performing the operation (e.g., the operation may be defined to minimize a cost, or reduce a cost of performing the operation to below a defined threshold cost).

At 1150, information pertaining to the operation is communicated. In some embodiments, the server communicates an indication of the operation to one or more of the assets. For example, the server may communicate an indication of the operation to the leader drone of the set of assets determined to perform the operation. The indication of the operation may be an instruction for the leader drone or the set of assets to perform the operation. In some embodiments, the indication of the operation may include one or more of a parameter of the operation, a constraint of the operation, an indication of the set of assets, etc.

At 1155, a user interface for implementation of the operation is displayed. In some embodiments, the server causes a client terminal to display the user interface for implementation of the operation to be displayed. The user interface for implementation of the operation may provide information pertaining to a current status of the operation such as a live video stream, an indication of tasks of the operation that have been completed, tasks of the operation still to be performed, an indication of the task(s) currently being performed. In some embodiments, the user interface for implementation of the operation includes information pertaining to the set of assets. For example, the user may select to drill down to see more granular information pertaining to the set of assets such as a status of an asset (e.g., offline, failed, online, operating normally, operating partially normally, etc.), a list of capabilities of an asset or the set of assets, a current set of capabilities of an asset or the set of assets, etc. In some embodiments, the user interface for implementation of the operation includes one or more selectable elements with which the user may input a user input. Examples of the user input may include pausing the operation, cancelling the operation, modifying the operation (e.g., modifying a parameter of the operation), modifying the set of assets, etc.

According to various embodiments, the server configures and provides a set of user interfaces at least a subset of which are logically connected based at least in part on a user input in different user interfaces. For example, a set of user interfaces may be configured and provided to the user to prompt the user to input information pertaining to operation being configured. The information input by the user may include a parameter or characteristic of the operation, a type of operation, a type(s) of assets to be used, etc. In some embodiments, a user interface in the set of user interfaces used to configure an operation is based at least in part on one or more user inputs to an immediately preceding user interface in the set of user interfaces.

Figure 12A:
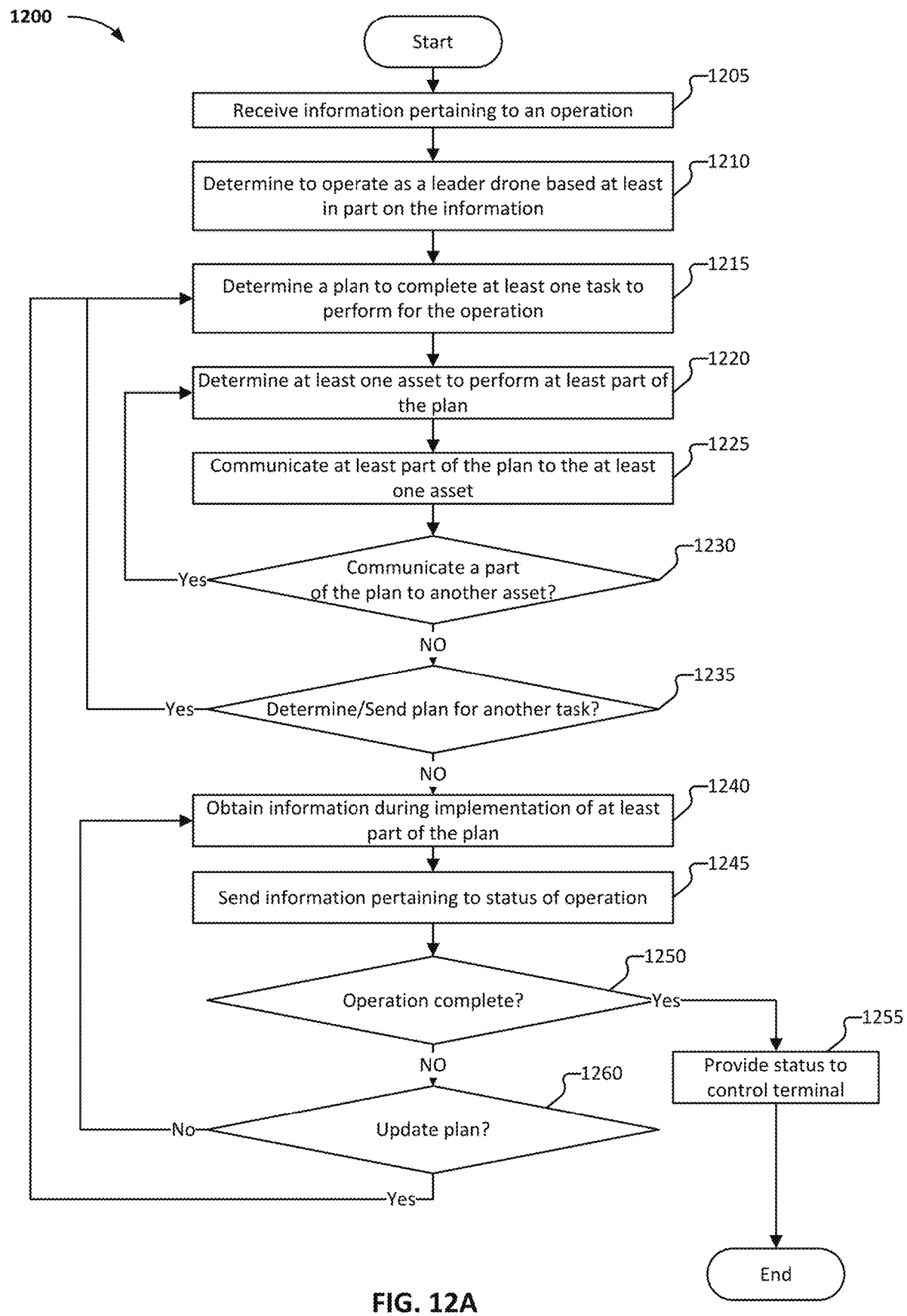
FIG. 12A is a diagram illustrating a method for implementing a plan associated with an operation according to various embodiments of the present application.

FIG. 12A is a diagram illustrating a method for implementing a plan associated with an operation according to various embodiments of the present application. In some embodiments, process 1200 of FIG. 12A is performed by asset 120, asset 125, and/or asset 130 of system 100 of FIG. 1, and/or device 300 of FIG. 3. According to various embodiments, process 1000 is implemented by a semi-autonomous drone.

At 1205, information pertaining to an operation is received. In some embodiments, an asset (e.g., a leader drone) obtains the information pertaining to the operation from a server such as a server that configures an operation. The information pertaining to the operation may include an indication of the set of assets to perform the operation and/or one or more parameters or constraints associated with the operation. In some embodiments, the information pertaining to the operation may include a pre-plan, which may be a high-level plan for the leader drone to implement the operation. The high level plan may have less granularity or less specific definition of the tasks to be performed and/or the manner by which the tasks are to be performed than the plan determined by the leader drone.

At 1210, the asset determines to operate as the leader drone based at least in part on the information pertaining to the operation.

At 1215, the leader drone determines the plan to complete at least one task to perform the operation. In some embodiments, the leader drone determines one or more tasks of the operation, and a plan for performing the one or more tasks. As an example, the leader drone may deconstruct the operation into smaller constituent tasks, and the leader drone may determine a plan for performing the tasks.

At 1220, the leader drone determines at least one asset to perform at least part of the plan. For example, the leader drone may assign the plan or task to an asset within the set of assets to perform the operation.

At 1225, the leader drone communicates at least part of the plan to the at least one asset. For example, the leader drone may communicate at least part of the plan to the asset(s) assigned to the plan and/or task(s).

At 1230, the leader drone determines whether to communicate a part of the plan to another asset. In response to determining that another part of the plan to another asset, process 1200 may proceed to 1225 whereby the leader drone iteratively sends parts of the plan to different assets respectively assigned to the parts of the plan or the task(s). The leader drone may iteratively send the parts of the plan to different assets until the leader drone determines that a part of the plan is not to be communicated to another asset at 1230.

At 1235, the leader drone determines whether to determine a plan for another task and whether to send the plan, such as to an asset. In response to determining that the leader drone is to determine and send a plan for another task, process 1200 proceeds to 1215 whereby the leader drone iteratively determines a plan for a task and sends out at least a part of the plan to one or more assets until the leader drone determines that a further plan does not need to be determined or sent to an asset. In response to determining that a plan for another task does not need to be determined and sent at 1235, process 1200 proceeds to 1240.

At 1240, the leader drone obtains information during implementation of at least part of the plan. In some embodiments, the leader drone receives feedback information from one or more follower drones during the implementation of the corresponding plan(s). The leader drone may also receive from the server control information pertaining to the operation. For example, the control information may be associated with a modification to a parameter of the operation, a modification to a set of assets, etc.

At 1245, the leader drone sends information pertaining to the status of the operation. In some embodiments, the leader drone may provide to the server an update on the status of the operation. For example, in response to receiving feedback information from one or more follower drones, the leader drone may aggregate the feedback from the various follower drones and/or determine a status of the operation. The leader drone may send to the server the status of the operation and/or information obtained by one or more drones in the set of assets (e.g., a livestream video, an image, a current location, a current status of the implementation of the corresponding plan, etc.). In some embodiments, the leader drone may send the information pertaining to the status of the operation to one or more follower drones. For example, the leader drone may provide an update on the status of the operation or the plan.

At 1250, the leader drone determines whether the operation is complete. The leader drone may determine that the operation is complete in response to determining that all the tasks associated with an operation are completed by the set of assets. The leader drone may also determine that the operation is complete in response to receiving a notice from the server that the operation is cancelled or paused. As an example, an operation may be cancelled or paused in response to a user input to a user interface.

In response to a determination that the operation is not complete at 1250, process 1200 may proceed to 1260 at which the leader drone determines whether to update the plan. For example, the leader drone may determine to update the plan based on feedback information received from a follower drone, and/or control information received from the server, etc. As another example, the leader drone may determine to update the plan based on a change on context of the operation (e.g., detection of a target, a status of a delivery of a payload, a change in environmental factors, etc.). In response to determining that the plan is to be updated, process 1200 may proceed to 1215. In response to determining that the plan is not to be updated, process 1200 may proceed to 1240.

In response to a determination that the operation is complete at 1250, process 1200 may proceed to 1255 at which the status is provided to the server and/or a control terminal (e.g., a client terminal).

Figure 12B:
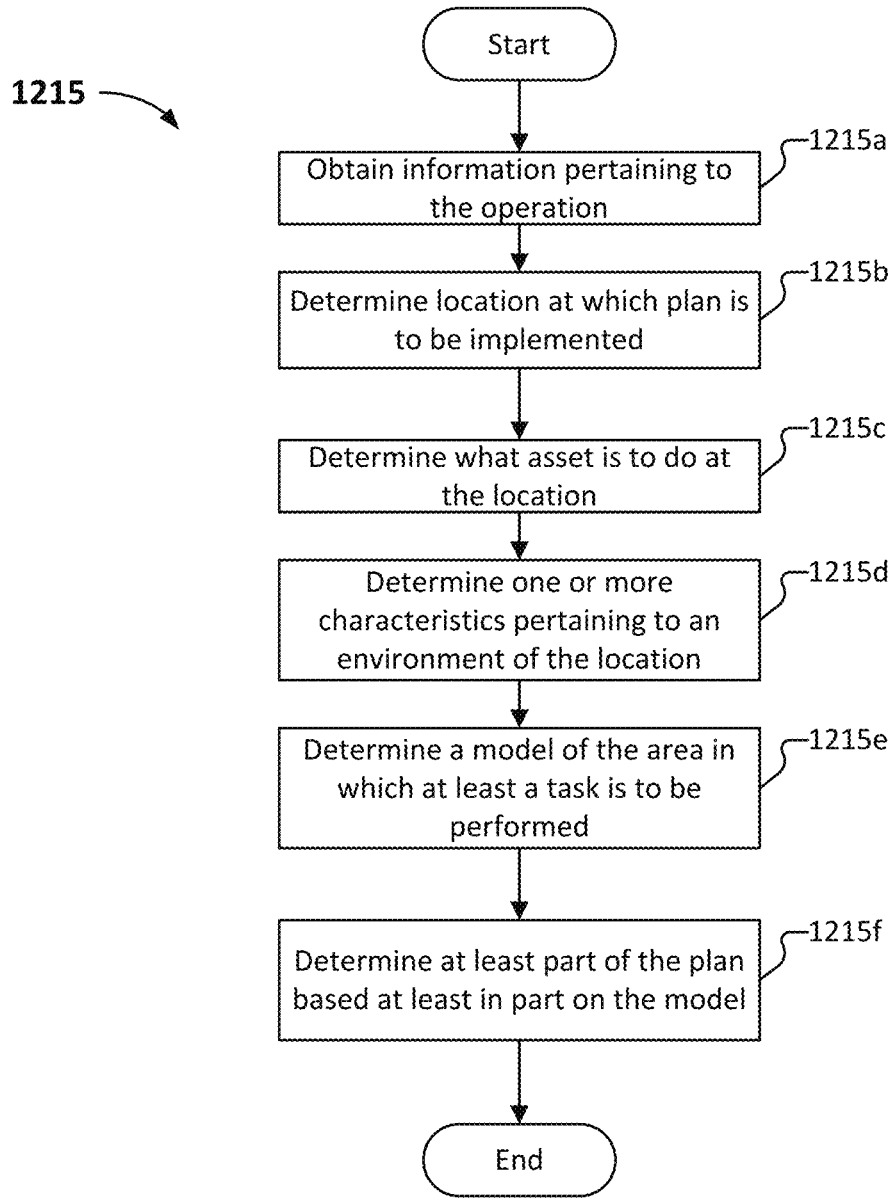
FIG. 12B is a diagram illustrating a method for implementing a plan associated with an operation according to various embodiments of the present application.

FIG. 12B is a diagram illustrating a method for implementing a plan associated with an operation according to various embodiments of the present application. In some embodiments, process 1215 FIG. 12B is performed by server 105, asset 120, asset 125, and/or asset 130 of system 100 of FIG. 1, and/or device 300 of FIG. 3. Process 1215 of FIG. 12B may correspond to 1215 of FIG. 12A.

At 1215*a*, the leader drone obtains information pertaining to the operation. At 1215*b*, the leader drone determines a location at which the plan is to be implemented. At 1215*c*, the leader drone determines a task or element that the follower drone is to perform at the location. At 1215*d*, the leader drone determines one or more characteristics pertaining to an environment of the location. At 1215*e*, the leader drone determines a model of the area in which at least a task is to be performed. According to various embodiments, the model may comprise a model of the environment in which the set of assets operate. For example, the model may be a 2D or 3D model of the world in which the set of assets are operating or are to perform the operation. At 1215*f*, at least part of the plan is determined based at least in part on the model.

According to various embodiments, the planner service implemented on the leader drone may iteratively refine the plan. For example, as the leader drone receives more information (e.g., more specific/detailed information pertaining to the operation such as a context in which the asset is operating), the leader drone may update its model of the operation and the corresponding plans for performing a task based on the current model. As an example, early in the performance of an operation, the leader drone may have a simplistic understanding of a topography of an area in which the set of set of assets are operating. As time and the operation progresses, the set of assets may monitor and capture information using various sensors or cameras on the set of assets, and the information may be sent back to the leader drone as feedback information.

Figure 12C:
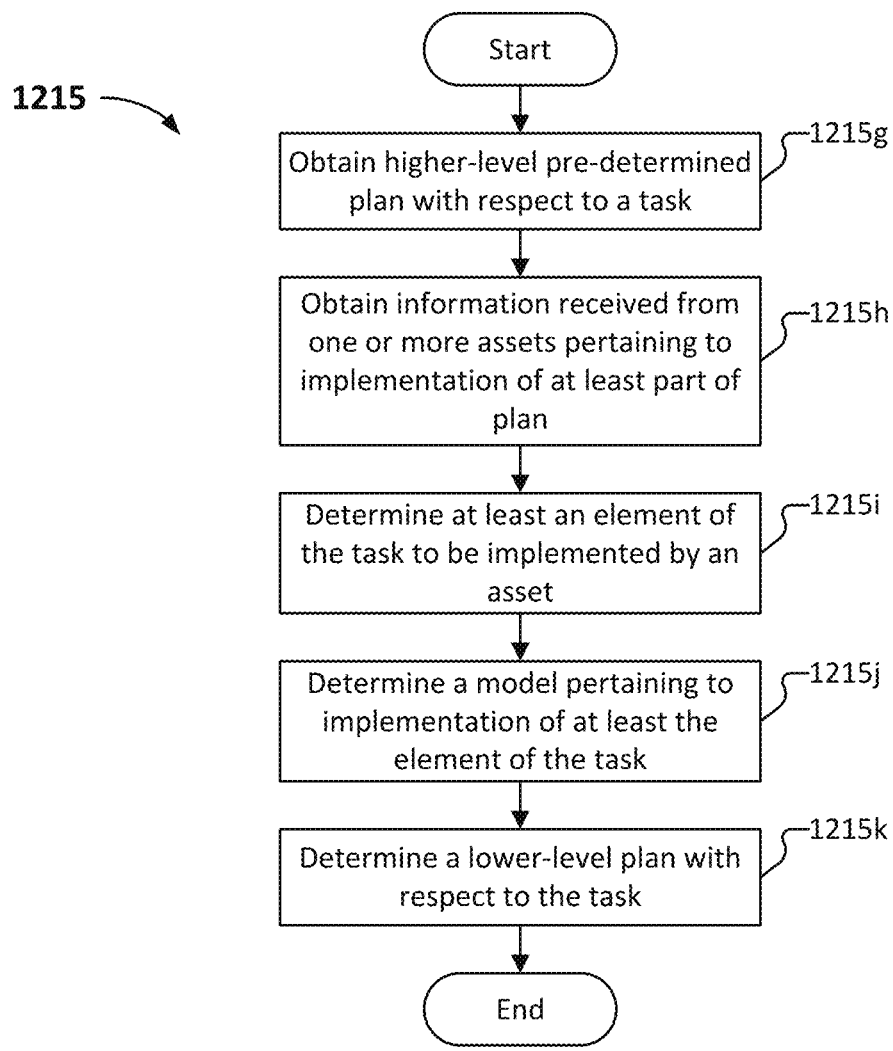
FIG. 12C is a diagram illustrating a method for implementing a plan associated with an operation according to various embodiments of the present application.

FIG. 12C is a diagram illustrating a method for implementing a plan associated with an operation according to various embodiments of the present application. In some embodiments, process 1215 FIG. 12C is performed by server 105, asset 120, asset 125, and/or asset 130 of system 100 of FIG. 1, and/or device 300 of FIG. 3. Process 1215 of FIG. 12B may correspond to 1215 of FIG. 12A.

At 1215*g*, the leader drone obtains a higher-level predetermined plan (e.g., a pre-plan) with respect to a task. For example, the leader drone may receive the pre-plan from the server. At 1215*h*, the leader drone obtains information received from one or more assets pertaining to implementation of at least part of the plan. As an example, the leader drone may receive feedback information that a follower drone obtains during implementation of a corresponding plan. At 1215*i*, the leader drone determines at least an element of a task to be implemented by an asset. The leader drone may deconstruct a task into constitute elements and determine a capability required to perform the element (e.g., a capability mapped to the element). The leader drone may determine an asset with a capability matching the capability required to perform element, and may assign to the asset the element. At 1215*j*, the leader drone determines a model pertaining to implementation of at least the element of the task. In some embodiments, the leader drone determines a model of the environment in which the asset is to implement the element. As an example, if the element is to track a car driving along the road, the leader drone may generate a model of the environment including the road, a topology of the area, a relative location of buildings in the area, a relative location of trees and other objects in the area, and a location of the car within the area. At 1215*k*, the leader drone determines a lower-level plan with respect to the task. The lower-level plan may include more detail or granularity than the pre-plan received from the server. For example, the pre-plan of the task may indicate that a car is to be tracked within a predetermined area, and the lower-level plan may include elements for implementing the plan including (i) track the car as it travels along a road in the predetermined area, (ii) stay a predetermined distance away from the vehicle being tracked, (iii) capture an image of the car, (iv) send an update on a status of the tracking of the car at a certain period of time, (v) send an alert if the car stops at a location and provide an indication and timestamp of the stop, etc.

Figure 13:
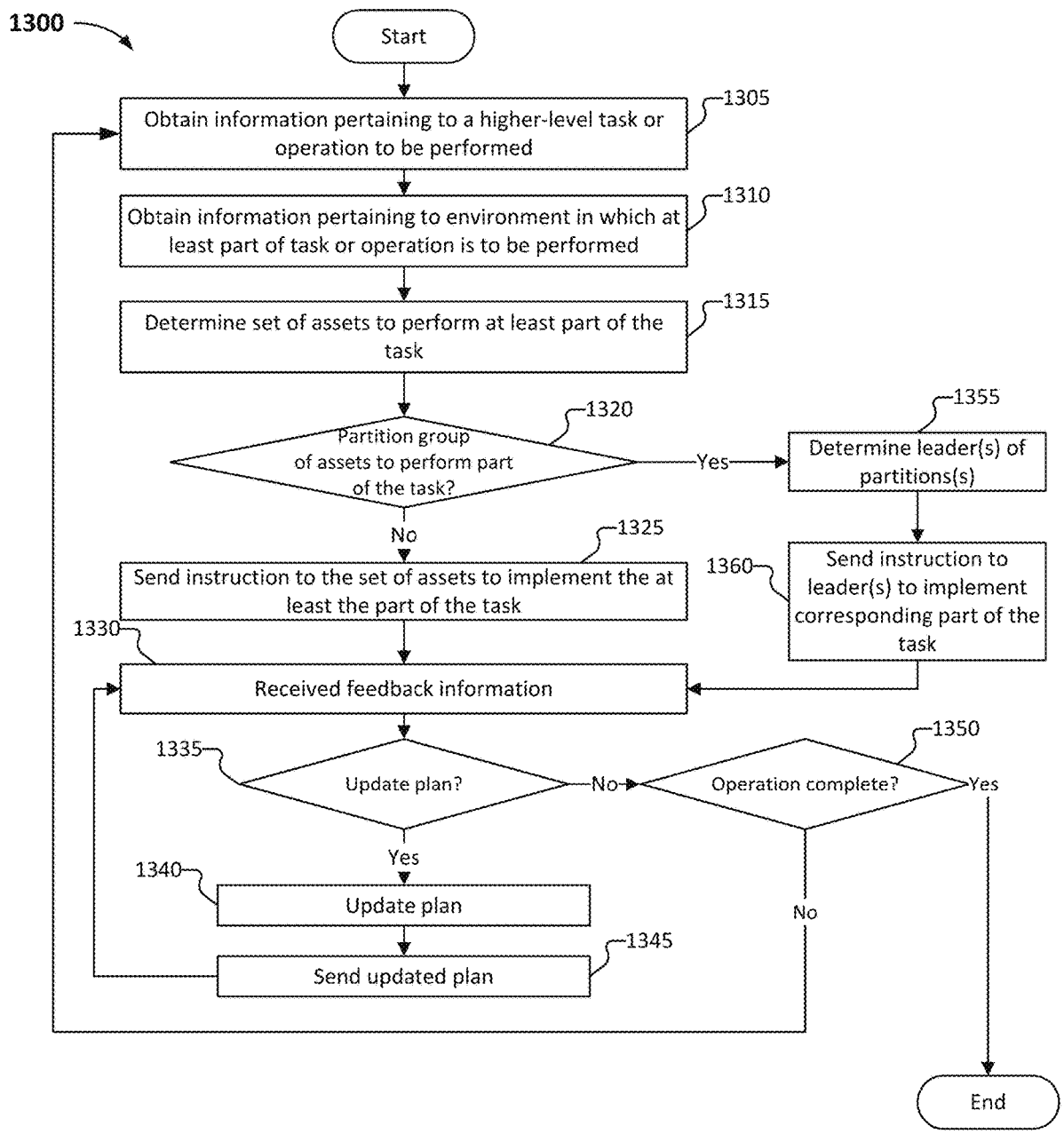
FIG. 13 is a diagram illustrating a method for implementing a plan associated with an operation according to various embodiments of the present application.

FIG. 13 is a diagram illustrating a method for implementing a plan associated with an operation according to various embodiments of the present application. In some embodiments, process 1300 of FIG. 13 is performed by asset 120, asset 125, and/or asset 130 of system 100 of FIG. 1, and/or device 300 of FIG. 3. According to various embodiments, process 1000 is implemented by a semi-autonomous drone. Process 1300 may be implemented by a leader drone.

At 1305, the drone obtains information pertaining to a higher—level task or operation to be performed. At 1310, the drone may obtain information pertaining to an environment in which at least part of the task or operation is to be performed. At 1315, the drone determines the set of assets to perform at least part of the task. At 1320, the drone determines whether to partition the set of assets (e.g., a group or team of assets) to perform part of the task.

In response to the drone determining that the set of assets is not to be partitioned at 1320, process 1300 may proceed to 1325. At 1325, the drone sends an instruction to the set of assets to implement the at least part of the task. At 1330, the drone receives feedback information. For example, the leader drone may receive feedback information from one or more follower drones. At 1335, the leader drone determines whether to update the plan. For example, the leader drone may determine whether to update the plan based at least in part on the feedback information.

In response to determining to update the plan, process 1300 proceeds to 1340 at which the plan is updated. The updating of the plan may include updating a model of the environment in which the follower drones are operating, determining whether the capabilities to perform the task or element of the task has changed based on an update to the model or a change in context of the operation. At 1345, the leader drone sends the updated plan. As an example, the leader drone may send the updated to plan to the follower drone assigned to the previous version of the plan (or the task corresponding to the plan). As another example, if the updating the plan includes assigning a new, different, or additional asset to the task, the leader drone may send the updated plan to such an asset. Thereafter, process 1300 returns to 1330.

In response to a determination that the plan is not to be updated at 1335, process 1300 may proceed to 1350 at which the leader drone determines whether the operation is complete. In response to a determination that the operation is not complete, process 1300 may return to 1305, and process 1300 may be iterated again. In response to a determination that the operation is complete, process 1300 may end.

In response to a determination to partition the set of assets to perform part of the task at 1320, process 1300 may proceed to 1335 at which a leader of the partition (e.g., the partition leader) is determined. At 1360, the leader drone may send an instruction to the partition leader to implement a corresponding part of the task. Thereafter, process 1300 may proceed to 1330. In response to the partition leader receiving the instruction to the implement the corresponding part of the task, the partition leader may perform process 1300 as the leader drone with respect to the partition.

Figure 14:
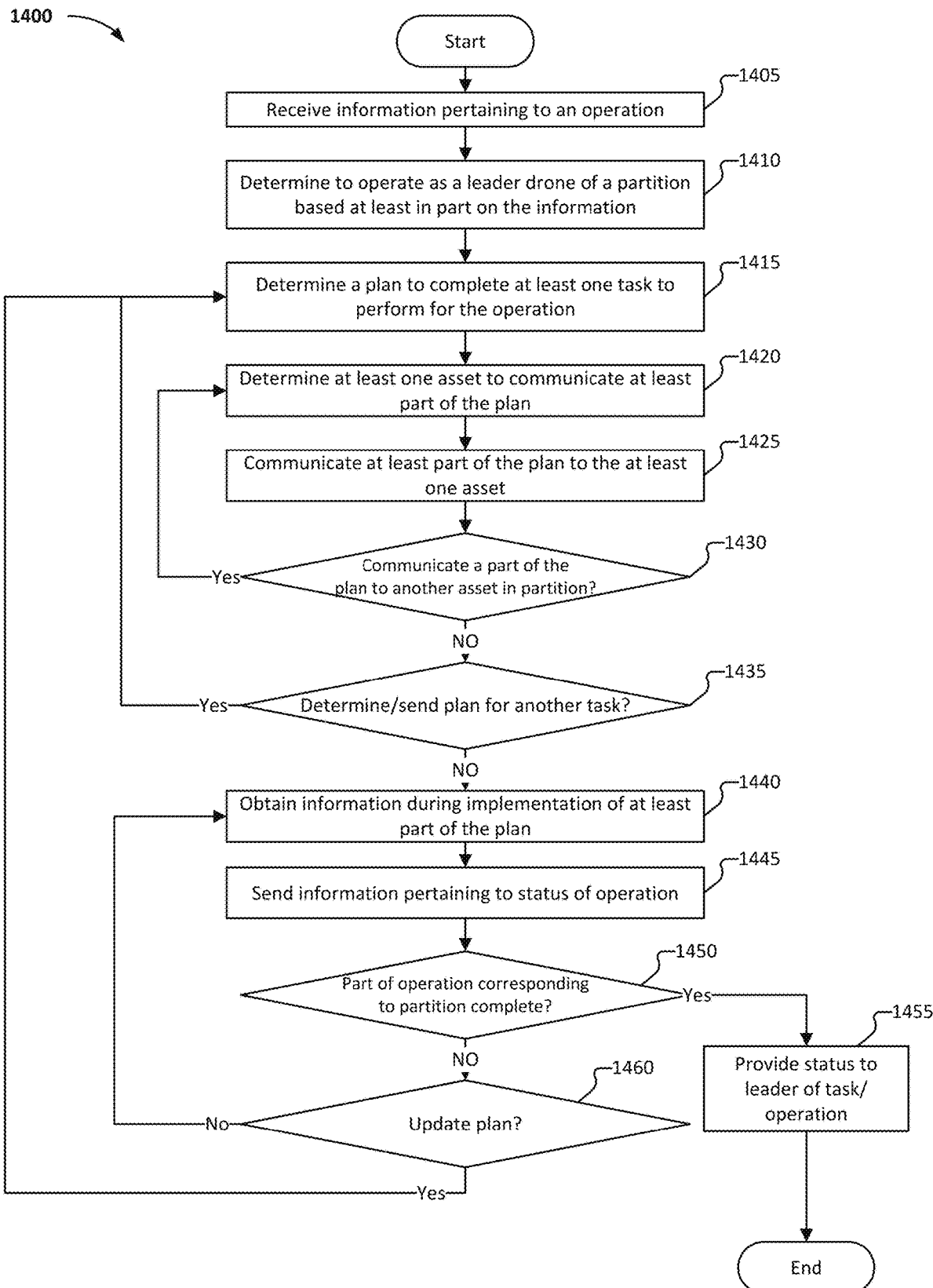
FIG. 14 is a diagram illustrating a method for implementing a plan associated with an operation according to various embodiments of the present application.

FIG. 14 is a diagram illustrating a method for implementing a plan associated with an operation according to various embodiments of the present application. In some embodiments, process 1400 of FIG. 14 is performed by asset 120, asset 125, and/or asset 130 of system 100 of FIG. 1, and/or device 300 of FIG. 3. According to various embodiments, process 1000 is implemented by a semi-autonomous drone.

At 1405, a drone receives information pertaining to an operation. In some embodiments, the drone receives a plan for performing a part of the operation (e.g., a task or an element of a task). The drone may receive an instruction to perform the part of the operation as a partition comprising a subset of the set of assets that were assigned to perform the operation. According to various embodiments, the information pertaining to an operation comprises an indication that the drone is assigned to be the partition leader of the partition.

At 1410, the drone determines to operate as the leader drone of a partition (e.g., the partition leader) based at least in part on the information.

At 1415, the partition leader determines the plan to complete at least one task of the operation. In some embodiments, the partition leader determines one or more plans to complete one or more tasks assigned to the partition. The partition leader may determine the plan based at least in part on one or more parameters and/or constraints of the operation (or the tasks assigned to the partition), a capability or characteristic associated with the at least one task, a capability of one or more assets in the partition, etc. According to various embodiments, the partition leader implements a planning service similar to, or the same as, the planner service implemented by a leader drone of the set of assets assigned to perform an operation.

At 1420, the partition leader determines at least one asset to which to communicate at least part of the plan. In some embodiments, the partition leader assigns the at least part of the plan to an asset within the partition. The partition leader may determine the asset within the partition to which to assign the at least part of the plan. For example, the asset may be determined based at least in part on a capability of the asset, and/or a capability associated with a task or element corresponding to the at least the part of the plan.

At 1425, the partition leader communicates the at least the part of the plan to the at least one asset. In some embodiments, in response to determining an asset within the partition to which to assign part of a plan, the partition leader sends the part of the plan to the at least one asset.

At 1430, the partition leader determines whether to communicate a part of the plan to another asset in the partition. In response to determining that another part of the plan is to be assigned a part of the plan, process 1400 proceeds to 1420, and the partition leader iteratively performs 1420, 1425, and 1430 until the partition leader determines not to communicate a part of the plan to another asset.

At 1435, the partition leader determines whether to determine a plan for another task and whether to send the plan, such as to an asset. In response to determining that the partition leader is to determine and send a plan for another task, process 1400 proceeds to 1415 whereby the leader drone iteratively determines a plan for a task and sends out at least a part of the plan to one or more assets until the partition leader determines that a further plan does not need to be determined or sent to an asset. In response to determining that a plan for another task does not need to be determined and sent at 1435, process 1400 proceeds to 1440.

At 1440, the partition leader obtains information during implementation of at least part of the plan. In some embodiments, the partition leader receives feedback information from one or more follower drones (in the partition) during the implementation of the corresponding plan(s). The partition leader may also receive from the server (or the leader of the set of assets assigned to the operation) control information pertaining to the operation. For example, the control information may be associated with a modification to a parameter of the operation, a modification to a set of assets, etc.

At 1445, partition leader sends information pertaining to the status of the operation. In some embodiments, the partition leader may provide to the server an update on the status of the operation. For example, in response to receiving feedback information from one or more follower drones, the partition leader may aggregate the feedback from the various follower drones and/or determine a status of the operation. The partition leader may send to the server the status of the operation (or task thereof) and/or information obtained by one or more drones in the set of assets (e.g., a livestream video, an image, a current location, a current status of the implementation of the corresponding plan, etc.). In some embodiments, the partition leader may send the information pertaining to the status of the operation to one or more follower drones. For example, the leader drone may provide an update on the status of the operation or the plan. In some embodiments, the partition leader provides information pertaining to the status of the operation to the leader drone (e.g., the leader of the set of assets initially assigned to perform the operation), and the leader drone in turn provides the information pertaining to the status of the operation to the server.

At 1450, the partition leader determines whether the part of the operation corresponding to the partition is complete. The partition leader may determine that the part of operation is complete in response to determining that all the tasks associated with the part of the operation are completed by the set of assets. The partition leader may also determine that the part of the operation is complete in response to receiving a notice from the server (or the leader drone) that the operation is cancelled or paused. As an example, an operation may be cancelled or paused in response to a user input to a user interface.

In response to a determination that the operation is not complete at 1450, process 1440 may proceed to 1460 at which the leader drone determines whether to update the plan. For example, the partition leader may determine to update the plan based on feedback information received from a follower drone, and/or control information received from the server, etc. As another example, the partition leader may determine to update the plan based on a change on context of the operation (e.g., detection of a target, a status of a delivery of a payload, a change in environmental factors, etc.). In response to determining that the plan is to be updated, process 1400 may proceed to 1415. In response to determining that the plan is not to be updated, process 1400 may proceed to 1440.

In response to a determination that the operation is complete at 1450, process 1400 may proceed to 1455 at which the status is provided to the server and/or a control terminal (e.g., a client terminal).

Figure 15:
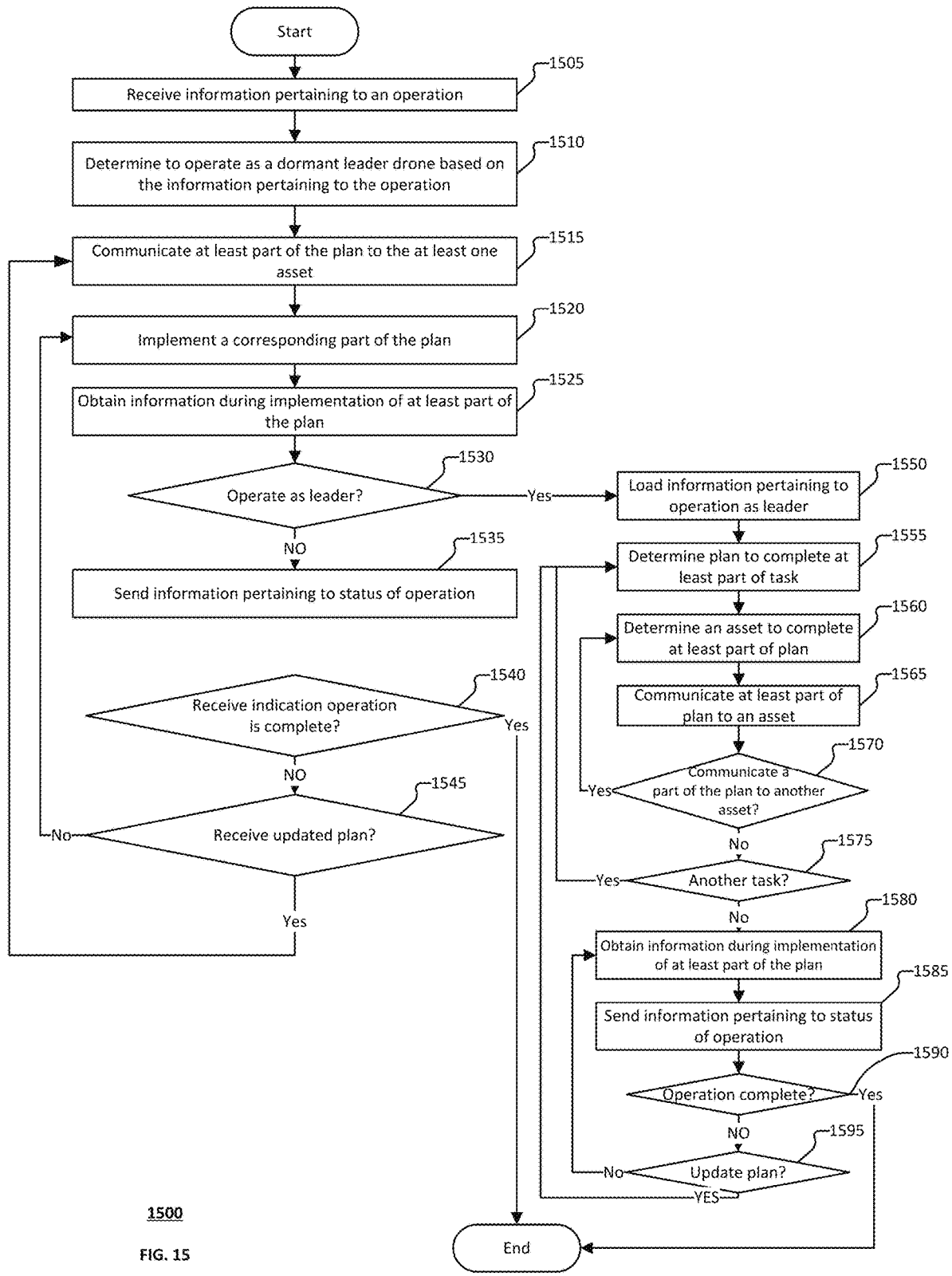
FIG. 15 is a diagram illustrating a method for implementing a plan associated with an operation according to various embodiments of the present application.

FIG. 15 is a diagram illustrating a method for implementing a plan associated with an operation according to various embodiments of the present application. In some embodiments, process 1500 of FIG. 15 is performed by asset 120, asset 125, and/or asset 130 of system 100 of FIG. 1, and/or device 300 of FIG. 3. According to various embodiments, process 1000 is implemented by a semi-autonomous drone.

At 1505, a drone receives information pertaining to an operation. In some embodiments, the drone receives a plan for performing the operation (e.g., a task or an element of a task). In some embodiments, the drone receives the information pertaining to the operation from a leader drone of the set of assets. The information pertaining to the operation may comprise an indication of a set of assets to perform the operation. The information pertaining to the operation may include a predefined leader ranking.

At 1510, the drone determines to operate as a dormant leader drone based at least in part on the information pertaining to the operation. The drone may determine to operate as the dormant leader based on the predefined leader ranking. For example, the dormant leader may be the drone having the second highest ranking (e.g., among active assets). In some embodiments, the information pertaining to the operation is an instruction for the drone to act as the dormant leader.

At 1515, the dormant leader drone communicates at least part of the plan with at least one asset. In some embodiments, the dormant leader drone receives information pertaining to the plan from the leader drone. The dormant leader drone may synchronize the information pertaining to the operation that is stored by the leader drone. For example, the dormant leader may have correspond to a shadow copy of the leader drone.

At 1520, the dormant leader drone implements a corresponding part of the plan. In some embodiments, the dormant leader drone performs one or more tasks or elements in connection with the performance of the operation. In some implementations, the dormant leader drone does not determine or implement a plan. For example, the dormant leader drone may serve as a backup to leader drone.

At 1525, the dormant leader drone obtains information during implementation of at least part of the plan. In some embodiments, the information obtained during implementation of the at least part of the plan comprises feedback information provided by a follower drone, a synchronization information provided by the leader drone, and/or information obtained by one or more sensors of the dormant leader drone. In addition to sending feedback information to the leader drone, the follower drones may send the feedback information to the dormant leader drone.

At 1530, the dormant leader drone determines whether to operate as a leader. In some embodiments, the dormant leader drone determines to operate as the leader in response to a determination that the leader drone has failed. As an example, the leader drone may be deemed to have failed if the leader drone has lost communication, such as for a predefined threshold period of time, with the dormant leader drone or the set of assets. As another example, the leader drone may be deemed to have failed if the leader drone has a communication link with the set of assets, and the communication link is below a predefined quality of service threshold. If the leader drone has failed to communicate with the dormant leader drone or the set of assets for a predetermined threshold period of time, the dormant leader drone or a follower drone may send a ping for a health check of the leader drone. If the leader drone fails to response to the health check within a set period of time, the leader drone may be deemed to have failed.

In response to determining that the dormant leader drone is not to operate as the leader, 1500 proceeds to 1535 at which information pertaining to the status of the operation is sent to the leader drone.

At 1540, the dormant leader drone determines whether an indication that the operation is complete has been received. In response to determining that an indication that the operation is complete has been received, process 1500 ends. In contrast, in response to determining that an indication that the operation is complete has not been received, process 1500 proceeds to 1545 at which the dormant leader drone determines whether an updated plan has been received. In response to determining that an updated plan has been received, process 1500 proceeds to 1520. In contrast, in response to determining that the updated plan has not been received, process 1500 proceeds to 1525.

If the dormant leader drone determines to operate as the leader at 1530, process 1500 proceeds to 1550 at which the dormant leader drone loads information pertaining to the operation as the leader. In some embodiments, the dormant leader drone loads the synchronized copy of the leader information pertaining to the operation. For example, the dormant leader drone may load a backup copy of the information pertaining to the operation that was backed up from a local copy at the leader drone.

At 1555, the leader drone (e.g., the former dormant leader drone) determines a plan to complete at least part of a task.

At 1560, the leader drone determines an asset to complete at least part of the plan.

At 1565, the leader drone communicates at least part of the plan to an asset.

At 1570, the leader drone determines whether to communicate part of the plan to another asset. In response to determining that a part of the plan is to be communicated to another asset, process 1500 returns to 1560. In contrast, in response to determining that a part of the plan is not to be communicated to another asset, process 1500 proceeds to 1570 at which the leader drone determines whether another task exists at 1575 (e.g., for which a plan is to be determined and assigned). In response to determining that another task exists at 1575, process 1500 returns to 1555. In response to determining that another task does not exist at 1575, process 1500 proceeds to 1580 at which the leader drone obtains information during implementation of at least part of the plan. For example, the leader drone may receive feedback information from a follower drone.

At 1585, the leader drone sends information pertaining to a status of the operation. The leader drone may send the information pertaining to the status of the operation to the server (e.g., a control center) and/or a client terminal. The leader drone may send the information pertaining to the status of the operation to one or more follower drones.

At 1590, the leader drone determines whether the operation is complete. In response to determining that the operation is complete at 1590, process 1500 ends. In contrast, in response to a determination that the operation is not complete at 1590, process 1500 proceeds to 1595 at which the leader drone determines whether to update the plan. As an example, operation is determined not to be complete in response to a determination that task is not complete (e.g., if the drone was tasked with scanning a road and the drone was not able to maintain a set of tight turns in the road and missed scanning portions of the road, the task may deemed not to be complete and the drone may double back and re-scan the missed portions of the road). In response to a determination to update the plan at 1595, process 1500 proceeds to 1555. In contrast, in response to a determination that the plan is not to be updated, process 1500 proceeds to 1580.

Figure 16A:
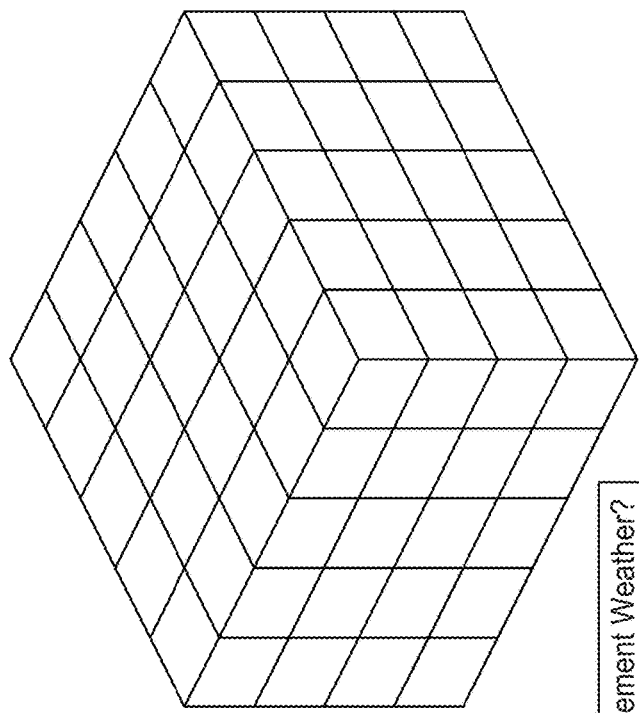
FIG. 16A is a diagram of a discrete representation according to various embodiments of the present application.
Figure 16A:
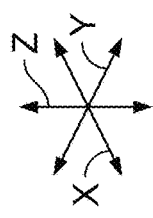

FIG. 16A is a diagram of a discrete representation according to various embodiments of the present application. In the example illustrated in FIG. 16A, discrete representation 1600 includes a plurality of discrete elements corresponding to voxels. Discrete representation 1600 may be implemented by system 100 of FIG. 1, device 300 of FIG. 3, etc.

As used herein, the term "voxel" corresponds to a value on a regular grid in three-dimensional space. For example, a voxel corresponds to a discrete element of the discrete representation.

According to various embodiments, each discrete element (e.g., cell) within the 3-D representation corresponds to a different part of the geographic location. For example, parts of the geographic location are mapped to corresponding discrete elements the 3-D representation in connection with determining discrete representation 1600. As illustrated in FIG. 16A, the 3-D dimensions of discrete representation 1600 correspond to the x-axis, the y-axis, and the z-axis. The z-axis is corresponds to a direction that is parallel to the force of gravity. As an example, the number of discrete elements provided in the z-axis is determined based at least in part on an maximum altitude or height associated with configuration of the operation (e.g., a parameter input by the user during configuration of the operation, a maximum altitude capability of an asset among the set of assets selected to perform the operation, a default maximum altitude or height, etc.).

As illustrated in FIG. 16A, a set of information 1610 is respectively mapped to or associated with, a set of discrete elements of discrete representation 1600. In some embodiments, each discrete element in discrete representation 1600 has information mapped thereto. For example, a discrete element has one or more metadata fields respectively corresponding to different types of information mapped thereto. Examples of the types of information mapped to, or associated with, a discrete element include: an indication of whether the discrete element corresponds to a location identified as a keep-in area, an indication of whether the discrete element corresponds to a location identified as a keep-out area, an indication of whether the discrete element is occupied, an indication of whether the discrete element is available or unoccupied, an indication of whether an asset in the discrete element would have a clear line of sight (e.g., to a current position of a leader drone, a tower, or a ground station, etc.), an indication of whether a target is included in the discrete element, an identifier of a target comprised in the discrete element, an indication of whether the discrete element has or is experiencing inclement weather or an indication of a type of weather (e.g., clear, rainy, windy, a temperature, a wind direction and speed, etc.).

Generally, discretization of a geography breaks down as distances increase and curvature of Earth becomes noticeable or material to calculations. For example, if each discrete element in the 3-D representation corresponded to a same size of volume, the curvature of Earth would cause a bottom surface of the 3-D representation to correspond to a plane that is tangent to the Earth at a particular point of intersection, and as the 3-D representation extended further out in the x-direction or y-direction the 3-D representation would increasingly deviate from Earth's surface. In some embodiments, discrete representation 1600 is generated based at least in part on the curvature of Earth. For example, the system takes into account the curvature of Earth when generating discrete representation 1600 in a manner that transforms real space into a 3-D representation such that the z-axis corresponds to a direction of the force of gravity (or a direction that is perpendicular to the Earth's surface at the location corresponding to the discrete element). As another example, regardless of how far the 3-D representation is traversed from the origin in the x-direction or y-direction, the z-axis corresponds to a direction of the force of gravity.

According to various embodiments, the discretized representation is used in connection with modelling one or more tasks. For example, the system references (e.g., searches) the discretized representation and the associated information (e.g., the metadata comprising fields of information pertaining to the geographic location and/or the one or more tasks. As an example, the system determines a path from a first point to a second point by determining a first discrete element corresponding to the first point, determining a second discrete element corresponding to the second point, and a set of contiguous (e.g., adjoining) discrete elements that connect the first discrete element and the second discrete element through which an asset is able to travel (e.g., the discrete element(s) is unoccupied, etc.). To determine the set of contiguous (e.g., adjoining) discrete elements, the system searches across the discretized representation to discover/determine the set of contiguous assets. In some embodiments, a discrete element indicated to be unoccupied is searchable in connection with determining a plan (e.g., a flight path), and a discrete element indicated to be occupied is not searchable. As an example, a plan is determined based on occupancy of one or more discrete elements of discretized representation.

An operation (e.g., the one or more tasks that the set of one or more assets is to perform) generally extends over distances at least in the x-direction and y-direction. Accordingly, the model of a geographic location corresponding to an operation (e.g., the one or more tasks that the set of one or more assets is to perform) includes a large discretized representation and a corresponding large number of discrete elements. According to various embodiments, to assist in the quick processing of discretize representation 1600 in connection with determining a plan (e.g., a plan to direct a follower drone, a flight path of an asset, etc.), the system creates discretized representation that limits the extent to which the discrete elements extend in the z-direction. For example, height/altitude is usually limited according to a configured operation (e.g., a user input, an asset capability, and/or a default setting), so the discretized representation 1600 can similarly be limited in order to limit number of cells to be processed. In some embodiments, discretized representation 1600 comprises a 400×400×100 grid segment. As an example, discretized representation 1600 comprises 400 discrete elements in the dimension along the x-direction, 400 discrete elements in the dimension along the y-direction, and 100 discrete elements in the dimension along the z-direction. Various other dimensions of discretized representation 1600 may be implemented. For example, the number of discrete elements in discretized representation 1600 (e.g., in all or a single dimension) is configurable such as according to a user input.

In some embodiments, the modeling of the geographic location/environment in connection with determining a plan for one or more tasks uses discretized representations of the geographic location/environment having a same dimensions, such as a same number of discrete elements in one or more directions, regardless of a size of the geographic location corresponding the operation or one or more tasks (e.g., the geographic location defined by a user, etc.). Accordingly, the larger the geographic location the less granular the discretized representation. Conversely, the smaller the geographic location, the more granular the discretized representation. The resolution of the modelling (e.g., the discretized representation) increases the smaller the geographic location being modeled. Accordingly, in some embodiments, as a leader drone assigns certain subsets of tasks/elements of the operation and the follower drones are deployed to perform the subset of tasks/elements, a follower drone generates a model of the geographic location corresponding to the certain subset of tasks/elements assigned to the follower drone. As an example, the model of the geographic location (e.g., discretized representation 1600 such as discretized representation generated by the follower drone) for the certain subset of tasks/elements assigned to the follower drone has a higher resolution than the model of the geographic location for the operation (e.g., the superset of the one or more tasks for which the leader drone manages and directs follower drones, etc.).

Figure 16B:
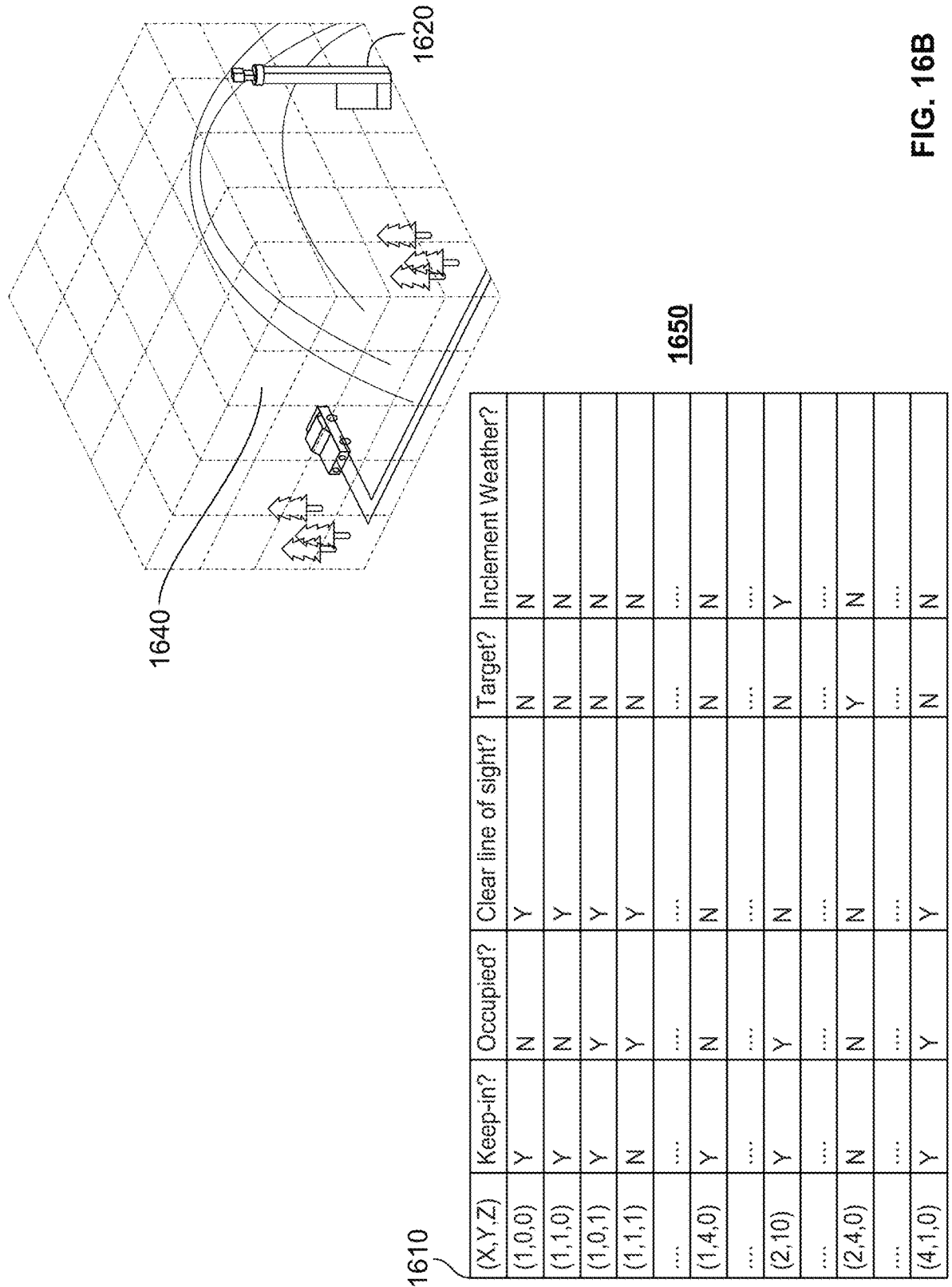
FIG. 16B is a diagram of a discrete representation of a geographic location according to various embodiments of the present application.

FIG. 16B is a diagram of a discrete representation of a geographic location according to various embodiments of the present application. In the example illustrated in FIG. 16B, discretized representation 1650 has been populated with geographic information. For example, discretized representation 1650 includes representation(s) of trees, a road, a car, hills, and ground control station 1620. Similarly, discretized representation 1650 is annotated with one or more parameters pertaining to the geographic location with at least a subset of the plurality of discrete elements. For example, set of information 1610 comprises a set of fields of information, and set of information 1610 is populated with information pertaining to the geographic location, and is mapped to discretized representation 1650. As an example, as illustrated in FIG. 16B, set of information 1610 comprises (i) information indicating whether one or more discrete elements correspond to a keep-in area, (ii) information indicating whether one or more discrete elements are occupied or unoccupied, (iii) information indicating whether one or more discrete elements correspond to a clear line of sigh (e.g., a clear communication/radio line), (iv) information indicating whether the one or more discrete elements comprise a target, (v) information indicating whether the one or more discrete elements are subject to inclement weather, etc.

Figure 16C:
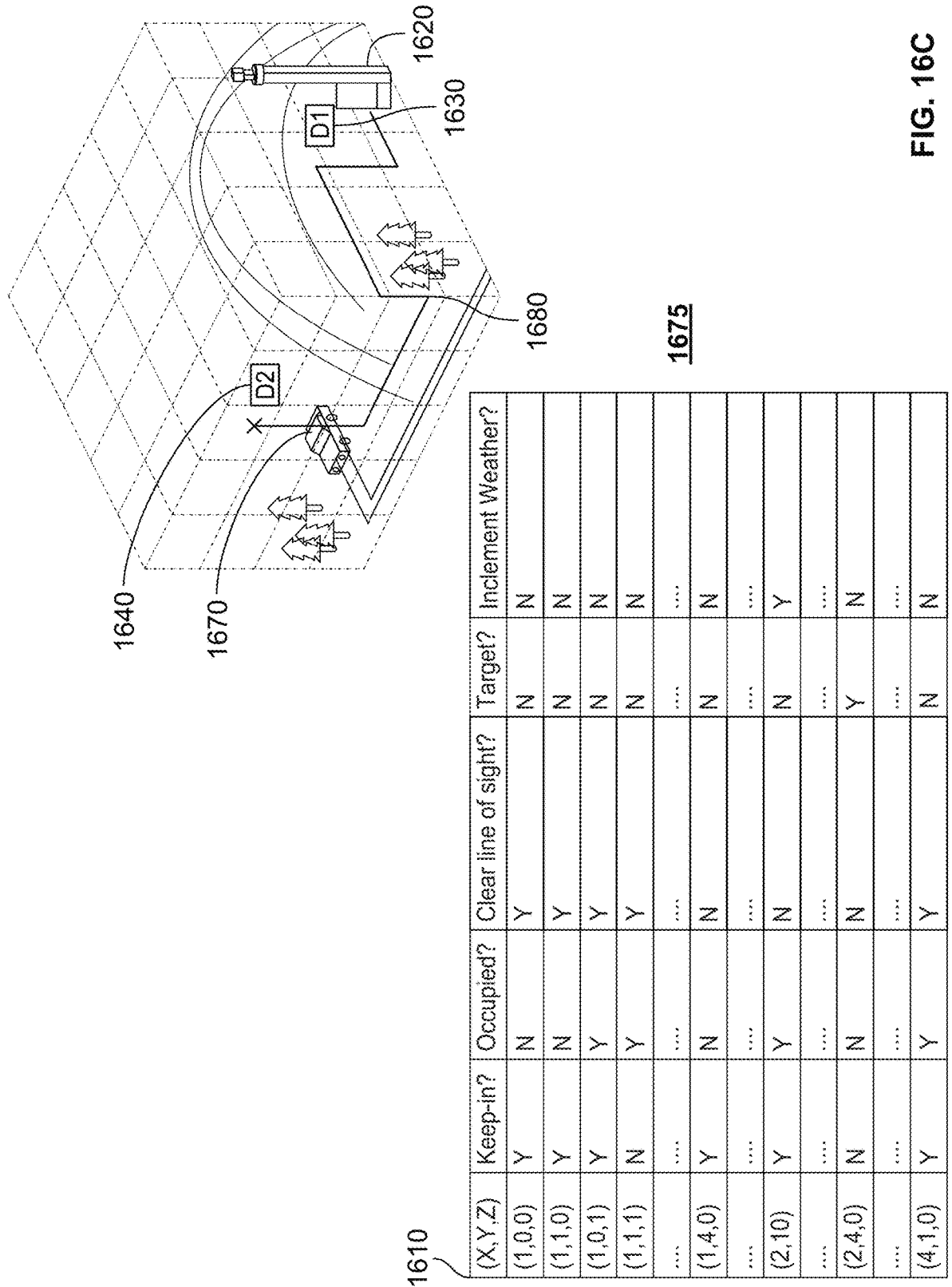
FIG. 16C is a diagram of a discrete representation of a geographic location according to various embodiments of the present application.

FIG. 16C is a diagram of a discrete representation of a geographic location according to various embodiments of the present application. As illustrated, a set of drones (e.g., D1 1630 and D2 1640, etc.) is deployed in the geographic location corresponding to discretized representation 1675. As an example, the operation comprises following/surveilling target 1670 such as at discrete element (x=2, y=4, z=0). According to various embodiments, leader drone D1 1630 provides a plan to follower drone D2 1640 to follow/surveil target 1670. As an example, leader drone D1 1630 provides a flight plan 1680 to follower drone D2 1640. As another example, leader drone D1 1630 provides an indication that follower drone D2 1640 is to perform the task of following surveilling target 1670, and follower drone D2 1640 determines flight plan 1680 to travel to a location at which follower drone D2 1640 has line of sight of target.

In the example illustrated in FIG. 16C, target 1670 is not within line of sight of ground control station 1620 or leader drone D1 1630. For example, hills/mountains are situated between ground control station 1620 and target 1670. In some embodiments, to perform the task of surveilling target 1670, follower drone D2 1640 is deployed to travel to a location at which it has line of sight of target 1670. The system determines flight plan 1680 along which follower drone D2 1640 is to travel. As illustrated in FIG. 16C, flight plan 1680 is configured to direct follower drone D2 1640 to travel over trees and around the hills. In some embodiments, a cost function associated with moving a drone along a path indicates that causing the drone to travel vertically to a height sufficient to fly over the hills is more expensive than the drone traversing the x-direction and/or y-direction to travel around the hills. As an example, traversing the x-direction and/or y-direction is more efficient for a drone than traversing the z-direction (e.g., increasing an altitude). Accordingly, a certain increased length of the flight plan that traverses traversing the x-direction and/or y-direction is more efficient (e.g., cheaper in cost) than a shorter length of a flight plan that requires traversal over a certain length in the z-direction.

Figure 17A:
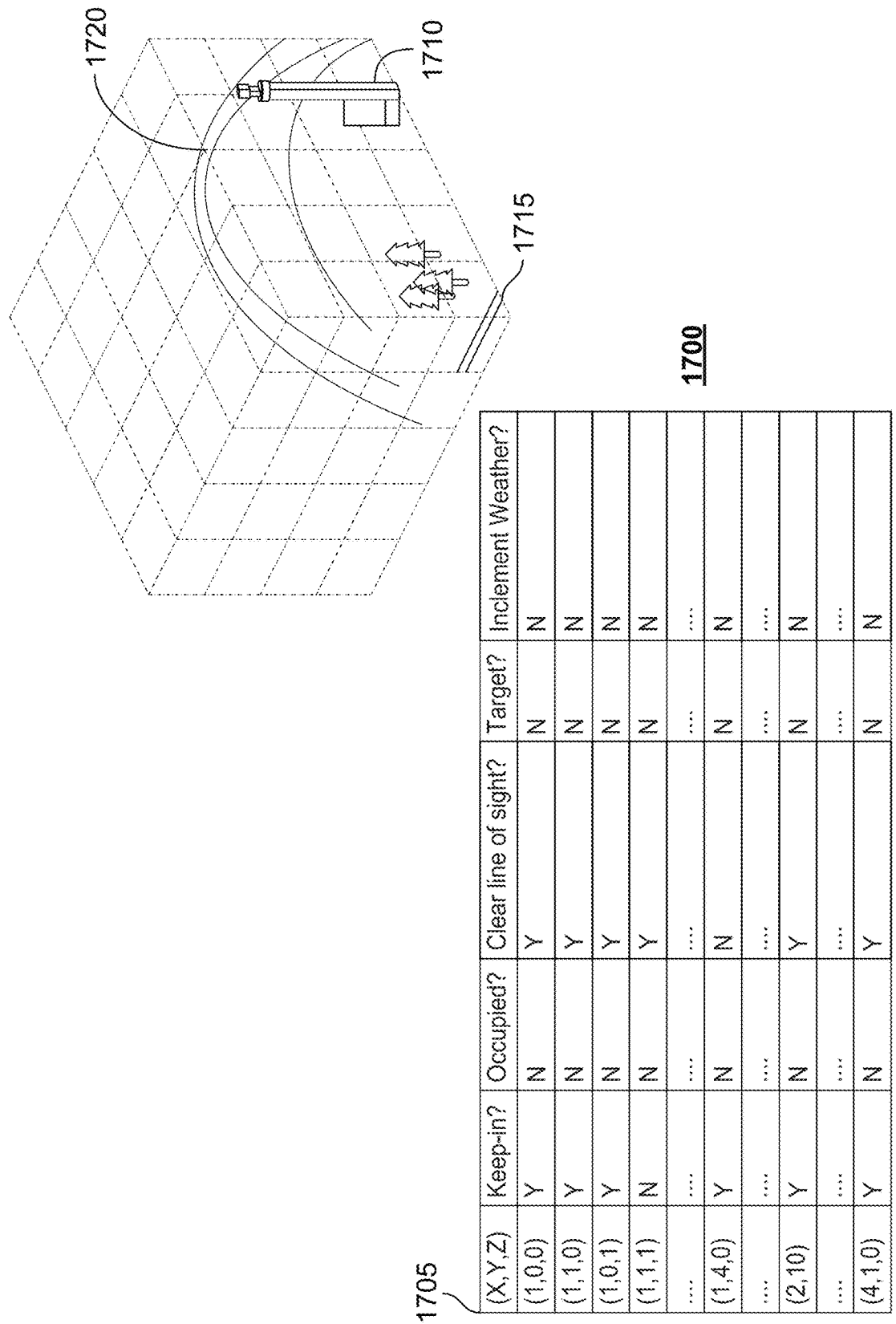
FIG. 17A is a diagram of a discrete representation of a geographic location according to various embodiments of the present application.

FIG. 17A is a diagram of a discrete representation of a geographic location according to various embodiments of the present application. In the example illustrated in FIG. 17A, discrete representation 1700 includes a plurality of discrete elements corresponding to voxels. Discrete representation 1700 may be implemented by system 100 of FIG. 1, device 300 of FIG. 3, etc.

According to various embodiments, the system iteratively updates the discretized representation 1700 during the life of an operation (e.g., a time until an operation is paused, completed, or terminated, etc.). As an example, discretized representation 1700 is generated at the beginning of the operation. In the case that an operation is initiated such as at ground control station 1710, information pertaining to the geographic location and/or one or more tasks associated with the operation is populated in discretized representation 1700 and the associated set of information 1705 (e.g., the metadata associated with one or more discrete elements of discretized representation 1700). In some embodiments, the discretized representation 1700 is annotated with set of information 1705.

According to various embodiments, the information comprised in set of information 1705 is obtained via one or more of a configuration (e.g., definition) of the operation, pre-stored such as at a server or a local service (e.g., a map or topographical service, a service managing various sets of deployed assets), and/or a third party service (e.g., a weather service, a map service, etc.).

As in the example illustrated in FIG. 17A, only part of discretized representation 1700 is populated with corresponding information. For example, only part of 1715 that is visible from ground control station 1710 is provided. Hills 1720 obstruct visibility to features/information discrete elements the opposite side of hills 1720.

Figure 17B:
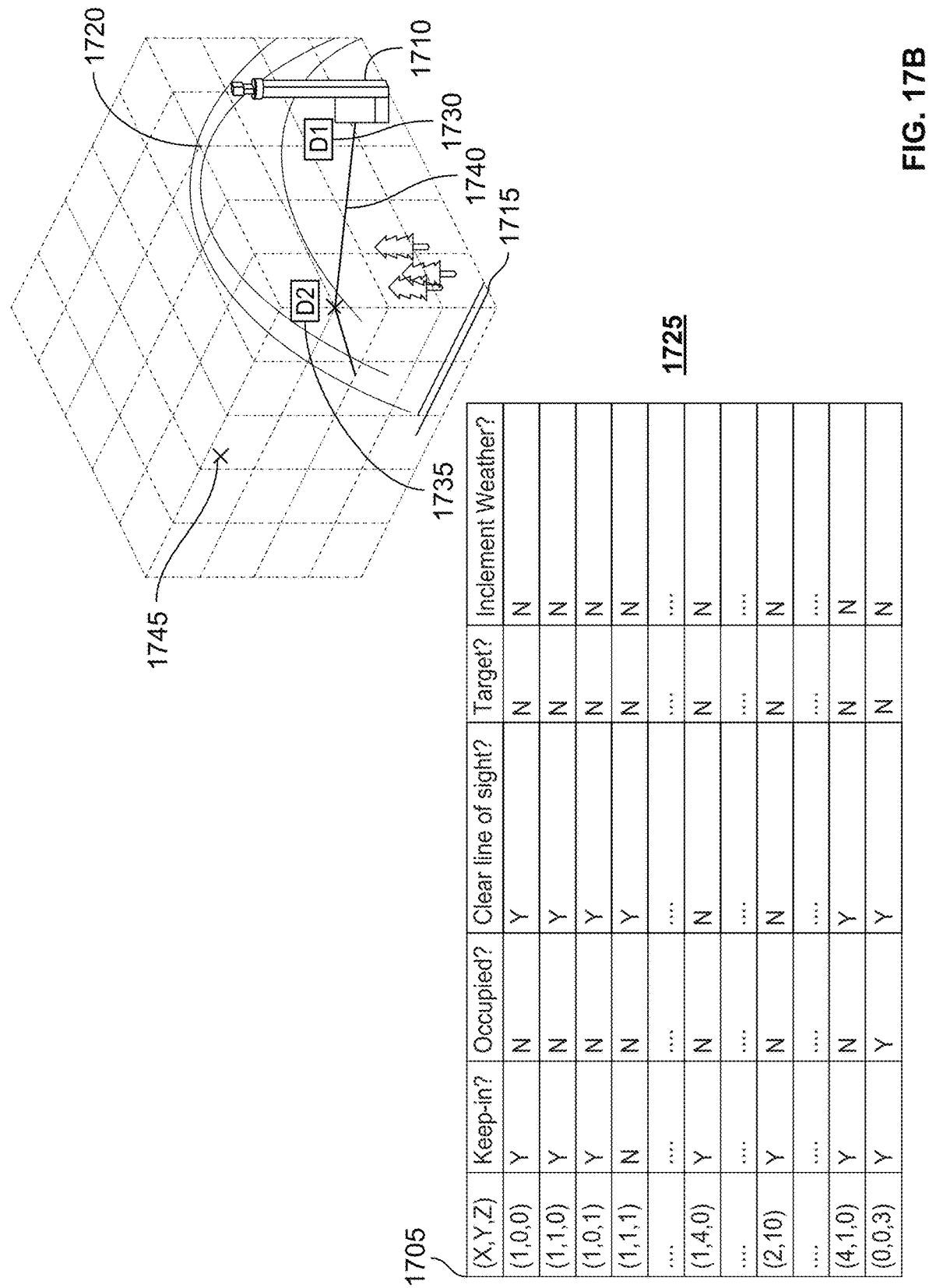
FIG. 17B is a diagram of a discrete representation of a geographic location according to various embodiments of the present application.

FIG. 17B is a diagram of a discrete representation of a geographic location according to various embodiments of the present application. In the example illustrated in FIG. 17B, leader drone D1 1730 and follower drone D2 1735 are deployed. For example, leader drone D1 1730 and follower drone D2 1735 are deployed in connection with initiation of the operation or one or more tasks associated with the operation. In some embodiments, leader drone D1 1730 instructs follower drone D2 1740 to travel to location 1745 to observe/surveil an area on the opposite side of 1720 (e.g., to identify targets, etc.). A flight plan 1740 is determined for follower drone D2 1735, and follower drone D2 1735 travels along the path for flight plan 1740 (e.g., to (x=0, y=0, z=3)). In some embodiments, in response to (or during) follower drone D2 1735 travels along the path for flight plan 1740, set of information 1705 associated with discretized representation 1725 is updated. For example, follower drone D2 1735 communicates (e.g., to leader drone D1 1730) feedback information pertaining to the one or more task and/or the geographic location. As illustrated in FIG. 17B, the discretized representation 1725 is updated to include further information pertaining to road 1715. Further, set of information 1705 is updated to include information associated with discrete element located at (x=0, y=0, z=3). In some embodiments, annotated representations are updated locally at each of follower drone D2 1735 and leader drone D1 1730.

Figure 17C:
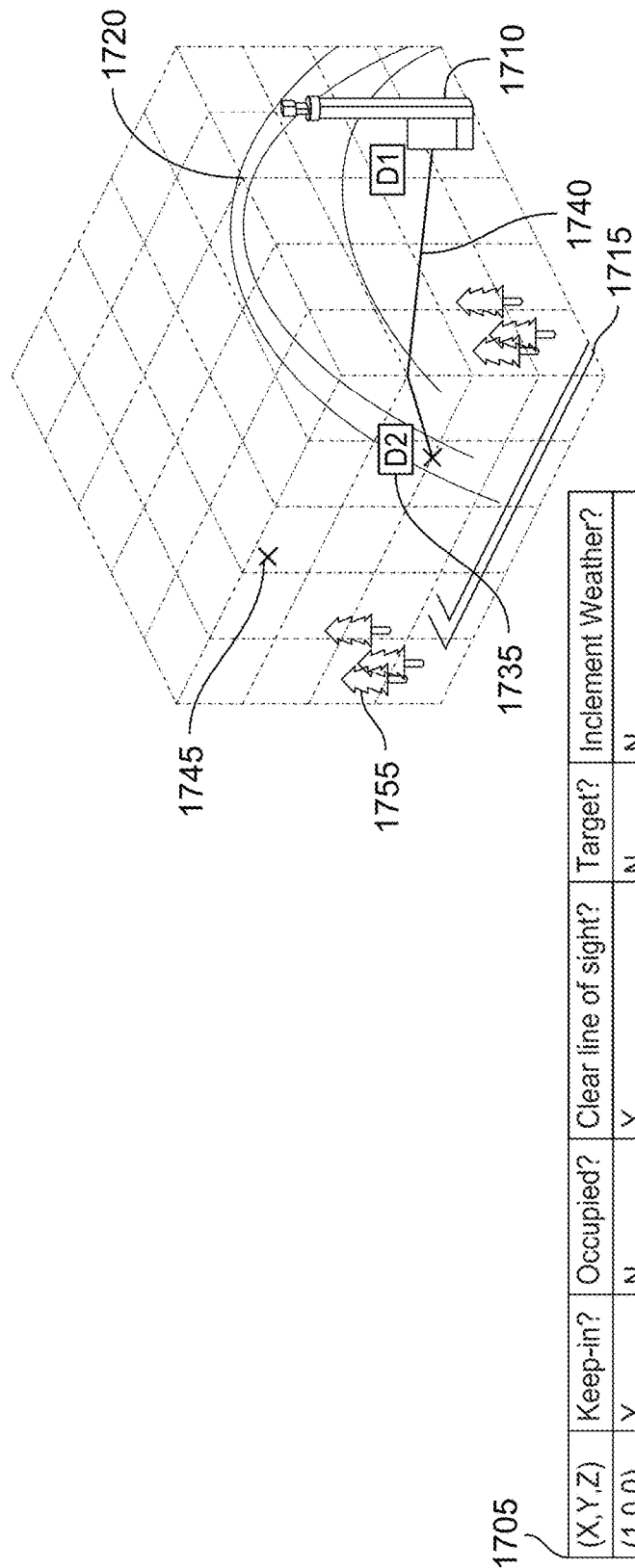
FIG. 17C is a diagram of a discrete representation of a geographic location according to various embodiments of the present application.

FIG. 17C is a diagram of a discrete representation of a geographic location according to various embodiments of the present application. As illustrated in FIG. 17C, as follower drone D2 1735 travels to discrete element located at (x=0, y=2, z=3), discretized representation 1750 and/or set of information 1705 is updated (e.g., the annotated representation is updated). For example, as follower drone D2 1735 travels to (x=0, y=2, z=3), follower drone D2 has a line of sight of more of road 1715 and trees 1755. Follower drone D2 1735 updates the annotated representation locally at follower drone D2 1735 and/or communicates feedback information to leader drone D1 1730 and leader drone D1 1730 correspondingly updates its locally stored discretized representation 1750 and/or set of information 1705 (e.g., the annotated representation stored at leader drone D1 1730).

Figure 17D:
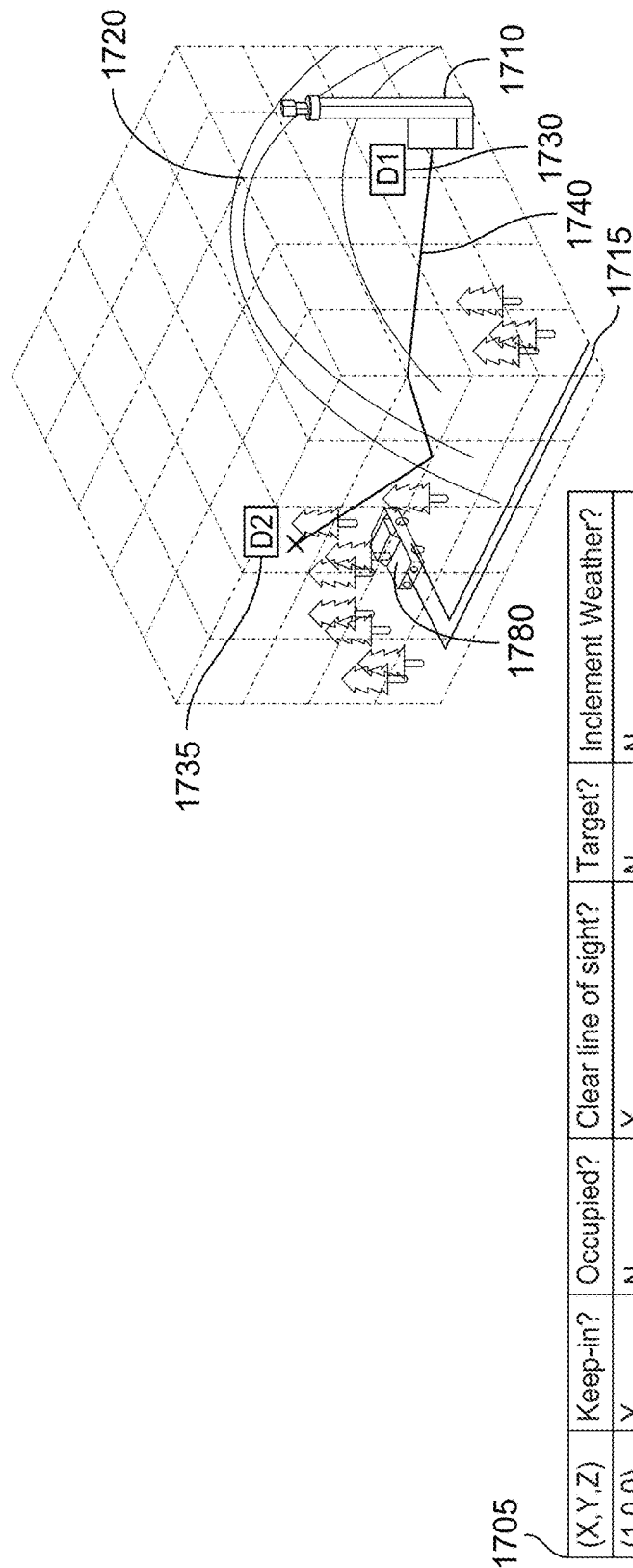
FIG. 17D is a diagram of a discrete representation of a geographic location according to various embodiments of the present application.

FIG. 17D is a diagram of a discrete representation of a geographic location according to various embodiments of the present application. As illustrated in FIG. 17D, as follower drone D2 1735 travels to discrete element located at (x=0, y=3, z=4), discretized representation 1775 and/or set of information 1705 is updated (e.g., the annotated representation is updated). For example, as follower drone D2 1735 travels to (x=0, y=3, z=4), follower drone D2 has a line of sight of more of road 1715 and follower drone D2 1735 identifies target 1780 travelling along road 1715. Follower drone D2 1735 updates the annotated representation locally at follower drone D2 1735 and/or communicates feedback information to leader drone D1 1730 and leader drone D1 1730 correspondingly updates its locally stored discretized representation 1775 and/or set of information 1705 (e.g., the annotated representation stored at leader drone D1 1730). As an example, set of information 1705 annotating discretized representation 1775 includes an entry that identifies that discrete element located at (x=2, y=5, z=0) comprises a target (e.g., target 1780).

Figure 18:
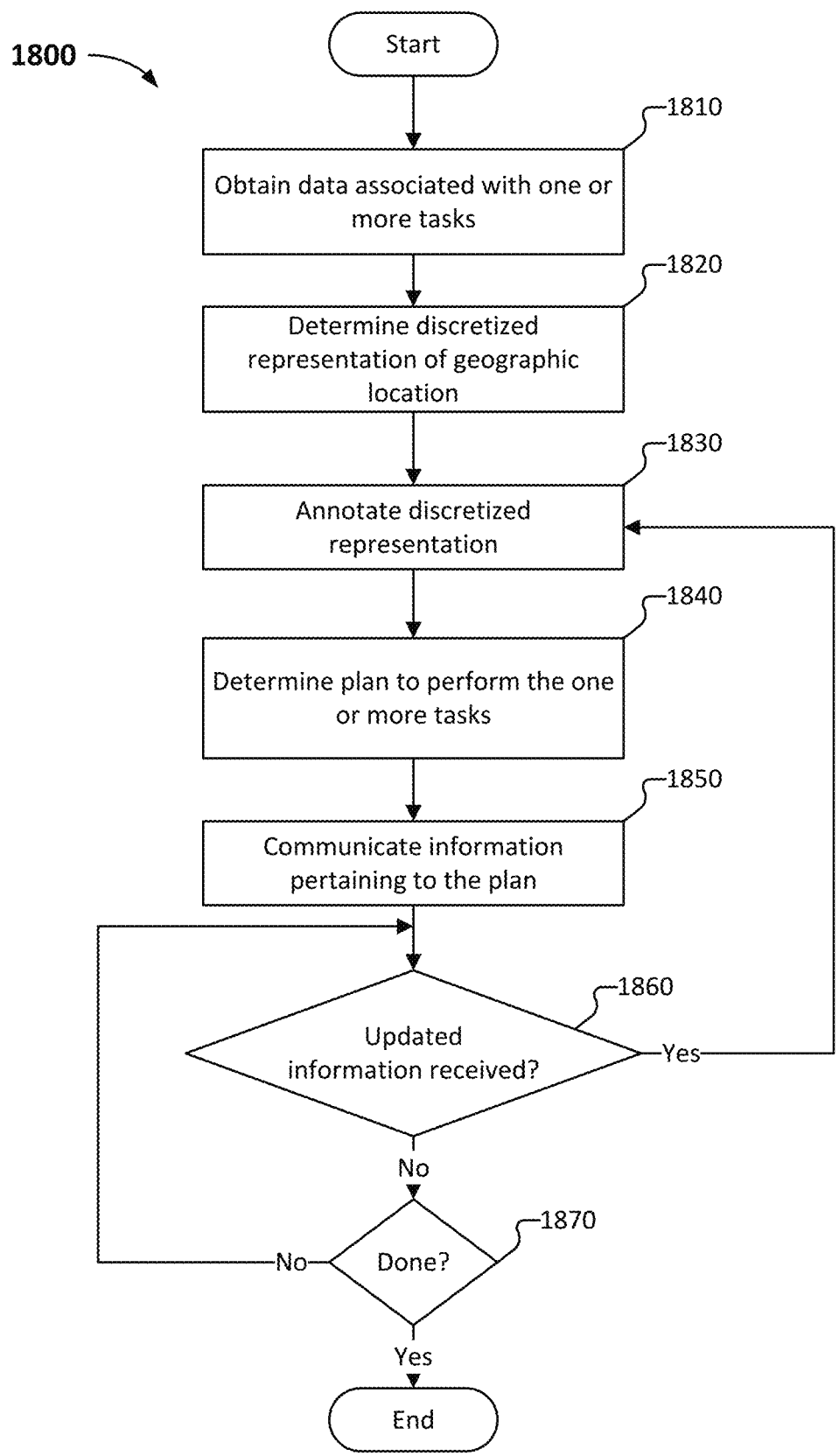
FIG. 18 is a diagram illustrating a method for determining a plan for performing one or more tasks according to various embodiments of the present application.

FIG. 18 is a diagram illustrating a method for determining a plan for performing one or more tasks according to various embodiments of the present application. According to various embodiments, process 1800 is at least partly implemented by system 100 of FIG. 1, and/or device 300 of FIG. 3. In embodiments, process 1800 is implemented in connection with determining or updating a plan. Process 1800 may be implemented during performance of an operation. Process 1800 is implemented by a leader drone and/or a follower drone of a set of assets that are assigned to perform one or more tasks.

At 1810, data associated with one or more tasks is obtained. According to various embodiments, obtaining the data associated with one or more tasks comprises one or more of 710 of process 700 of FIG. 7A, 835 of process 835 of FIG. 8C, 931 of process 930 of FIG. 9B, 950 of process 900 of FIG. 9A, 952-1 of process 950 of FIG. 9E, 1010 of process 1000 of FIG. 10A, 1021 of process 1020 of FIG. 10B, 1215a of process 1215 of FIG. 12B, 1305 and/or 1310 of process 1300 of FIGS. 13, 1405 and/or 1440 of process 1400 of FIG. 14, and/or 1505 and/or 1525 of process 1500 of FIG. 15.

In some embodiments, the data associated with the one or more tasks is associated with a geographic location at which the operation or one or more tasks are to be performed, and/or one or more one or more-characteristics or parameters associated with an operation. As an example, the data associated with the one or more tasks is received from a server (e.g., a server providing an operation control service) such as in connection with the configuration of an operation (e.g., based on a user input, etc.). As another example, the data associated with the one or more tasks is received from another asset in the set of assets to perform the operation. In the case of a leader drone, the leader drones receive data associated with the one or more tasks from a follower drone such as feedback information pertaining to an update to the status of performing the one or more tasks. In the case of a follower drone, the follower drones receive data associated with the one or more tasks from a leader drone and/or another asset within the set of assets. As another example, the data associated with the one or more tasks is received from a third party service such as a server that provides a service/information pertaining to the operation such as a weather service, information pertaining to other assets deployed in the geographical location, a mapping or topographical service, etc.

At 1820, a discretized representation of a geographic location is determined. According to various embodiments, the discretized representation corresponds to discretized representation 1600 of FIG. 16A and/or discretized representation 1700 of FIG. 17A. The discretized representation is generated based at least in part on at least a subset of the data associated with the one or more tasks. In some embodiments, determining the discretized representation comprises transforming the real world representation of the geographic location to a predefined number/dimensions of discrete elements. For example, the volume or amount of space represented by a particular discrete element is based at least in part on a size of the geographic location for which the discretized representation is generated.

At 1830, the discretized representation is annotated. In some embodiments, discretized representation is annotated based at least in part on (e.g., to include) the one or more parameters pertaining to the geographic location and/or information pertaining to the one or more tasks. As an example, the discretized representation is annotated in response to a determination that the one or more parameters pertain to the geographic location. In some embodiments, the annotating the discretized representation comprises setting/populating information with respect to at least a subset of the discrete elements in the discretized representation, such as setting the set of information 1610 of FIG. 16A and/or the set of information 1705 of FIG. 17A.

According to various embodiments, the discretized representation is annotated in connection with creating an annotated representation (e.g., an annotated representation of the geographic location). As an example, the annotating the discretized representation setting or associating metadata with one or more discrete elements of the discretized representation.

At 1840, a plan to perform the one or more tasks is determined. According to various embodiments, the plan to perform the one or more tasks is determined based at least in part on the annotated representation. The determining the plan is based on one or more tasks to be performed (e.g., one or more characteristics associated with the one or more tasks) and one or more parameters associated with the geographic location. As an example, the one or more parameters associated with the geographic location are comprised in the annotated representation.

At 1850, information pertaining to the plan is communicated. In some embodiments, the information pertaining to the plan is sent to another asset in the set of assets. As an example, in the case of the leader drone, the leader drone sends information pertaining to the plan to a ground control station and/or one or more follower drones, and the leader drone receives information such as feedback information from the ground control station and/or one or more follower drones. As another example, in the case of a follower drone, the follower drone sends information pertaining to the plan to the leader drone and/or one or more other assets in the set of assets performing the one or more tasks, and the follower drone receives update information from leader drone and/or one or more other assets in the set of assets.

At 1860, a determination is made as to whether updated information is received. According to various embodiments, the drone may receive updated information from another asset in the set of assets or from a server.

In some embodiments, the updated information is associated with a geographic location at which the operation or one or more tasks are to be performed, and/or one or more characteristics or parameters associated with an operation or one or more of the tasks. As an example, the updated information associated with the one or more tasks is received from a server (e.g., a server providing an operation control service) such as in connection with a change to the operation (e.g., based on a user input, etc.). As another example, the data associated with the one or more tasks is received from another asset in the set of assets to perform the operation. In the case of a leader drone, the leader drones receives the updated information from a follower drone such as feedback information pertaining to an update to the status of performing the one or more tasks, or information of a part of the geographic location detected by a sensor or camera of the follower drone. In the case of a follower drone, the follower drones receives data associated with the one or more tasks from a leader drone and/or another asset within the set of assets. As another example, the data associated with the one or more tasks is received from a third party service such as a server that provides a service/information pertaining to the operation such as a weather service, information pertaining to other assets deployed in the geographical location, a mapping or topographical service, a flight plan of another asset, etc.

In response to determining that updated information is received at 1860, process 1800 returns to 1830. In some embodiments, the annotated representation is iteratively updated with updated information in response to determining that updated information is received.

In response to determining that updated information is not received at 1860, process 1800 proceeds to 1870 at which a determination is made as to whether the process is complete. As an example, process 1800 may be determined to be complete based at least in part on a user input such as an input to cancel or pause an operation. As another example, the process may be determined to be complete in response to a user selecting to terminate an operation. As another example, the process may be determined to be complete in response to the operation being complete (e.g., the one or more tasks associated with the operation being complete). If the process is deemed complete, process 1800 ends. Otherwise, process 1800 returns to 1860 at which process polls/monitors for updated information.

Figure 19A:
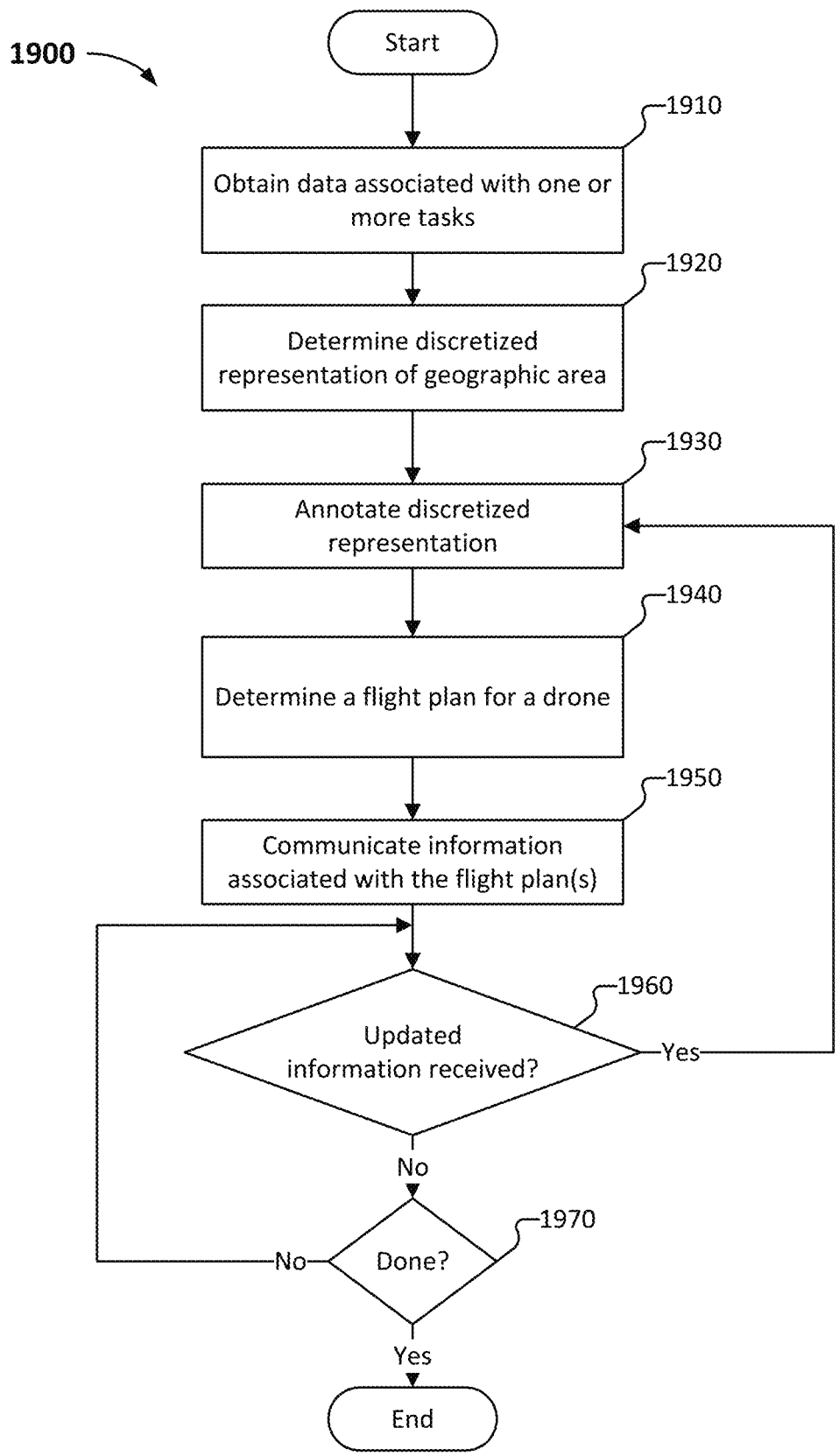
FIG. 19A is a diagram illustrating a method for determining a flight plan according to various embodiments of the present application.

FIG. 19A is a diagram illustrating a method for determining a flight plan according to various embodiments of the present application. According to various embodiments, process 1900 is at least partly implemented by system 100 of FIG. 1, and/or device 300 of FIG. 3. In embodiments, process 1900 is implemented in connection with determining or updating a plan such as a flight plan. Process 1900 may be implemented during performance of an operation. Process 1900 is implemented by a leader drone and/or a follower drone of a set of assets that are assigned to perform one or more tasks.

At 1910, data associated with one or more tasks is obtained. According to various embodiments, obtaining the data associated with one or more tasks comprises one or more of 710 of process 700 of FIG. 7A, 835 of process 835 of FIG. 8C, 931 of process 930 of FIG. 9B, 950 of process 900 of FIG. 9A, 952-1 of process 950 of FIG. 9E, 1010 of process 1000 of FIG. 10A, 1021 of process 1020 of FIG. 10B, 1215a of process 1215 of FIG. 12B, 1305 and/or 1310 of process 1300 of FIGS. 13, 1405 and/or 1440 of process 1400 of FIG. 14, and/or 1505 and/or 1525 of process 1500 of FIG. 15. The obtaining the data with the one or more tasks may be similar to 1810 of process 1800 of FIG. 18.

At 1920, a discretized representation of a geographic location is determined. According to various embodiments, the discretized representation corresponds to discretized representation 1600 of FIG. 16A and/or discretized representation 1700 of FIG. 17A. In some embodiments, the discretized representation is determined in a manner similar to 1820 of process 1800 of FIG. 18.

At 1930, the discretized representation is annotated. In some embodiments, discretized representation is annotated based at least in part on (e.g., to include) the one or more parameters pertaining to the geographic location and/or information pertaining to the one or more tasks. As an example, the discretized representation is annotated in response to a determination that the one or more parameters pertain to the geographic location. In some embodiments, the annotating the discretized representation comprises setting/populating information with respect to at least a subset of the discrete elements in the discretized representation, such as setting the set of information 1610 of FIG. 16A and/or the set of information 1705 of FIG. 17A. In some embodiments, the discretized representation is annotated in a manner similar to 1830 of process 1800 of FIG. 18.

According to various embodiments, the annotating the discretized representation comprises registering one or more flight plans associated with another asset in the set of assets. For example, in response to receiving a flight plan from a drone in the set of assets, the discretized representation is annotated to associate the flight plan with the discrete elements of the discretized representation with which the flight plan intersects/occupies. As another example, the discretized representation is annotated to set the impacted discrete elements of the discretized representation (e.g., the discrete elements with which the flight plan intersects/occupies) to set an indication that such discrete elements are occupied at least for a time period associated with the flight plan or until a time at which the drone associated with the flight plan has passed through the particular discrete element(s). The set of discrete elements impacted by the flight plan are updated as the corresponding drone traverses the flight plan (e.g., to set discrete elements through which the drone has traveled to unoccupied, and to free the discrete elements for use by another asset, etc.).

At 1940, a flight plan for a drone is determined. According to various embodiments, the flight plan is determined based at least in part on the annotation of the discretized representation (e.g., annotated representation). In some embodiments, a drone determines a flight plan based on parameters associated with the geographic location and/or one or more tasks. For example, the drone determines the flight plan based on a current location (e.g., a discrete element corresponding to the current location), a destination location (e.g., a discrete element corresponding to the destination location), and parameters associated with the one or more tasks (e.g., a type of task assigned to the drone). As another example, the flight plan is further based on one or more parameters of a set of discrete element(s) in the discretized representation (e.g., discrete elements between the current location and the destination location, a series of discrete elements along which a flight plan connects the current location and the destination location, etc.).

In some embodiments, the leader drone determines a plurality of flight plans such as each for a different follower drone in the set of assets. The leader drone plans the plurality of flight plans to avoid one another (e.g., to ensure collision avoidance among the set of assets), etc.

At 1950, information associated with the flight plan is communicated. According to various embodiments, in response to determining a flight plan, the flight plan is communicated to one or other assets in the set of assets. As an example, the flight plan is published to other assets in the set of assets (e.g., on an information feed/channel for flight plans or information pertaining to the one or more tasks). The information associated with the flight plan is communicated to other assets in the set of assets (e.g., a leader drone in the case of a follower drone communicating the information, a follower drone, etc.) to enable the other assets to locally store such information and/or update respective annotated representations of the geographic location to indicate that discrete elements corresponding to the flight plan are occupied during a time for which the flight plan is expected to impact the corresponding discrete elements, or until a subsequent communication indicates an update on the flight status of the drone and provides a clearing of discrete elements corresponding to a previous part of the flight plan, etc.

At 1960, a determination is made as to whether updated information is received. According to various embodiments, the drone may receive updated information from another asset in the set of assets or from a server.

In some embodiments, the updated information is associated with a geographic location at which the operation or one or more tasks are to be performed, and/or one or more characteristics or parameters associated with an operation or one or more of the tasks. As an example, the updated information associated with the one or more tasks is received from a server (e.g., a server providing an operation control service) such as in connection with a change to the operation (e.g., based on a user input, etc.). As another example, the data associated with the one or more tasks is received from another asset in the set of assets to perform the operation. In the case of a leader drone, the leader drones receive the updated information from a follower drone such as feedback information pertaining to an update to the status of performing the one or more tasks, or information of a part of the geographic location detected by a sensor or camera of the follower drone. In the case of a follower drone, the follower drones receive data associated with the one or more tasks from a leader drone and/or another asset within the set of assets. As another example, the data associated with the one or more tasks is received from a third party service such as a server that provides a service/information pertaining to the operation such as a weather service, information pertaining to other assets deployed in the geographical location, a mapping or topographical service, a flight plan of another asset, etc.

In response to determining that updated information is received at 1960, process 1900 returns to 1930. In some embodiments, the annotated representation is iteratively updated with updated information in response to determining that updated information is received. In response to the annotated representation being iteratively updated, the flight plan is iteratively determined/updated (e.g., a determination is made as to whether to keep the flight plant the same or whether to update the flight plan, etc.).

In response to determining that updated information is not received at 1960, process 1900 proceeds to 1970 at which a determination is made as to whether the process is complete. As an example, process 1900 may be determined to be complete based at least in part on a user input such as an input to cancel or pause an operation. As another example, the process may be determined to be complete in response to a user selecting to terminate an operation. As another example, the process may be determined to be complete in response to the operation being complete (e.g., the one or more tasks associated with the operation being complete). If the process is deemed complete, process 1900 ends. Otherwise, process 1900 returns to 1960 at which process polls/monitors for updated information.

Figure 19B:
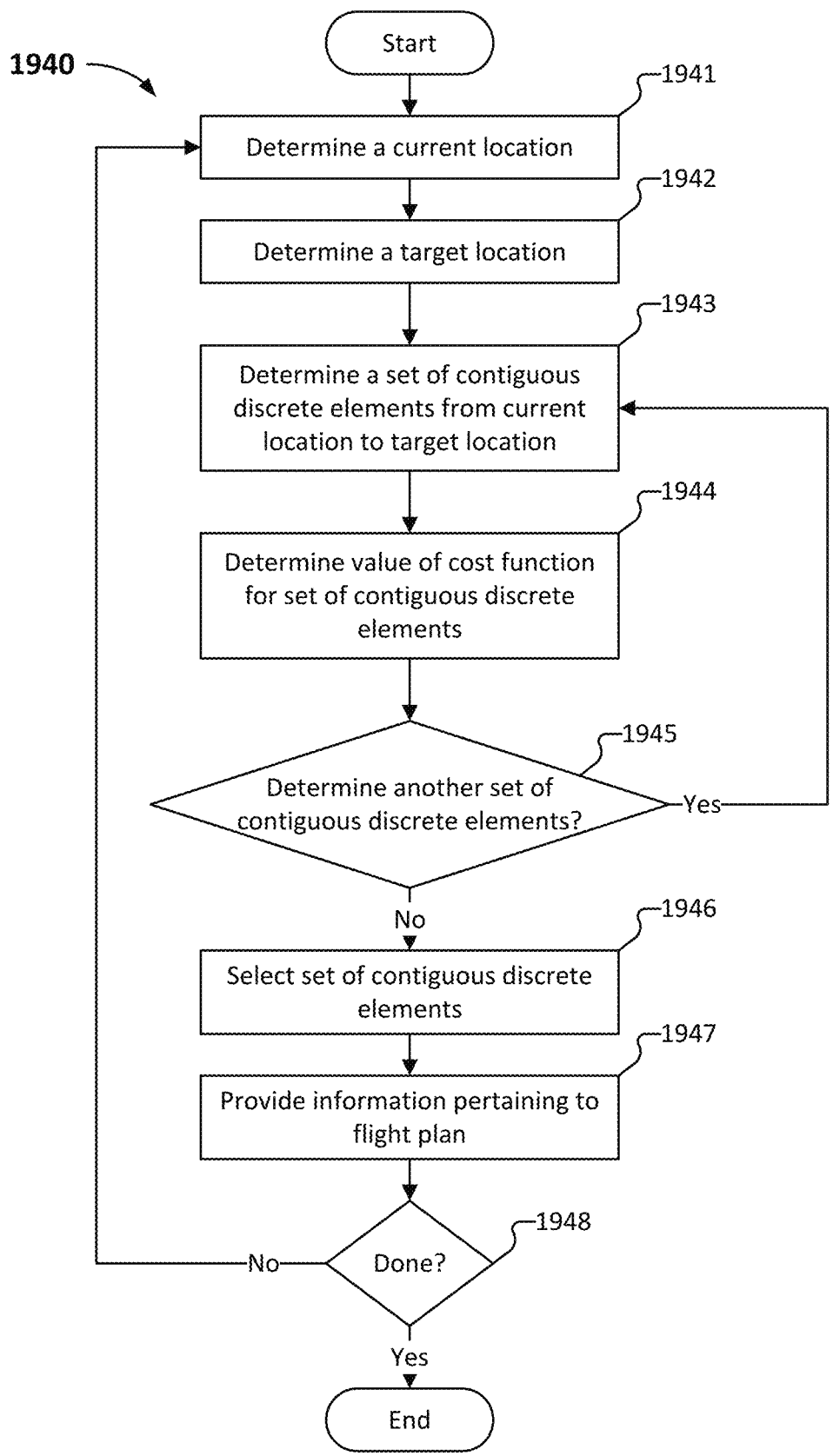
FIG. 19B is a diagram illustrating a method for determining a flight plan according to various embodiments of the present application.

FIG. 19B is a diagram illustrating a method for determining a flight plan according to various embodiments of the present application. According to various embodiments, process 1940 of FIG. 19B is implemented in connection with 1940 of process 1900 of FIG. 19A. According to various embodiments, process 1940 is at least partly implemented by system 100 of FIG. 1, and/or device 300 of FIG. 3. In embodiments, process 1940 is implemented in connection with determining or updating a plan such as a flight plan. Process 1940 may be implemented during performance of an operation. Process 1940 is implemented by a leader drone and/or a follower drone of a set of assets that are assigned to perform one or more tasks.

At 1941, a current location is determined. In some embodiments, the current location is associated with an asset for which a flight plan is to be determined. The current location indicates a discrete element of the discretized representation in which the asset is located. In some embodiments, a GPS location of the asset is determined and the discrete element corresponding to the GPS location is determined. As an example, the current location is determined based at least in part on feedback information received from the asset. As another example, the current location for the asset is determined based at least in part on a locally stored annotated representation of the geographic location). For example, the annotated representation is queried for a discrete element for which metadata indicates the asset is located therein.

At 1942, a target location (or destination location) is determined. The target location indicates a discrete element of the discretized representation to which the asset is to move. The target location is determined based at least in part on a plan or a task associated with the item. As an example, if the leader drone determines that a task for a follower drone is to perform surveillance of a road or a building, the target location is determined to be a location corresponding to the road or building. As another example, if the leader drone determines that a task for a follower drone is to intercept a target or surveil a target, the target location is determined based at least in part on the location of the target. For example, the location of the target is determined by querying the annotated representation for a discrete element comprising the target to be intercepted/surveilled.

At 1943, a set of continuous or adjoining discrete elements from the current location to the target location are determined. The set of continuous or adjoining discrete elements are determined based at least in part on the annotated representation. For example, a set of continuous or adjoining discrete elements corresponds to a path along which the asset is able to travel from the current location to the target location. In some embodiments, the set of continuous or adjoining discrete elements comprises only discrete elements that are not indicated to be occupied or that are indicated to be unoccupied.

At 1944, a value of a cost function is determined for the set of contiguous discrete elements determined at 1943. In some embodiments, the cost associated with moving the asset from the current location to the target location via a flight plan corresponding to the set of contiguous discrete elements is determined. According to various embodiments, the cost function comprises one or more variables. In some embodiments, each of the one or more variables has a corresponding weighting (e.g., between 0 and 1, etc.). The variables in the cost function may pertain to an amount of effort to move the asset form the current location to the target location, a risk of loss, a time to traverse the flight path, etc. Examples of the cost function include (i) a length of the flight plan, (ii) an extent to which the flight plan includes a vertical climb (e.g., a traversal of the asset to a higher altitude), (iii) an extent of the flight plan that maintains a communication line of sight (e.g., a radio line of sight) with a leader drone or other asset or control station, (iv) an extent of the flight plan that comprises inclement weather, (v) an extent of the flight plan that subjects the asset to a risk of loss (e.g., a risk of loss that exceeds a threshold likelihood of loss), (vi) an amount of time required for the asset to move from the current location to the target location along the flight path of the set of contiguous discrete elements, etc. Various other variables may be implemented in connection with the cost function.

At 1945, a determination is made as to whether to determine another set of contiguous discrete elements.

In some embodiments, the system iteratively determines sets of contiguous discrete elements until a set of continuous discrete element satisfying a cost threshold (e.g., a predefined threshold, a configurable threshold, etc.). For example, the system may use a "good enough" determination method to determine a flight plan such that if a flight plan having a cost less than the cost threshold is determined, process 1940 proceeds to 1946, otherwise a further set of contiguous discrete elements is determined.

In some embodiments, the system determines a predefined number of sets of contiguous discrete elements from which a selected set of contiguous discrete elements is selected as corresponding to the flight plan. As an example, the predefined number of sets of contiguous discrete elements that is determined is configurable such as by a user or an administrator.

In some embodiments, the system determines sets of contiguous discrete elements for a predefined period of time. For example, the system may allocate a certain amount of time to the determining of sets of contiguous discrete elements, and the system may determine sets of contiguous discrete elements until such predefined period of time has lapsed.

In response to a determination that another set of contiguous discrete elements is to be determined at 1945, process 1940 returns to 1943. In contrast, in response to a determination that another set of contiguous elements is not to be determined at 1945, process 1940 proceeds to 1946.

At 1946, a set of contiguous discrete elements is selected. According to various embodiments, the set of contiguous discrete elements is selected from among the set(s) (e.g., the plurality of sets) such as the set(s) determined based on iteratively performing 1943-1945 of process 1940. In some embodiments, the set of contiguous discrete elements is selected as the set of contiguous discrete elements to correspond to the flight plan for the particular asset (e.g., the current location, the target location, and the selected set of contiguous discrete elements corresponds to the flight plan).

According to various embodiments, the selected set of contiguous discrete elements is selected based at least in part on a value of the cost function determined for the selected set of contiguous discrete elements. For example, the system determines an optimal set of contiguous discrete elements from among the set(s) of contiguous discrete elements (e.g., determined based on iteratively performing 1943-1945 of process 1940) based at least in part on the cost function. For example, the system selects the set of contiguous discrete elements having a lowest cost. As another example, the system selects a plurality of flight plans for a plurality of assets based on an optimal aggregated cost associated with the plurality of assets moving from their respective current locations to their respective target locations.

At 1947, information pertaining to the flight plan is provided. For example, the information pertaining to the flight plan comprises selected set of contiguous discrete elements.

At 1948 at which a determination is made as to whether the process is complete. As an example, process 1940 may be determined to be complete based at least in part on a user input such as an input to cancel or pause an operation. As another example, the process may be determined to be complete in response to a user selecting to terminate an operation. As another example, the process may be determined to be complete in response to a determination that no further flight plans are to be determined (e.g., the one or more tasks associated with the operation being complete). If the process is deemed complete, process 1940 ends. Otherwise, process 1900 returns to 1941 at which another flight plan is determined by iteratively performing 1941-1947.

Various examples of embodiments described herein are described in connection with flow diagrams. Although the examples may include certain steps performed in a particular order, according to various embodiments, various steps may be performed in various orders. In some embodiments, some steps may be combined or excluded from the examples discussed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
one or more processors coupled to the communication interface and configured to:
obtain data associated with one or more tasks to be performed by a set of assets, wherein:
the set of assets comprises a plurality of drones and the plurality of drones is at least semi-autonomous; and
the data associated with the one or more tasks comprises one or more parameters pertaining to a geographic location in which at least one asset of the set of assets is to perform the one or more tasks;
determine a discretized representation of the geographic location, wherein the discretized representation comprises a plurality of discrete elements each corresponding to a volume associated with the geographic location;
annotate the discretized representation to create an annotated representation with the one or more parameters pertaining to the geographic location with at least a subset of the plurality of discrete elements based at least in part on a determination that the one or more parameters pertain to the geographic location, wherein annotating comprises setting one or more fields of metadata associated with the plurality of discrete elements to define a communication line of sight among the plurality of drones;
determine a plan, based at least in part on the annotated representation, for controlling the plurality of drones to perform the one or more tasks; and
cause the one or more tasks to be performed by the plurality of drones based at least in part on the plan.

2. The system of claim 1, wherein determining the discretized representation of the geographic location comprises determining a 3-D representation associated with the geographic location.

3. The system of claim 2, wherein:
determining the 3-D representation associated with the geographic location comprises transforming the geographic location from a real world representation to the 3-D representation based at least in part a curvature of Earth; and
a downward direction in a grid of the 3-D representation corresponds to a direction of a force of gravity.

4. The system of claim 1, wherein:
the data associated with the one or more tasks includes an indication of a keep-in area or a keep-out area; and
annotating the discretized representation to create an annotated representation with the one or more parameters pertaining to the geographic location with at least a subset of the plurality of discrete elements comprises:
setting one or more fields of metadata associated with plurality of discrete elements to indicate whether a particular discrete element is available for an asset of the set of assets to occupy.

5. The system of claim 1, wherein obtaining the data associated with one or more tasks to be performed by the set of assets comprises receiving the data from a server in connection with definition of an operation that is at least partially user-defined.

6. The system of claim 1, wherein obtaining the data associated with the one or more tasks to be performed by the set of assets comprises:
receiving an operation definition from a server in connection a user configuring an operation; and
receiving, from a server associated with a third party service, information pertaining to the environment of the geographic location.

7. The system of claim 6, wherein the information pertaining to the environment of the geographic location comprises terrain information.

8. The system of claim 6, wherein the information pertaining to the environment of the geographic location comprises weather information.

9. The system of claim 1, wherein obtaining the data associated with one or more tasks to be performed by the set of assets comprises one or more of:
receiving an operation definition from a server in connection a user configuring an operation;
receiving, from a server associated with a third party service, environment information pertaining to the environment of the geographic location; and
receiving, from a follower drone comprised in the set of assets, sensor information obtained by a sensor or camera of the follower drone, or flight information pertaining to a flight plan of the follower drone.

10. The system of claim 1, wherein obtaining the data associated with one or more tasks to be performed by the set of assets comprises:
receiving, from a leader drone comprised in the set of assets, the data associated with one or more tasks to be performed by the set of assets.

11. The system of claim 10, wherein the data associated with one or more tasks to be performed by the set of assets received from the leader drone comprises:
sensor information obtained by a sensor or camera of another drone in the set of assets, or plan information pertaining to a plan of the other drone to perform at least an element of the one or more other tasks.

12. The system of claim 10, wherein the data associated with one or more tasks to be performed by the set of assets received from the leader drone comprises:
environment information pertaining to the environment of the geographic location.

13. The system of claim 1, wherein the one or more processors are configured to:
monitor, during at least performance of the one or more tasks, for updates with respect to one or more of (i) the one or more tasks, and (ii) the geographic location; and
update the annotated representation with the updates to the one or more of (i) the one or more tasks, and (ii) the geographic location.

14. The system of claim 13, wherein the updates with respect to one or more of the one or more tasks, and the geographic location are received from one or more follower drones in the set of assets.

15. The system of claim 13, wherein the one or more processors are further configured to:
determine whether the update information is expected to affect a plan to perform at least an element of the task; and
in response to determining that the update is expected to affect the plan to perform at least the element of the task, obtaining a modified plan by modifying the plan to perform at least the element of the task.

16. The system of claim 15, wherein the wherein the one or more processors are further configured to:
communicate, to at least one other asset in the set of assets, information pertaining to the modified plan.

17. The system of claim 1, wherein the annotating the discretized representation to create an annotated representation comprises:
setting, for a plurality of the discrete elements, an attribute of the corresponding discrete element, the attribute corresponding to an indication of whether an asset in the set of assets would have a clear line of sight from the discrete element.

18. The system of claim 17, wherein the clear line of sight is between a leader drone and the asset in the set of assets.

19. The system of claim 17, wherein the clear line of sight is between a control station node and the asset in the set of assets.

20. The system of claim 1, wherein to annotate the discretized representation to create an annotated representation comprises associating the one or more parameters with at least one or more parts of the geographic location to which the one or more parameters correspond.

21. A method, comprising:
obtaining data associated with one or more tasks to be performed by a set of assets, wherein:
the set of assets comprises a plurality of drones and the plurality of drones is at least semi-autonomous; and
the data associated with the one or more tasks comprises one or more parameters pertaining to a geographic location in which at least one asset of the set of assets is to perform the one or more tasks;
determining a discretized representation of the geographic location, wherein the discretized representation comprises a plurality of discrete elements each corresponding to a volume associated with the geographic location;
annotating the discretized representation to create an annotated representation with the one or more parameters pertaining to the geographic location with at least a subset of the plurality of discrete elements based at least in part on a determination that the one or more parameters pertain to the geographic location, wherein annotating comprises setting one or more fields of metadata associated with the plurality of discrete elements to define a communication line of sight among the plurality of drones;
determining a plan, based at least in part on the annotated representation, for controlling the plurality of drones to perform the one or more tasks; and
causing the one or more tasks to be performed by the plurality of drones based at least in part on the plan.

22. A computer program product, the computer program product being embodied in a non-transitory computer readable medium and comprising computer instructions for:
obtaining data associated with one or more tasks to be performed by a set of assets, wherein:
the set of assets comprises a plurality of drones and the plurality of drones is at least semi-autonomous; and
the data associated with the one or more tasks comprises one or more parameters pertaining to a geographic location in which at least one asset of the set of assets is to perform the one or more tasks;
determining a discretized representation of the geographic location, wherein the discretized representation comprises a plurality of discrete elements each corresponding to a volume associated with the geographic location;
annotating the discretized representation to create an annotated representation with the one or more parameters pertaining to the geographic location with at least a subset of the plurality of discrete elements based at least in part on a determination that the one or more parameters pertain to the geographic location, wherein annotating comprises setting one or more fields of metadata associated with the plurality of discrete elements to define a communication line of sight among the plurality of drones;
determining a plan, based at least in part on the annotated representation, for controlling the plurality of drones to perform the one or more tasks; and
causing the one or more tasks to be performed by the plurality of drones based at least in part on the plan.

* * * * *